US010200664B2

(12) United States Patent
Kaizu

(10) Patent No.: US 10,200,664 B2
(45) Date of Patent: *Feb. 5, 2019

(54) IMAGE PROCESSING APPARATUS, IMAGE DEVICE, IMAGE PROCESSING METHOD, AND PROGRAM FOR REDUCING NOISE OR FALSE COLORS IN AN IMAGE

(71) Applicant: Sony Corporation, Tokyo (JP)

(72) Inventor: Shun Kaizu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/597,719

(22) Filed: May 17, 2017

(65) Prior Publication Data

US 2017/0251188 A1 Aug. 31, 2017

Related U.S. Application Data

(63) Continuation of application No. 14/384,835, filed as application No. PCT/JP2012/083615 on Dec. 26, 2012, now Pat. No. 9,699,429.

(30) Foreign Application Priority Data

Mar. 27, 2012 (JP) ................................ 2012-070538

(51) Int. Cl.

*H04N 9/083* (2006.01)
*H04N 3/14* (2006.01)
(Continued)

(52) U.S. Cl.

CPC ........... *H04N 9/735* (2013.01); *G06T 3/4015* (2013.01); *H04N 5/2355* (2013.01);
(Continued)

(58) Field of Classification Search

CPC .............. H01L 27/14621; H04N 9/045; H04N 2209/047; H04N 5/332; H04N 9/083
(Continued)

(56) References Cited

U.S. PATENT DOCUMENTS 5,323,233 A * 6/1994 Yamagami ............. H04N 9/045 348/276
8,125,543 B2 * 2/2012 Cho ..................... H04N 5/2351 348/241
(Continued)

FOREIGN PATENT DOCUMENTS

CN 101262564 A 9/2008
CN 102006484 A 4/2011
(Continued)

OTHER PUBLICATIONS

No Author Listed, Color Filter Array Designs, Dec. 23, 2011, https://web.archive.org/web/20111223064706/http://www.quadibloc.com/other/cfaint.htm, retrieved on Jul. 30, 2015, 16 pages.

*Primary Examiner* — Chia Wei A Chen
(74) *Attorney, Agent, or Firm* — Wolf, Greenfield & Sacks, P.C.

(57) ABSTRACT

There are provided an apparatus and a method which generate an RGB image having less color noise and fewer false colors by inputting an RGBW image. The apparatus has an image sensor having an RGBW array, and an image processing unit which performs image processing by inputting a sensor image formed of an RGBW pixel signal output from the image sensor. The image sensor has a periodic array of a unit composition formed of each RGBW pixel, and has an array in which composition ratios of each RGB pixel within the unit composition are adapted to be the same as each other. The image processing unit converts a pixel array of the sensor image formed of the RGBW pixel signal, and performs at least either array conversion processing for
(Continued)

generating an RGB array image or signal processing for generating each RGB image signal in which all RGB pixel values are set for each pixel position of the sensor image.

11 Claims, 38 Drawing Sheets

(51) Int. Cl.

| | |
|---|---|
| ***H04N 5/335*** | (2011.01) |
| ***H04N 9/04*** | (2006.01) |
| ***H04N 9/73*** | (2006.01) |
| ***H04N 9/07*** | (2006.01) |
| ***G06T 3/40*** | (2006.01) |
| ***H04N 5/359*** | (2011.01) |
| ***H04N 5/235*** | (2006.01) |
| ***H04N 5/355*** | (2011.01) |

(52) U.S. Cl.
CPC ....... *H04N 5/3597* (2013.01); *H04N 5/35581* (2013.01); *H04N 9/045* (2013.01); *H04N 9/07* (2013.01); *G06T 2207/20208* (2013.01); *H04N 2209/045* (2013.01)

(58) Field of Classification Search
USPC .................................................. 348/276–279
See application file for complete search history.

(56) References Cited

U.S. PATENT DOCUMENTS

| | | | | |
|---|---|---|---|---|
| 8,139,130 | B2 * | 3/2012 | Compton | H04N 9/045 348/276 |
| 8,203,633 | B2 * | 6/2012 | Adams, Jr. | H04N 9/045 348/222.1 |
| 8,723,995 | B2 * | 5/2014 | Schweng | H04N 5/2355 348/234 |
| 9,253,459 | B2 | 2/2016 | Tachi | |
| 9,445,022 | B2 | 9/2016 | Tachi | |
| 2002/0027601 | A1 * | 3/2002 | Nakayama | H04N 5/2352 348/223.1 |
| 2004/0218830 | A1 | 11/2004 | Kang et al. | |
| 2007/0024879 | A1 * | 2/2007 | Hamilton, Jr. | H04N 9/045 358/1.9 |
| 2007/0153104 | A1 | 7/2007 | Ellis-Monaghan et al. | |
| 2008/0130073 | A1 * | 6/2008 | Compton | H04N 5/335 358/512 |
| 2008/0211943 | A1 | 9/2008 | Egawa et al. | |
| 2008/0219585 | A1 | 9/2008 | Kasai et al. | |
| 2008/0297633 | A1 * | 12/2008 | Wada | H04N 5/235 348/272 |
| 2009/0051984 | A1 * | 2/2009 | O'Brien | H04N 9/045 358/514 |
| 2009/0087087 | A1 * | 4/2009 | Palum | G06T 3/4015 382/165 |
| 2010/0097495 | A1 * | 4/2010 | Choe | G06T 5/50 348/235 |
| 2010/0141812 | A1 * | 6/2010 | Hirota | H04N 9/045 348/279 |
| 2010/0157091 | A1 * | 6/2010 | Honda | H01L 27/14645 348/223.1 |
| 2010/0231770 | A1 * | 9/2010 | Honda | G06T 3/4015 348/308 |
| 2010/0309350 | A1 * | 12/2010 | Adams, Jr. | H01L 27/14621 348/280 |
| 2011/0050918 | A1 | 3/2011 | Tachi | |
| 2011/0155908 | A1 * | 6/2011 | Song | G02B 5/201 250/332 |
| 2011/0176036 | A1 | 7/2011 | Getman et al. | |
| 2013/0215360 | A1 * | 8/2013 | Pollack | G09G 3/3413 349/61 |
| 2013/0236095 | A1 | 9/2013 | Hitomi et al. | |
| 2013/0266219 | A1 | 10/2013 | Kurita et al. | |
| 2013/0272605 | A1 | 10/2013 | Saito et al. | |
| 2013/0329989 | A1 | 12/2013 | Palum et al. | |
| 2013/0342674 | A1 * | 12/2013 | Dixon | G02B 21/36 348/79 |
| 2014/0253808 | A1 | 9/2014 | Tachi | |
| 2014/0347528 | A1 | 11/2014 | Tachi | |
| 2015/0002707 | A1 * | 1/2015 | Wu | H01L 27/14621 348/279 |
| 2015/0029358 | A1 | 1/2015 | Kaizu | |
| 2016/0112659 | A1 | 4/2016 | Tachi | |

FOREIGN PATENT DOCUMENTS

| | | | |
|---|---|---|---|
| JP | 2004-304706 | A | 10/2004 |
| JP | 2006-253876 | A | 9/2006 |
| JP | 2007-184904 | A | 7/2007 |
| JP | 2008-022521 | A | 1/2008 |
| JP | 2008-172289 | A | 7/2008 |
| JP | 2010-136225 | A | 6/2010 |
| JP | 2011-055038 | A | 3/2011 |

* cited by examiner

FIG. 2
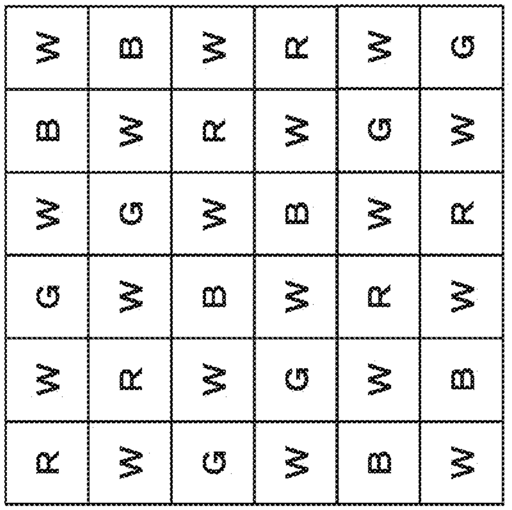
(a) IMAGE SENSOR PIXEL ARRAY
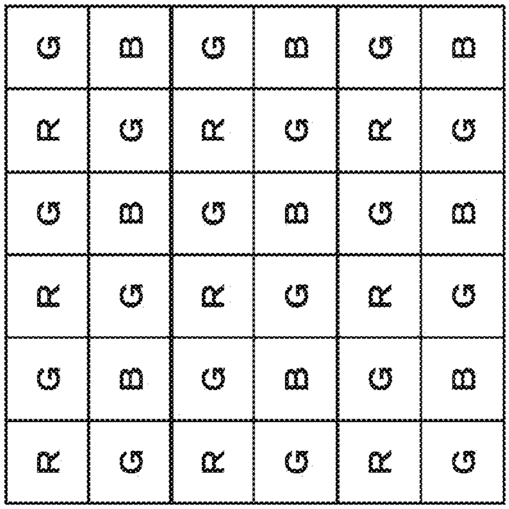
(b) BAYER ARRAY
(b) BAYER ARRAY
| G | B | G | B | G | B |
|---|---|---|---|---|---|
| R | G | R | G | R | G |
| G | B | G | B | G | B |
| R | G | R | G | R | G |
| G | B | G | B | G | B |
| R | G | R | G | R | G |
| W | B | W | R | W | G |
|---|---|---|---|---|---|
| B | W | R | W | G | W |
| W | G | W | B | W | R |
| G | W | B | W | R | W |
| W | R | W | G | W | B |
| R | W | G | W | B | W |

SIMPLEST INSTALLATION IN CASE OF N=2

IN CASE OF $|W(1,2) - W(3,2)| \leq |W(2,1) - W(2,3)|$ $$W'(2,2) = (W(1,2) + W(3,2)) / 2$$

IN CASE OF $|W(1,2) - W(3,2)| > |W(2,1) - W(2,3)|$ $$W'(2,2) = (W(2,1) + W(2,3)) / 2$$

FIG. 8

SIMPLEST INSTALLATION METHOD OF R, G, B, AND W PIXEL GENERATION UNIT $$mR = \frac{\sum_{i=1}^{K} Ri}{K} \quad mG = \frac{\sum_{i=1}^{L} Gi}{L} \quad mB = \frac{\sum_{i=1}^{M} Bi}{M} \quad mW = \frac{\sum_{i=1}^{N} Wi}{N}$$

K, L, M, AND N REPRESENT TOTAL NUMBER OF RESPECTIVE COLORS INCLUDED IN PREDETERMINED REFERENCE AREA,
mR, mG, mB, AND mW REPRESENT AVERAGE VALUE

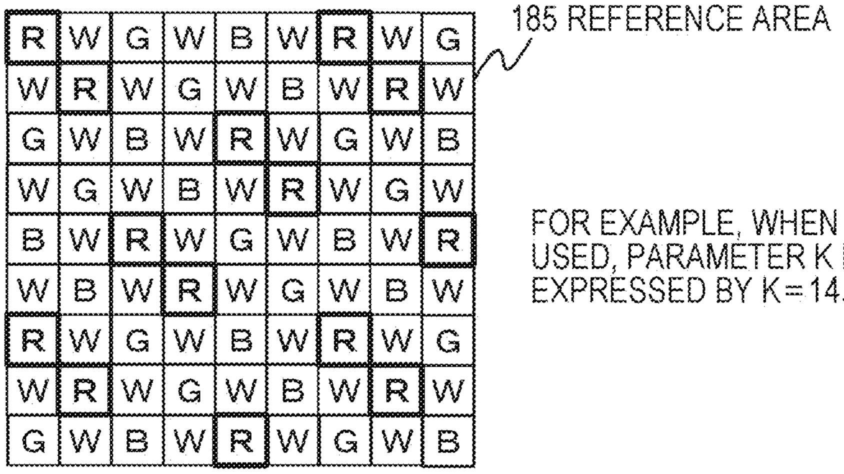

FOR EXAMPLE, WHEN LEFT REFERENCE AREA 185 IS USED, PARAMETER K FOR CALCULATING mR IS EXPRESSED BY K=14.

500 IMAGE PROCESSING APPARATUS

FIG. 26

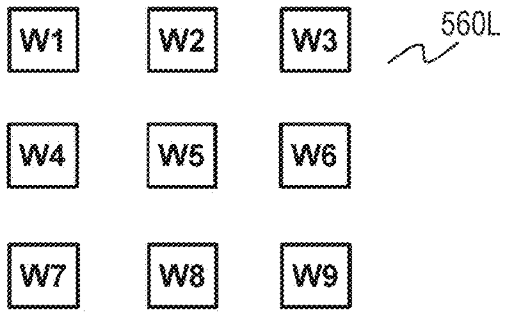

IN UPPER DRAWING, EDGE DETECTION f IN FOUR DIRECTIONS IS PERFORMED THROUGH FOLLOWING PROCESSING. WHEN EDGE AMOUNTS IN RESPECTIVE DIRECTIONS ARE SET TO BE HORIZONTAL Dh, VERTICAL Dv, LEFTWARD-UPWARD OBLIQUE Dd, AND RIGHTWARD-UPWARD OBLIQUE Da, $$Dh = (|W1-W2| + |W2-W3| + 2(|W4-W5| + |W5-W6|) + |W7-W8| + |W8-W9|) / 8$$

$$Dv = (|W1-W4| + |W4-W7| + 2(|W2-W5| + |W5-W8|) + |W3-W6| + |W6-W9|) / 8$$

$$Dd = (|W1-W5| + |W2-W6| + |W4-W8| + |W5-W9|) / 4$$

$$Da = (|W2-W4| + |W3-W5| + |W5-W7| + |W6-W8|) / 4$$

EDGE AMOUNTS CAN BE CALCULATED AS FOLLOWS. SAME CALCULATION PROCESSING CAN ALSO BE PERFORMED IN CALCULATING EDGE AMOUNT AT OTHER POSITIONS.

BASED ON EDGE AMOUNTS IN THESE FOUR DIRECTIONS, EDGE DIRECTION IS DETERMINED THROUGH FOLLOWING PROCESSING.

IN CASE OF $|Dh - Dv| \geq |Dd - Da|$

INDICATES HORIZONTAL DIRECTION $Dh \leq Dv$

INDICATES VERTICAL DIRECTION $Dh > Dv$

IN CASE OF $|Dh - Dv| < |Dd - Da|$

INDICATES LEFTWARD-UPWARD OBLIQUE DIRECTION $Dd \leq Da$

INDICATES RIGHTWARD-UPWARD OBLIQUE DIRECTION $Dd > Da$

FIG. 35

(1) EXAMPLE OF EDGE DIRECTION DETECTION PROCESSING AND INTERPOLATION PIXEL VALUE CALCULATION PROCESSING

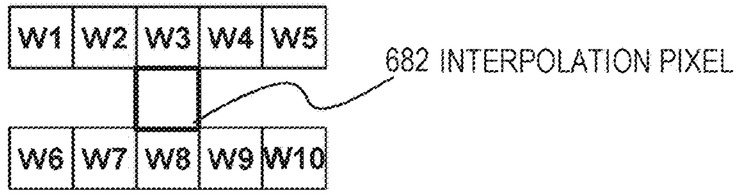

(a) EXAMPLE OF FILTER SETTING

DIRECTION 1 FILTER: F1 = (W2 + W9) / 2
DIRECTION 2 FILTER: F2 = (W3 + W8) / 2
DIRECTION 3 FILTER: F3 = (W4 + W7) / 2

(b) EXAMPLE OF EDGE DIRECTION DETERMINATION AND APPLICABLE FILTER SELECTION PROCESSING

EDGE AMOUNT OF DIRECTION 1: D1 = (|W1 − W8| + 2|W2 − W9| + |W3 − W10|) / 4
EDGE AMOUNT OF DIRECTION 2: D2 = (|W2 − W7| + 2|W3 − W8| + |W4 − W9|) / 4
EDGE AMOUNT OF DIRECTION 3: D3 = (|W3 − W6| + 2|W4 − W7| + |W5 − W8|) / 4

IN CASE OF D1 < D2 AND D1 < D3
DIRECTION 1 FILTER IS USED
IN CASE OF D3 < D1 AND D3 < D2
DIRECTION 3 FILTER IS USED
OTHERWISE
DIRECTION 2 FILTER IS USED

FIG. 36
(1) EXAMPLE 1 OF IMAGE SENSOR PIXEL ARRAY (6×6 CYCLES)
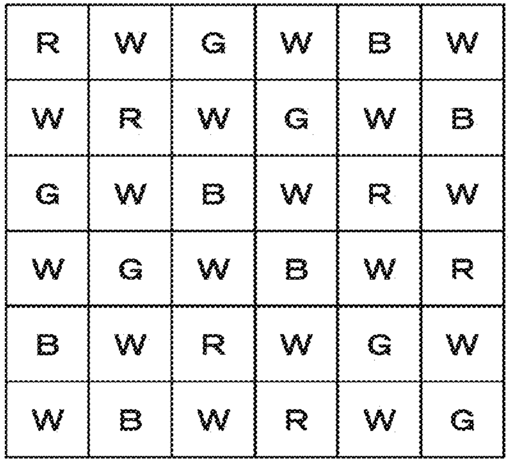
(2) EXAMPLE 2 OF IMAGE SENSOR PIXEL ARRAY (6×6 CYCLES)
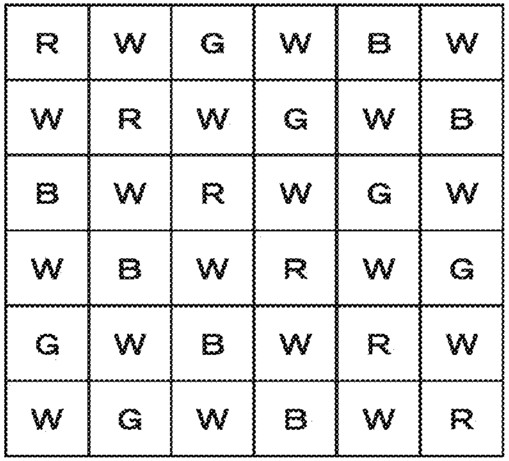

(3) EXAMPLE 3 OF IMAGE SENSOR PIXEL ARRAY (6×4 CYCLES)

| R | W | G | W | B | W |
|---|---|---|---|---|---|
| W | R | W | G | W | B |
| G | W | B | W | R | W |
| W | G | W | B | W | R |

(4) EXAMPLE 4 OF IMAGE SENSOR PIXEL ARRAY (6×4 CYCLES)

| R | W | R | W | B | W |
|---|---|---|---|---|---|
| W | G | W | G | W | G |
| B | W | R | W | R | W |
| W | G | W | G | W | G |
| R | W | R | W | B | W |
| W | B | W | B | W | B |

(5) EXAMPLE 5 OF IMAGE SENSOR PIXEL ARRAY (4×6 CYCLES)

| W | G | W | B | W | R |
|---|---|---|---|---|---|
| G | W | B | W | R | W |
| W | R | W | G | W | B |
| R | W | G | W | B | W |

(6) EXAMPLE 6 OF IMAGE SENSOR PIXEL ARRAY (6×2 CYCLES)

| R | W | G | W | B | W |
|---|---|---|---|---|---|
| W | R | W | G | W | B |

(7) EXAMPLE 7 OF IMAGE SENSOR PIXEL ARRAY (2×6 CYCLES)

| R | W |
|---|---|
| W | R |
| G | W |
| W | G |
| B | W |
| W | B |

IMAGE PROCESSING APPARATUS, IMAGE DEVICE, IMAGE PROCESSING METHOD, AND PROGRAM FOR REDUCING NOISE OR FALSE COLORS IN AN IMAGE

CROSS REFERENCE TO RELATED APPLICATIONS

This application is a continuation of and claims the benefit under 35 U.S.C. § 120 of U.S. patent application Ser. No. 14/384,835, titled "IMAGE PROCESSING APPARATUS, IMAGING DEVICE, IMAGE PROCESSING METHOD, AND PROGRAM FOR REDUCING NOISE OR FALSE COLORS IN AN IMAGE," filed on Sep. 12, 2014, which is the National Stage of International Application No. PCT/JP2012/083615, filed in the Japanese Patent Office as a Receiving Office on Dec. 26, 2012, which claims the priority benefit of Japanese Patent Application Number JP 2012-070538, filed in the Japanese Patent Office on Mar. 27, 2012. Each of these applications is hereby incorporated by reference in its entirety.

TECHNICAL FIELD

The present disclosure relates to an image processing apparatus, an imaging device, an image processing method, and a program. In particular, the present disclosure relates to an image processing apparatus, an imaging device, an image processing method, and a program which realizes image generation for reducing noise or false colors included in an image.

BACKGROUND ART

A solid-state imaging device such as a CCD image sensor and a complementary metal oxide semiconductor (CMOS) image sensor which are used in a video camera and a digital still camera accumulates charges according to an amount of incident light therein, and performs photoelectric conversion to output an electric signal corresponding to the accumulated charges. A color filter is installed in each imaging device in order to individually accumulate a specific wavelength, that is, a signal corresponding to a specific color, per each pixel unit. For example, a filter having a Bayer array configured to include each color of RGB is frequently used.

On the other hand, in recent years, a miniaturized and pixel-increased imaging device causes a pixel to progressively become hyperfine. The imaging device having this high density pixel is essential to capture a high resolution image.

However, there is a problem in that the imaging device having this high density pixel can accumulate fewer charge amounts per one pixel, thereby relatively increasing a noise amount included in each pixel signal.

Furthermore, for example, PTL 1 (Japanese Unexamined Patent Application Publication No. 2006-253876) has proposed a configuration in which a high dynamic range image is generated by changing the exposure time for each pixel unit by using the imaging device having the high density pixel, by simultaneously acquiring a long-period exposure image and a short-period exposure image, and by synthesizing multiple images whose exposure periods are different from each other.

An imaging method according to this technique has a problem in that when any pixel in the long-period exposure and the short-period exposure cannot be effectively used, the noise amount relatively increases as compared to the technique in the related art. For example, in a case of a dark scene, the noise amount of the short-period exposure image increases, and thus, the image is generated by using only the long-period exposure image. In this case, the image is generated by using only half of the pixels as compared to the technique in the related art, thereby resulting in degraded resolution or increased noise.

PTL 2 (Japanese Unexamined Patent Application Publication No. 2004-304706) and PTL 3 (U.S. Patent Application Publication No. 2007/0024879) have proposed an imaging device configuration having an RGBW array in which a white (W) pixel transmitting whole wavelength light is added to an RGB array, in order to increase a charge accumulation amount for each pixel.

The charge accumulation amount for each pixel is increased by setting the W pixel in addition to the RGB, thereby reducing the relative noise amount included in the pixel signal.

However, the RGBW array disclosed in these PTLs is configured so that if the W pixel is added thereto, pixel density of the other color pixels is considerably degraded. Specifically, in a case of the R pixel or the B pixel, only one pixel exists in every eight pixels. Therefore, a problem arises in that color resolution is degraded, color noise is increased, and an image quality is degraded.

Even if the configurations disclosed in PTLs 1, 2 and 3 are combined with one another, the color resolution is degraded and the color noise is increased. No configuration can solve the problem of the degraded color resolution and the increased color noise which result from low pixel density, since only one pixel exists in every 16 pixels in a case of the R pixel and the B pixel in the long-period exposure and the R pixel and the B pixel in the short-period exposure.

CITATION LIST

Patent Literature

PTL 1: Japanese Unexamined Patent Application Publication No. 2006-253876

PTL 2: Japanese Unexamined Patent Application Publication No. 2004-304706

PTL 3: U.S. Patent Application Publication No. 2007/0024879

SUMMARY OF INVENTION

Technical Problem

The present disclosure is made in view of the above-described problems, for example, and aims to provide an image processing apparatus, an imaging device, an image processing method, and a program which can reduce color noise or false colors while having a high density pixel array.

Solution to Problem

According to a first aspect of the present disclosure, there is provided an image processing apparatus including an image sensor that has an RGBW array including an RGB pixel which is a light receiving element corresponding to wavelength light of each RGB color and a W pixel which is a light receiving element receiving substantially all RGB wavelength light, and an image processing unit that performs image processing by inputting a sensor image formed of an RGBW pixel signal output from the image sensor. The image sensor has a periodic array of a unit composition formed of each RGBW pixel, and has an array in which composition ratios of each RGB pixel within the unit composition are adapted to be the same as each other. The image processing unit converts a pixel array of the sensor image formed of the RGBW pixel signal, and performs at least either array conversion processing for generating an RGB array image or signal processing for generating each RGB image signal in which all RGB pixel values are set for each pixel position of the sensor image.

Furthermore, in the first aspect of the image processing apparatus of the present disclosure, the image processing unit converts the pixel array of the sensor image formed of the RGBW pixel signal, and has an array conversion unit which generates the RGB array image formed of a Bayer array. The array conversion unit has a W pixel interpolation unit which generates a whole W pixel image signal by setting the W pixel at an RGB pixel position of the sensor image, an RGBW pixel generation unit which generates an RGBW corresponding low frequency signal which is a low frequency signal of each RGBW pixel signal at each pixel position of the sensor image, and a correlation processing unit which inputs the whole W pixel image signal and the RGBW corresponding low frequency signal, and which performs array conversion for a composition pixel of the sensor image and generates an RGB image of the Bayer array by calculating a pixel value based on an estimation in which the W pixel and the RGB pixel have a positive correlation.

Furthermore, in the first aspect of the image processing apparatus of the present disclosure, the W pixel interpolation unit detects an edge direction by applying a pixel value of the W pixel of the sensor image, and determines a W pixel value at an interpolation pixel position by regarding a pixel present in the detected edge direction as a reference pixel.

Furthermore, in the first aspect of the image processing apparatus of the present disclosure, the image processing unit has a demosaic processing unit which performs demosaic processing on the sensor image and generates each RGB image signal in which all RGB pixel values are set for each pixel position of the sensor image. The demosaic processing unit has a W pixel interpolation unit which generates a whole W pixel image signal by setting the W pixel at an RGB pixel position of the sensor image, an RGBW pixel generation unit which generates an RGBW corresponding low frequency signal which is a low frequency signal of each RGBW pixel signal at each pixel position of the sensor image, and a correlation processing unit which inputs the whole W pixel image signal and the RGBW corresponding low frequency signal, and which generates each RGB pixel signal in which all RGB pixel values are set for each pixel position of the sensor image, by calculating a pixel value based on an estimation in which the W pixel and the RGB pixel have a positive correlation.

Furthermore, in the first aspect of the image processing apparatus of the present disclosure, the W pixel interpolation unit detects an edge direction by applying a pixel value of the W pixel of the sensor image, and determines a W pixel value at an interpolation pixel position by regarding a pixel present in the detected edge direction as a reference pixel.

Furthermore, in the first aspect of the image processing apparatus of the present disclosure, the image processing unit has a linear matrix processing unit which performs pixel value conversion to which a preset matrix is applied, on each RGB image signal generated by the demosaic processing unit.

Furthermore, in the first aspect of the image processing apparatus of the present disclosure, the image processing unit has a demosaic processing unit which performs demosaic processing on the sensor image and generates each RGBW image signal in which all RGB and W pixel values are set for each pixel position of the sensor image. The demosaic processing unit has a W pixel interpolation unit which generates a whole W pixel image signal by setting the W pixel at an RGB pixel position of the sensor image, an RGBW pixel generation unit which generates an RGBW corresponding low frequency signal which is a low frequency signal of each RGBW pixel signal at each pixel position of the sensor image, and a correlation processing unit which inputs the whole W pixel image signal and the RGBW corresponding low frequency signal, and which generates each RGB pixel signal in which all RGB pixel values are set for each pixel position of the sensor image, by calculating a pixel value based on an estimation in which the W pixel and the RGB pixel have a positive correlation.

Furthermore, in the first aspect of the image processing apparatus of the present disclosure, the image processing unit has a linear matrix processing unit which performs pixel value conversion to which a preset matrix is applied, on each RGBW image signal generated by the demosaic processing unit.

Furthermore, in the first aspect of the image processing apparatus of the present disclosure, the image sensor is configured to output an image having an added pixel value of the same color pixel values which are adjacent to each other in an oblique direction, as the sensor image. The image processing unit has an array conversion unit which converts a pixel array of the sensor image configured to have the added pixel value and formed of the RGBW pixel signal, and which generates an RGB array image formed of a Bayer array. The array conversion unit has an RGBW pixel generation unit which generates an RGBW corresponding low frequency signal which is a low frequency signal of each RGBW pixel signal at each pixel position of the sensor image, and a correlation processing unit which inputs the whole W pixel image signal output as the sensor image and the RGBW corresponding low frequency signal, and which performs array conversion on a composition pixel of the sensor image and generates an RGB image of the Bayer array, by calculating a pixel value based on an estimation in which the W pixel and the RGB pixel have a positive correlation.

Furthermore, in the first aspect of the image processing apparatus of the present disclosure, the image sensor is configured to output an image including a long-period exposure pixel and a short-period exposure pixel which are set according to a control of a control unit, as the sensor image. The image processing unit has an array conversion unit which generates a high dynamic range (HDR) image by applying the sensor image including the long-period exposure pixel and the short-period exposure pixel, and which generates an RGB array HDR image formed of a Bayer array by converting the pixel array. The array conversion unit has a W pixel interpolation unit which generates a whole W pixel long-period exposure images in which a long-period exposure W pixel is set for all pixel positions, by applying a long-period exposure pixel signal of the sensor image, and which generates a whole W pixel short-period exposure image in which a short-period exposure W pixel is set for all pixel positions, by applying a short-period exposure pixel signal of the sensor image, an RGBW pixel generation unit which generates a long-period exposure RGBW corresponding low frequency signal which is a low frequency signal of each long-period exposure RGBW pixel signal at each pixel position, by applying the long-period exposure pixel signal of the sensor image, and which generates a short-period exposure RGBW corresponding low frequency signal which is a low frequency signal of each short-period exposure RGBW pixel signal at each pixel position, by applying the short-period exposure pixel signal of the sensor image; an HDR composition processing unit which generates a whole W pixel image signal as the high dynamic range (HDR) image and the RGBW corresponding low frequency signal by inputting the whole W pixel long-period exposure image, the whole W pixel short-period exposure image, the long-period exposure RGBW corresponding low frequency signal, and the short-period exposure RGBW corresponding low frequency signal, and a correlation processing unit which inputs the whole W pixel image signal and the RGBW corresponding low frequency signal as the high dynamic range (HDR) image generated by the HDR composition processing unit, and which performs array conversion on a composition pixel of the sensor image and generates an RGB image of the Bayer array, by calculating a pixel value based on an estimation in which the W pixel and the RGB pixel have a positive correlation.

Furthermore, in the first aspect of the image processing apparatus of the present disclosure, the HDR composition processing unit calculates a composition pixel value of the high dynamic range (HDR) image through blend processing of the short-period exposure pixel signal and the long-period exposure pixel signal which are obtained after gain adjustment according to an exposure ratio.

Furthermore, in the first aspect of the image processing apparatus of the present disclosure, the W pixel interpolation unit detects an edge direction by applying the long-period exposure W pixel signal of the sensor image, and generates the whole W pixel long-period exposure image in which the long-period exposure W pixel is set for all pixel positions by determining a W pixel value at an interpolation pixel position by regarding a pixel present in the detected edge direction as a reference pixel. The W pixel interpolation unit detects an edge direction by applying the short-period exposure W pixel signal of the sensor image, and generates the whole W pixel short-period exposure image in which the short-period exposure W pixel is set for all pixel positions by determining a W pixel value at an interpolation pixel position by regarding a pixel present in the detected edge direction as a reference pixel.

Furthermore, in the first aspect of the image processing apparatus of the present disclosure, in the image sensor, two rows of a long-period exposure pixel row and a short-period exposure pixel row are alternately set according to a control of a control unit. The image sensor is configured to output an image which is formed of a long-period exposure pixel signal having an added pixel value of the same color pixel values which are adjacent to each other in an oblique direction of the long-period exposure pixel row in a unit of two rows, and a short-period exposure pixel signal having an added pixel value of the same color pixel values which are adjacent to each other in an oblique direction of the short-period exposure pixel row in a unit of two rows, as the sensor image. The image processing unit has an array conversion unit which generates a high dynamic range (HDR) image by applying the sensor image including the long-period exposure pixel and the short-period exposure pixel, and which generates an RGB array HDR image formed of a Bayer array by converting the pixel array. The array conversion unit has a W pixel interpolation unit which generates a whole W pixel long-period exposure image in which a long-period exposure W pixel is set for all pixel positions, by applying a long-period exposure pixel signal of the sensor image, and which generates a whole W pixel short-period exposure image in which a short-period exposure W pixel is set for all pixel positions, by applying a short-period exposure pixel signal of the sensor image, an RGBW pixel generation unit which generates a long-period exposure RGBW corresponding low frequency signal which is a low frequency signal of each long-period exposure RGBW pixel signal at each pixel position, by applying the long-period exposure pixel signal of the sensor image, and which generates a short-period exposure RGBW corresponding low frequency signal which is a low frequency signal of each short-period exposure RGBW pixel signal at each pixel position, by applying the short-period exposure pixel signal of the sensor image, an HDR composition processing unit which generates a whole W pixel image signal as the high dynamic range (HDR) image and the RGBW corresponding low frequency signal by inputting the whole W pixel long-period exposure image, the whole W pixel short-period exposure image, the long-period exposure RGBW corresponding low frequency signal, and the short-period exposure RGBW corresponding low frequency signal, and a correlation processing unit which inputs the whole W pixel image signal and the RGBW corresponding low frequency signal as the high dynamic range (HDR) image generated by the HDR composition processing unit, and which performs array conversion on a composition pixel of the sensor image and generates an RGB image of the Bayer array, by calculating a pixel value based on an estimation in which the W pixel and the RGB pixel have a positive correlation.

Furthermore, in the first aspect of the image processing apparatus of the present disclosure, the HDR composition processing unit calculates a composition pixel value of the high dynamic range (HDR) image through blend processing of the short-period exposure pixel signal and the long-period exposure pixel signal which are obtained after gain adjustment according to an exposure ratio.

Furthermore, in the first aspect of the image processing apparatus of the present disclosure, the W pixel interpolation unit detects an edge direction by applying the long-period exposure W pixel signal of the sensor image, and generates the whole W pixel long-period exposure image in which the long-period exposure W pixel is set for all pixel positions by determining a W pixel value at an interpolation pixel position by regarding a pixel present in the detected edge direction as a reference pixel. The W pixel interpolation unit detects an edge direction by applying the short-period exposure W pixel signal of the sensor image, and generates the whole W pixel short-period exposure image in which the short-period exposure W pixel is set for all pixel positions by determining a W pixel value at an interpolation pixel position by regarding a pixel present in the detected edge direction as a reference pixel.

Furthermore, according to a second aspect of the present disclosure, there is provided an imaging device including an RGBW array including an RGB pixel which is a light receiving element corresponding to wavelength light of each RGB color and a W pixel which is a light receiving element receiving substantially all RGB wavelength light. The image sensor has a periodic array of a unit composition formed of each RGBW pixel, and has an array in which composition ratios of each RGB pixel within the unit composition are adapted to be the same as each other.

Furthermore, in the second aspect of the imaging device of the present disclosure, the imaging device has the periodic array in which 6×6 pixels, 6×4 pixels, or 6×2 pixels are adapted to be the unit composition. The composition ratio of each RGBW pixel within the unit composition is 1:1:1:3.

Furthermore, in the second aspect of the imaging device of the present disclosure, the imaging device has a composition in which each RGBW pixel is arranged in each column and each row.

Furthermore, according to a third aspect of the present disclosure, there is provided an image processing method executed in an image processing apparatus. The image processing apparatus has an image processing unit that has a periodic array of a unit composition formed of each RGBW pixel including an RGB pixel which is a light receiving element corresponding to wavelength light of each RGB color and a W pixel which is a light receiving element receiving substantially all RGB wavelength light, and that performs image processing on a sensor image which is an output of an imaging device having an array in which composition ratios of each RGB pixel within the unit composition are adapted to be the same as each other. The image processing unit converts a pixel array of the sensor image formed of the RGBW pixel signal, and performs at least either array conversion processing for generating an RGBW array image or signal processing for generating each RGB image signal in which all RGB pixel values are set for each pixel position of the sensor image.

Furthermore, according to a fourth aspect of the present disclosure, there is provided a program that causes an image processing apparatus to perform image processing. The image processing apparatus has an image processing unit that has a periodic array of a unit composition formed of each RGBW pixel including an RGB pixel which is a light receiving element corresponding to wavelength light of each RGB color and a W pixel which is a light receiving element receiving substantially all RGB wavelength light, and that performs image processing on a sensor image which is an output of an imaging device having an array in which composition ratios of each RGB pixel within the unit composition are adapted to be the same as each other. The image processing unit converts a pixel array of the sensor image formed of the RGBW pixel signal, and performs at least either array conversion processing for generating an RGBW array image or signal processing for generating each RGB image signal in which all RGB pixel values are set for each pixel position of the sensor image.

The program according to the present disclosure is a program which can be provided, for example, for an information processing apparatus or a computer system which can execute various program codes, by a storage medium and a communication medium providing the program in a computer-readable format. By providing this program in the computer-readable format, a process according to the program executed on the information processing apparatus or the computer system can be realized.

An object, features, and advantageous effects of the present disclosure will become apparent from more detailed description based on the following embodiments of the present disclosure and the accompanying drawings.

Advantageous Effects of Invention

According to the configuration of the embodiments of the present disclosure, there are provided an apparatus and a method which generate an RGB image having less color noise or fewer false colors by inputting an RGBW image.

Specifically, the apparatus has an image sensor having an RGBW array, and an image processing unit which performs image processing by inputting a sensor image formed of an RGBW pixel signal output from the image sensor. The image sensor has a periodic array of a unit composition formed of each RGBW pixel, and has an array in which composition ratios of each RGB pixel within the unit composition are adapted to be the same as each other. The image processing unit converts a pixel array of the sensor image formed of the RGBW pixel signal, and performs at least either array conversion processing for generating an RGB array image or signal processing for generating each RGB image signal in which all RGB pixel values are set for each pixel position of the sensor image.

In the configuration of the present disclosure, the number of respective RGB pixels per unit composition of the image sensor is uniformly set. Accordingly, when a pixel value of each RGB color with respect to each pixel position is set, it is possible to sufficiently obtain the pixel value of each color from a reference area. Therefore, it is possible to very accurately perform a setting process on each RGB color with respect to each pixel position, and thus, it is possible to generate an RGB image having less color noise or fewer false colors.

BRIEF DESCRIPTION OF DRAWINGS

FIG. 2 is a diagram for illustrating a pixel array of an image sensor (imaging device) and a Bayer array after array conversion.

FIG. 8 is a diagram for illustrating a process of the RGBW pixel generation unit.

FIG. 26 is a diagram for illustrating an example of W pixel interpolation processing.

FIG. 35 is a diagram for illustrating an example of W pixel interpolation processing.

FIG. 36 is a diagram for illustrating a pixel array example of an image sensor (imaging device).

DESCRIPTION OF EMBODIMENTS

Hereinafter, an image processing apparatus, an imaging device, an imaging processing method, and a program according to the present disclosure will be described with reference to the drawings. Description will be made in the following order.

1. Configuration and Processing of Image Processing Apparatus, and Configuration of Imaging Device according to First Embodiment
2. Configuration and Processing of Image Processing Apparatus according to Second Embodiment
3. Configuration and Processing of Image Processing Apparatus according to Third Embodiment
4. Configuration and Processing of Image Processing Apparatus according to Fourth Embodiment
5. Configuration and Processing of Image Processing Apparatus according to Fifth Embodiment
6. Configuration and Processing of Image Processing Apparatus according to Sixth Embodiment
7. Example of Pixel Array of Image Sensor (Imaging Device)
8. Summary of Configurations according to Present Disclosure

[1. Configuration and Process of Image Processing Apparatus, and Configuration of Imaging Device According to First Embodiment]

First, the entire configuration of a first embodiment of an image processing apparatus and a configuration of an imaging device according to the present disclosure will be described. In the following embodiment, an imaging apparatus will be described as one representative example of the image processing apparatus.

Figure 1:
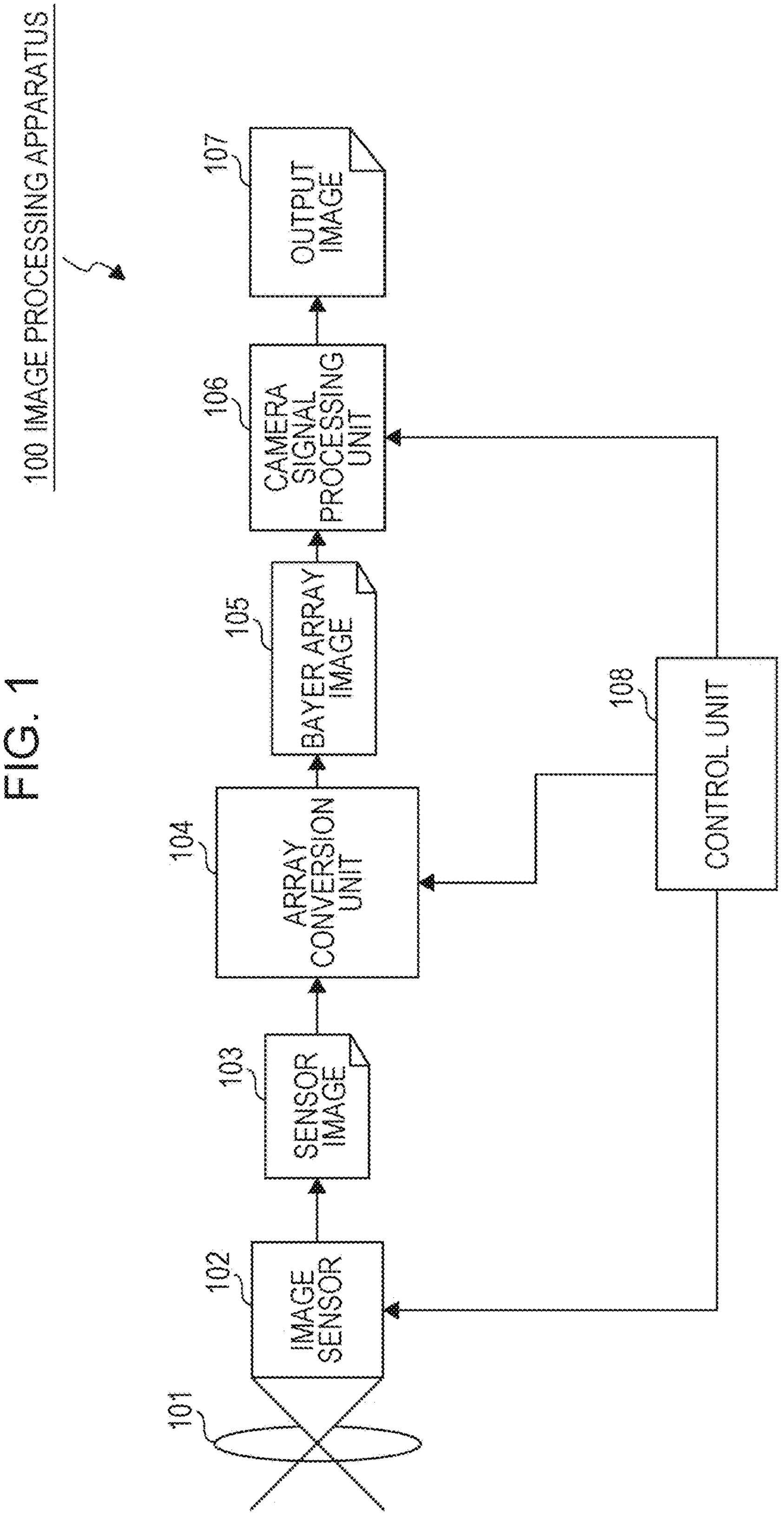
FIG. 1 is a diagram for illustrating a configuration example of an imaging apparatus according to a first embodiment.

FIG. 1 illustrates a configuration example of an image processing apparatus 100 serving as the imaging apparatus.

Light incident through an optical lens 101 is photoelectrically converted by an image sensor (imaging device) 102, and a sensor output image 103 is output from the image sensor 102. The image sensor 102 is configured to have a CMOS, or the like, for example.

In the present embodiment, as illustrated in FIG. 2(*a*), a pixel array of the image sensor (imaging device) 102 has an RGBW array including a W pixel which transmits substantially all wavelength region light of visible light and accumulates charges, in addition to an RGB pixel which transmits light corresponding to wavelength light of each RGB color and accumulates charges.

As illustrated in FIG. 2(*a*), sequentially from a first row, (first row) RWGWBW is repeated,
(second row) WRWGWB is repeated,
(third row) GWBWRW is repeated,
(fourth row) WGWBWR is repeated,
(fifth row) BWRWGW is repeated, and
(sixth row) WBWRWG is repeated.

Thereafter, the above-described first to sixth rows are repeated from the seventh row.

Each row and each column are configured so that one W pixel is interposed therebetween and each RGB pixel is sequentially arranged. Within 6×6=36 pixels illustrated in FIG. 2, ½ is set to be 18 Nos. of W pixels, ⅙ is set to be 6 Nos. of R pixels, ⅙ is set to be 6 Nos. of G pixels, and ⅙ is set to be 6 Nos. of B pixels.

That is, in the image sensor 102, the number of respective RGB pixels per unit composition (6×6 pixels in an example illustrated in FIG. 2(*a*)) is uniformly set.

The image sensor (imaging device) 102 illustrated in FIG. 1 has the RGBW array illustrated in FIG. 2. The sensor output image 103 output from the image sensor 102 is input to an array conversion unit 104. A block subsequent to the array conversion unit 104 is equivalent to an image processing unit which performs image processing on the sensor output image 103.

The array conversion unit 104 converts the pixel array of the sensor image 103 having the RGBW array illustrated in FIG. 2(*a*), and generates and outputs a Bayer array image 105 to a camera signal processing unit 106.

That is, the array conversion unit 104 performs conversion processing into the Bayer array illustrated in FIG. 2(*b*).

The camera signal processing unit 106 performs signal processing, for example, general camera signal processing such as white balance adjustment, gamma correction, and demosaic processing, for the Bayer array image 105, and generates an output image 107.

A control unit 108 generates control signals for an exposure control of the image sensor 102, a processing control of the array conversion unit 104, and a processing control of the camera signal processing unit 106, and supplies the signals to each of these configuration units. The control unit 108 performs overall controls on processes from image capturing to output image generation. For example, the control unit 108 includes a CPU having a program executing function, and performs overall controls on the processes executed in the imaging apparatus in accordance with a program stored in a memory (not illustrated).

Figure 3:
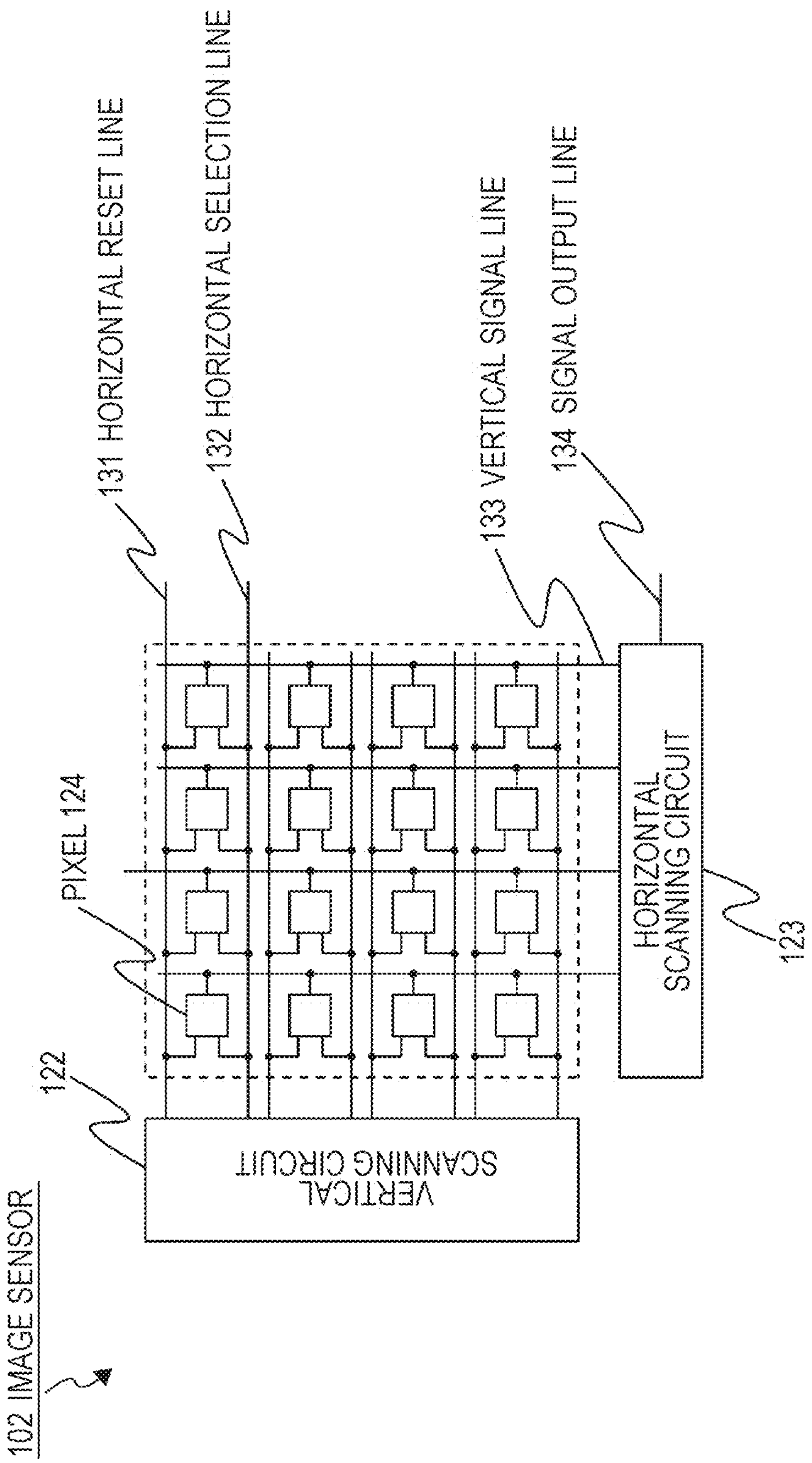
FIG. 3 is a diagram for illustrating a configuration and a process of an image sensor.

FIG. 3 illustrates a configuration example of the image sensor 102. FIG. 3 illustrates a partial configuration of a CMOS-type image sensor 102. A rectangular-shaped region corresponds to one pixel, and represents a pixel 124.

The image sensor 102 is configured to have a vertical scanning circuit 122, a horizontal scanning circuit 123, and multiple pixels 124 arranged in an array.

In the pixel, charges accumulated in a photodiode are output to a vertical signal line 133 as a signal current via an amplifier transistor and a transfer transistor.

The signal current is supplied to the horizontal scanning circuit 123. After predetermined signal processing is performed, the signal current is output outward via a signal output line 134.

A horizontal reset line 131 is a line which supplies a signal for resetting the accumulated charges of the pixel in each horizontal direction. A horizontal selection line 132 is a line which supplies a control signal of output timing for outputting the accumulated charges of each pixel after the resetting, as each pixel signal.

That is, a time period from horizontal resetting timing to horizontal selection timing is a charge accumulation time period.

This charge accumulation time period can be controlled in each horizontal line unit, that is, in a row unit. For example, it is possible to perform long-period exposure and short-period exposure for every other row. Performing this exposure control allows a long-period exposure image and a short-period exposure image to be simultaneously acquired in one imaging process. In this manner, it is also possible to generate a high dynamic range image in which a dynamic range is expanded by synthesizing these images.

Next, a configuration and a processing example of the array conversion unit 104 of the image processing apparatus 100 illustrated in FIG. 1 will be described with reference to FIG. 4 and the subsequent drawings.

The array conversion unit 104 performs array conversion on the sensor image 103, that is, the sensor image 103 having the RGBW pixel array illustrated in FIG. 2(*a*), and generates and outputs the Bayer array image 105 having the Bayer array illustrated in FIG. 2(*b*), to the camera signal processing unit 106.

Figure 4:
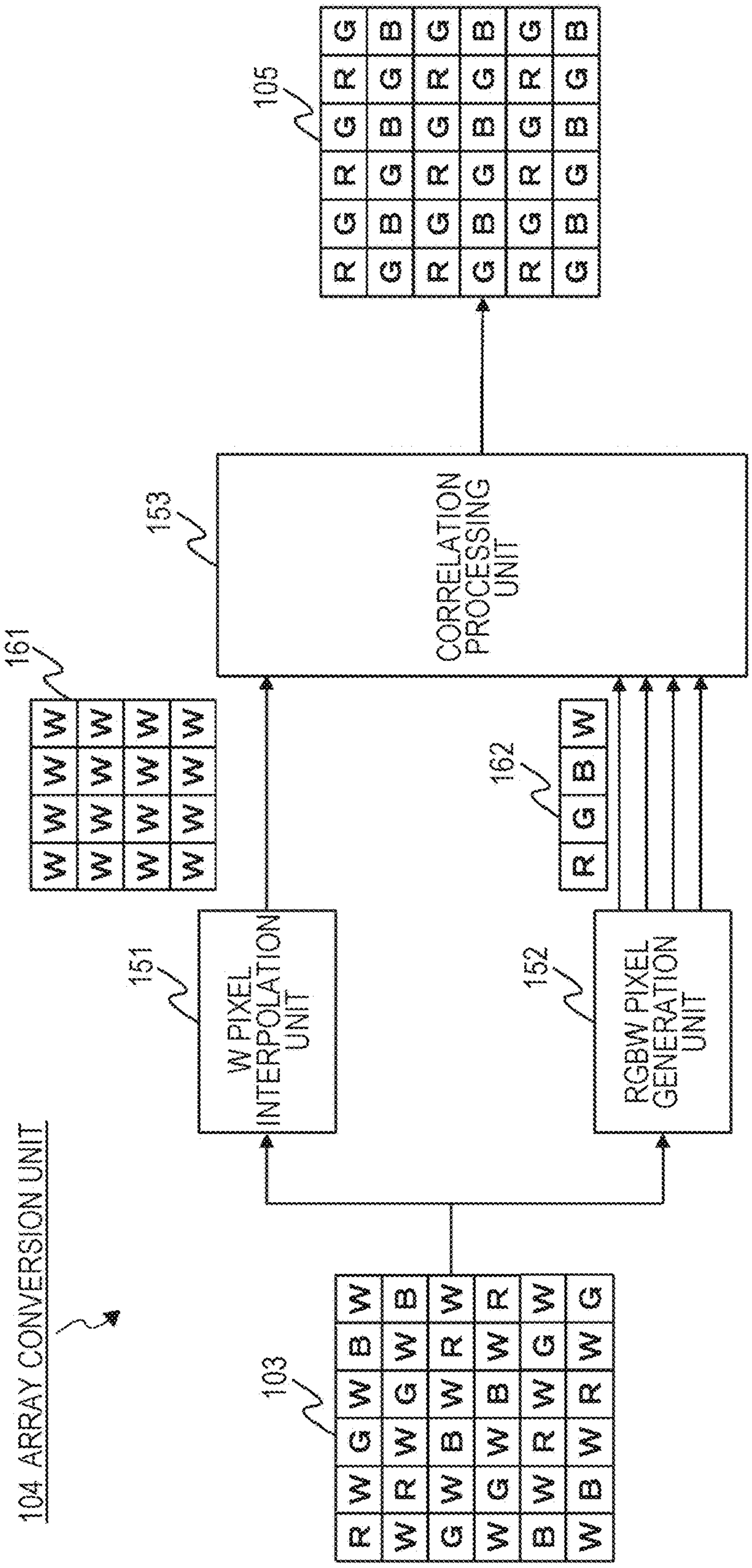
FIG. 4 is a diagram for illustrating a configuration and a process of an array conversion unit.

FIG. 4 illustrates a configuration example of the array conversion unit 104.

As illustrated in FIG. 4, the array conversion unit 104 has a W pixel interpolation unit 151, an RGBW pixel generation unit 152, and a correlation processing unit 153.

The array conversion unit 104 inputs the sensor image 103 having the RGBW array, and generates and outputs the Bayer array image 105 having an RGB array.

The W pixel interpolation unit 151 sets the W pixel at a position of the pixel other than the W pixel of the sensor image 103 having the RGBW array, and generates a whole W pixel image signal 161 in which all pixels are the W pixels.

The RGBW pixel generation unit 152 generates an RGBW corresponding LPF signal 162 as a low frequency signal (LPF signal) of each RGBW pixel signal at each pixel position of the sensor image 103 having the RGBW array.

The correlation processing unit 153 inputs the whole W pixel image signal 161 and the RGBW corresponding LPF signal 162, and generates and outputs the Bayer array image 105 having the RGB array by applying these input signals.

A configuration and a process of the W pixel interpolation unit 151 will be described with reference to FIG. 5.

The W pixel interpolation unit 151 inputs the sensor image 103 formed of the RGBW pixel array, and performs W pixel interpolation processing for setting the W pixel for the RGB pixel within the RGBW pixel array.

Figure 5:
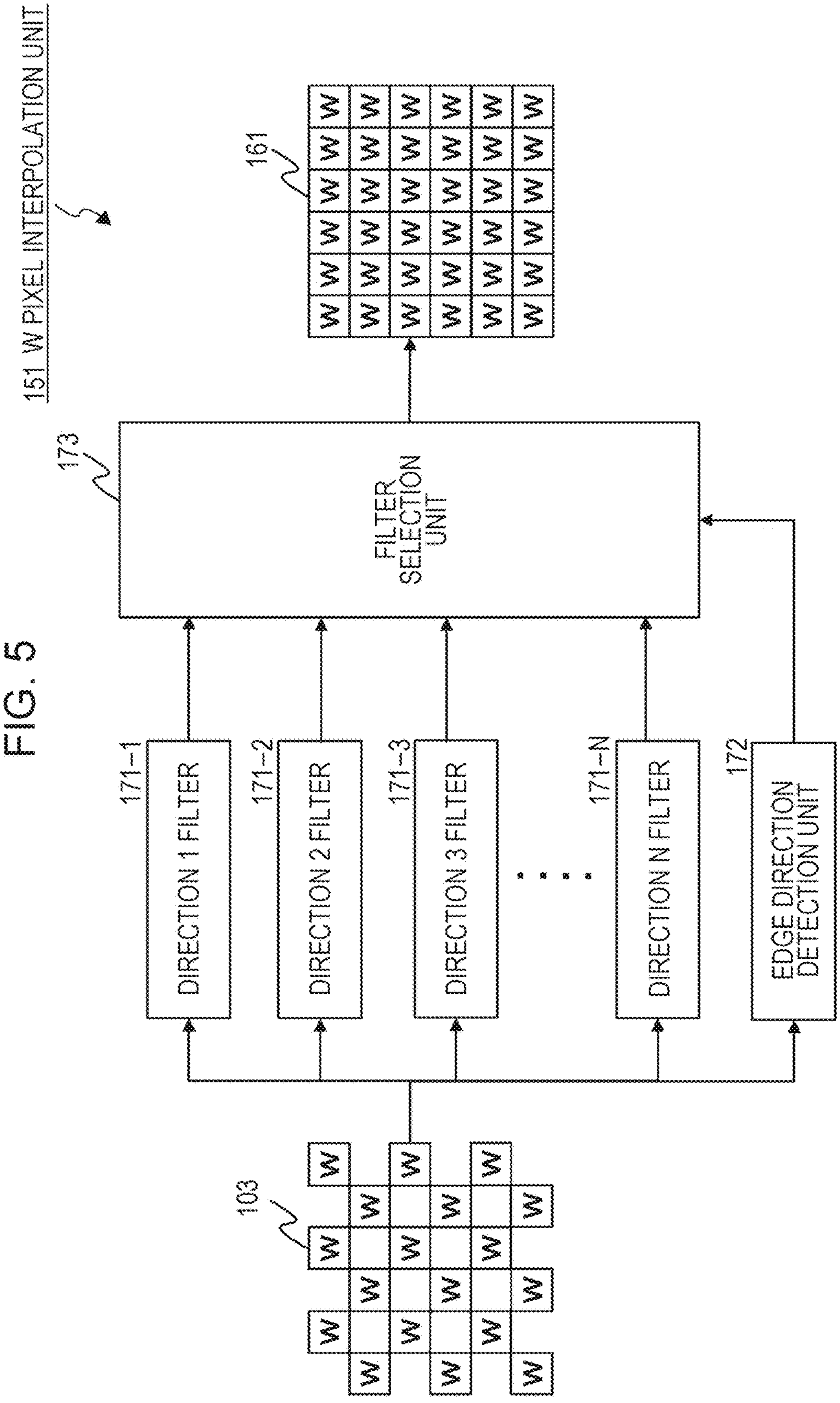
FIG. 5 is a diagram for illustrating a configuration and a process of a W pixel interpolation unit.

As illustrated in FIG. 5, the W pixel interpolation unit 151 has multiple direction filters 171-1 to 171-N which perform filter processing such as processing in which pixel values of the W pixel present in multiple different directions are averaged as a reference pixel, an edge direction detection unit 172 which detects an edge direction, and a filter selection unit 173 which determines an interpolation pixel value by means of filter selection.

For example, based on the sensor image 103, a predetermined reference area (for example, k pixel×k pixel) is set whose main pixel is the RGB pixel serving as an interpolation pixel which is a processing target pixel. The edge direction detection unit 172 detects the edge direction based on a pixel value in the reference area. The filter selection unit 173 selects a filter for performing filter processing in which the W pixels present along the edge direction, that is, in a direction having a slight gradient of the pixel value are set to be the reference pixel, and calculates the W pixel value serving as the interpolation pixel value by applying the selected filter. For example, an average value of the pixel values of the W pixels present in the direction having the slight gradient is calculated, and the W pixel value is set for the RGB pixel position of a processing target pixel position.

Figure 6:
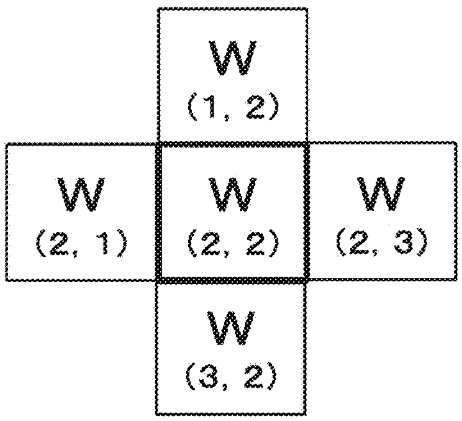
FIG. 6 is a diagram for illustrating an example of W pixel interpolation processing.

FIG. 6 illustrates a processing example when the number N of the applicable direction filters is two, that is, two types of the vertical direction and the horizontal direction.

The interpolation pixel position is a pixel position of W (2, 2) illustrated in FIG. 6. The pixel position indicates a pixel in which any pixel value of the RGB pixels is set in the sensor image 103. The W pixels: W (1, 2) and W (3, 2) are present in the vertical direction, and W pixels: W (2, 1) and W (2, 3) are present in the horizontal direction.

When the pixel value of each W pixel (x, y) is set to be W (x, y), the edge direction detection unit 172 determines whether or not the following equation is satisfied.

$$|W(1,2)-W(3,2)|\leq W(2,1)-W(2,3)|$$

When the equation is satisfied, it is determined that the edge direction is the vertical direction. The filter selection unit 173 selects the pixel value of the pixel present in the vertical direction along the edge direction as a reference pixel, and performs filter processing, for example, average processing, based on the pixel value of the reference pixel. Specifically, for example, an interpolation pixel value W' (2, 2) is calculated according to the following equation.

$$W'(2,2)=(W(1,2)+W(3,2))/2$$

$$|W(1,2)-W(3,2)|>|W(2,1)-W(2,3)|$$

In addition, when the edge direction detection unit 172 determines that the above equation is satisfied, it is determined that the edge direction is the horizontal direction. The filter selection unit 173 selects the pixel value of the pixel present in the horizontal direction along the edge direction as the reference pixel, and performs the filter processing, for example, the average processing, based on the pixel value of the reference pixel. Specifically, for example, the interpolation pixel value W' (2, 2) is calculated according to the following equation.

$$W'(2,2)=(W(2,1)+W(2,3))/2$$

In this manner, the W pixel interpolation unit 151 generates the whole W pixel image signal 161 in which the W pixel is set in all pixels illustrated in FIG. 5.

Next, a configuration and a processing example of the RGBW pixel generation unit 152 in the array conversion unit 104 illustrated in FIG. 4 will be described with reference to FIG. 7 and the subsequent drawings.

The RGBW pixel generation unit 152 generates the RGBW corresponding LPF signal 162 as a low frequency signal (LPF signal) of each RGBW pixel signal at each pixel position of the sensor image 103 having the RGBW array.

Figure 7:
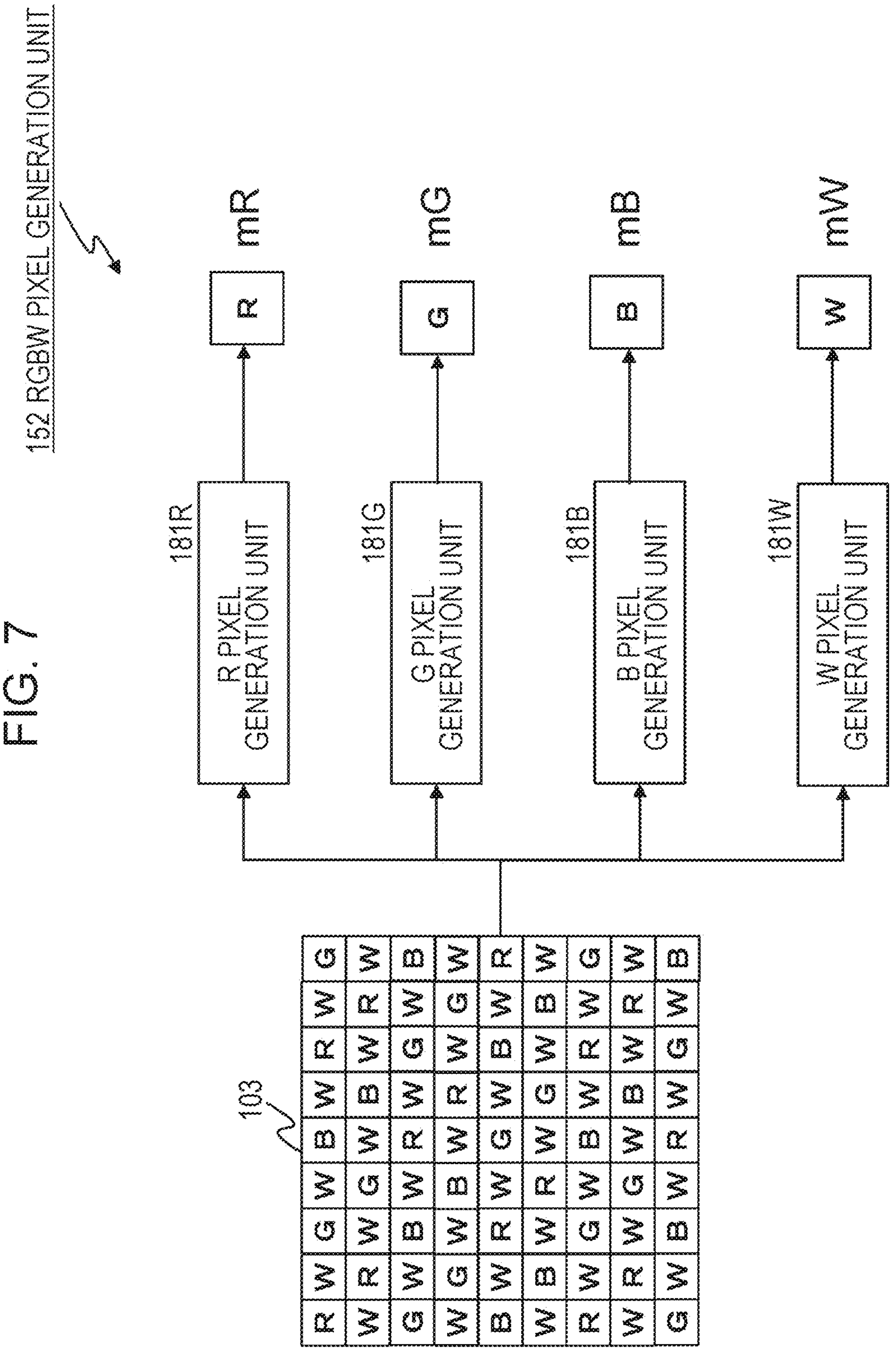
FIG. 7 is a diagram for illustrating a configuration and a process of an RGBW pixel generation unit.

As illustrated in FIG. 7, the RGBW pixel generation unit 152 has a configuration including an R pixel generation unit 181R generating an R average value (R low frequency signal) mR, a G pixel generation unit 181G generating a G average value (G low frequency signal) mG, a B pixel generation unit 181B generating a B average value (B low frequency signal) mB, and a W pixel generation unit 181W generating a W average value (W low frequency signal) mW.

Each processing unit generates the RGBW corresponding LPF signal 162 as the low frequency signal (LPF signal) at each pixel position of the conversion target pixel in the pixel array.

A specific processing example will be described with reference to FIG. 8.

For example, mR, mG, mB, and mW can be calculated according to the following (Equation 1).

[Expression 1]

$$mR = \frac{\sum_{i=1}^{K} Ri}{K} \quad \text{(Equation 1)}$$

$$mG = \frac{\sum_{i=1}^{L} Gi}{L}$$

$$mB = \frac{\sum_{i=1}^{M} Bi}{M}$$

$$mW = \frac{\sum_{i=1}^{N} Wi}{N}$$

In the above equation, K, L, M, and N represent the total number of respective colors included in a predetermined reference area having a preset size in which a main pixel is the processing target pixel. mR, mG, mB, and mW are equivalent to the average value of each color.

FIG. 8 illustrates an example of a reference area 185 when mR is calculated. When the reference area 185 illustrated in FIG. 8 is used, it is expressed by K=14.

In this manner, the RGBW pixel generation unit 152 generates the RGBW corresponding LPF signal 162 as the low frequency signal (LPF signal) of each RGBW pixel signal at each pixel position of the sensor image 103 having the RGBW array.

Next, a configuration and a processing example of the correlation processing unit 153 in the array conversion unit 104 illustrated in FIG. 4 will be described with reference to FIG. 9 and the subsequent drawings.

The correlation processing unit 153 inputs the whole W pixel image signal 161 generated by the W pixel interpolation unit 151 and the RGBW corresponding LPF signal 162 generated by the RGBW pixel generation unit 152, and generates and outputs the Bayer array image 105 having the RGB array by applying these input signals.

Figure 9:
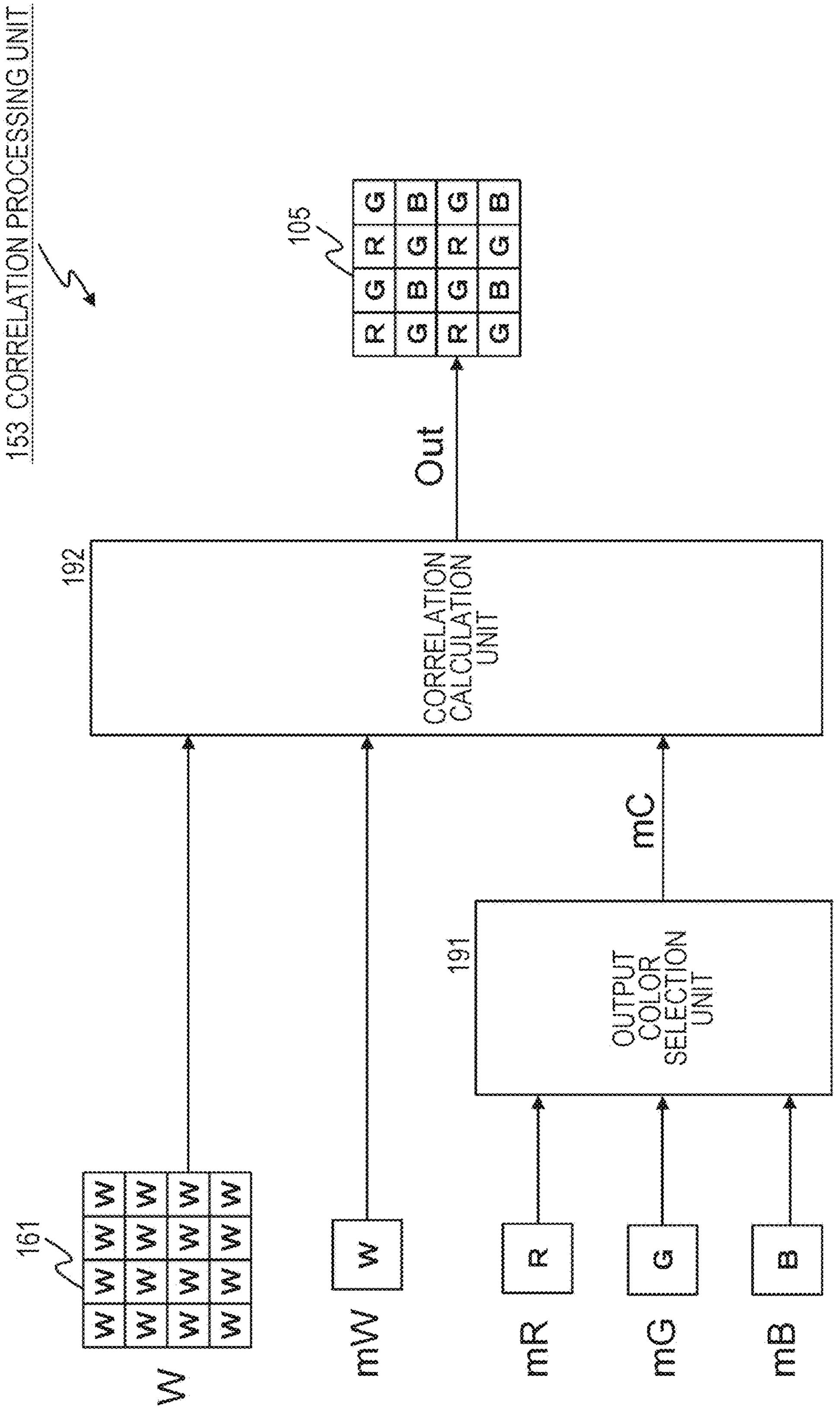
FIG. 9 is a diagram for illustrating a configuration and a process of a correlation processing unit.

As illustrated in FIG. 9, the correlation processing unit 153 has an output color selection unit 191 and a correlation calculation unit 192.

The output color selection unit 191 selects an output color according to which pixel position in the output Bayer array image 105 the processing target pixel position corresponds to. The output color selection unit 191 selects any one RGB output color, and outputs the output color to the correlation calculation unit 192 by selecting any one among mR, mG, and mB which are the RGBW corresponding LPF signals 162 generated by the RGBW pixel generation unit 152.

mC illustrated in the drawing represents any one among mR, mG, and mB.

The correlation calculation unit 192 performs gain adjustment on a high frequency of the W pixel, and overlaps the high frequency with each color by utilizing a property in which the W pixel has a strong positive correlation with the R, G, and B pixels. For example, an output pixel value (Out) is calculated according to the following (Equation 2).

$$\text{Out}=mC+(W-mW)(mC/mW) \quad \text{(Equation 2)}$$

In this manner, the correlation processing unit 153 inputs the whole W pixel image signal 161 generated by the W pixel interpolation unit 151 and the RGBW corresponding LPF signal 162 generated by the RGBW pixel generation unit 152, and generates and outputs the Bayer array image 105 having the RGB array by applying these input signals.

The array conversion unit 104 illustrated in FIGS. 1 and 4 converts the pixel array of the sensor image 103 having the RGBW array illustrated in FIG. 2(*a*) through the processing, and generates and outputs the Bayer array image 105 to the camera signal processing unit 106 illustrated in FIG. 1.

In the subsequent processing, it is possible to perform processing which is the same as processing in the imaging apparatus in the related art. That is, the camera signal processing unit 106 performs the signal processing, for example, the general camera signal processing such as the white balance adjustment, the gamma correction, and the demosaic processing, for the Bayer array image 105, and generates the output image 107.

In the configuration of the present disclosure, the image sensor also has the configuration described with reference to FIG. 2(*a*), and the number of respective RGB pixels per unit composition is uniformly set. Accordingly, when the pixel value of each RGB color for each pixel position is set, it is possible to sufficiently acquire the pixel value of each color from the reference area. Therefore, it is possible to very accurately perform a setting process of each RGB color for each pixel position, and thus, it is possible to generate the RGB image having less color noise or fewer false colors.

[2. Configuration and Processing of Image Processing Apparatus According to Second Embodiment]

Next, a configuration and processing of an image processing apparatus according to a second embodiment of the present disclosure will be described.

Figure 10:
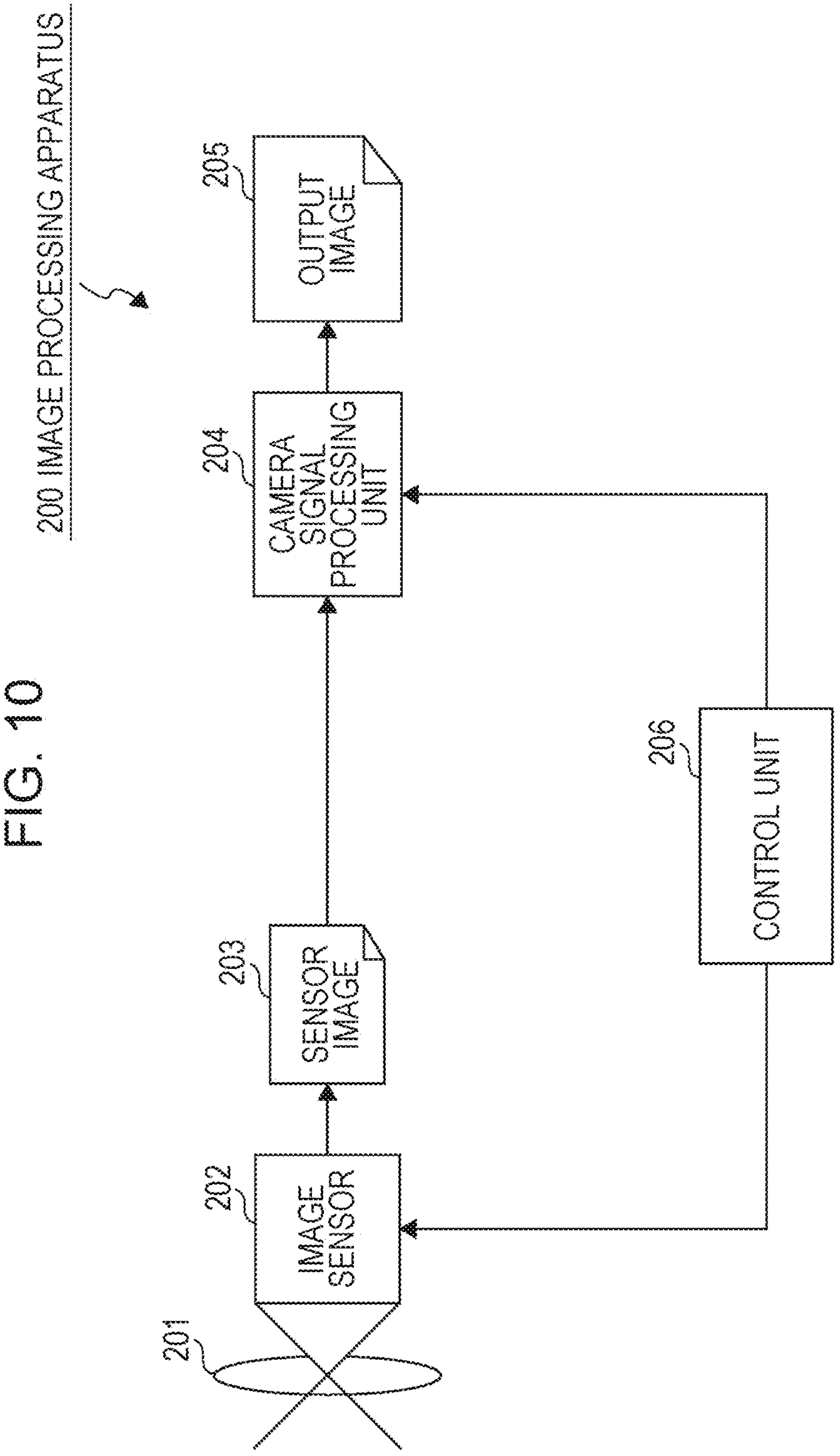
FIG. 10 is a diagram for illustrating a configuration example of the imaging apparatus according to the first embodiment.

FIG. 10 is a view illustrating a configuration example of an image processing apparatus 200 according to the second embodiment of the present disclosure. An imaging apparatus will be described as one representative example of the image processing apparatus.

The present embodiment is an embodiment in which the above-described processing of the array conversion unit in the first embodiment is set to be performed by a signal processing unit.

Light incident through an optical lens 201 is photoelectrically converted by an image sensor (imaging device) 202, and a sensor output image 203 is output from the image sensor 202. The image sensor 202 is configured to have a CMOS, or the like, for example.

Even in the present embodiment, a pixel array of the image sensor (imaging device) 202 has the above-described RGBW array illustrated in FIG. 2(*a*).

The sensor output image 203 output from the image sensor 22 is input to a camera signal processing unit 204.

The camera signal processing unit 204 uses the sensor output image 203 having the RGBW array illustrated in FIG. 2(*a*) as it is, performs various signal processes, and generates an output image 205. The output image 205 is an image in which an RGB pixel value is set for each pixel.

A detailed configuration and processing of the camera signal processing unit 204 will be described with reference to FIG. 11 and the subsequent drawings.

Figure 11:
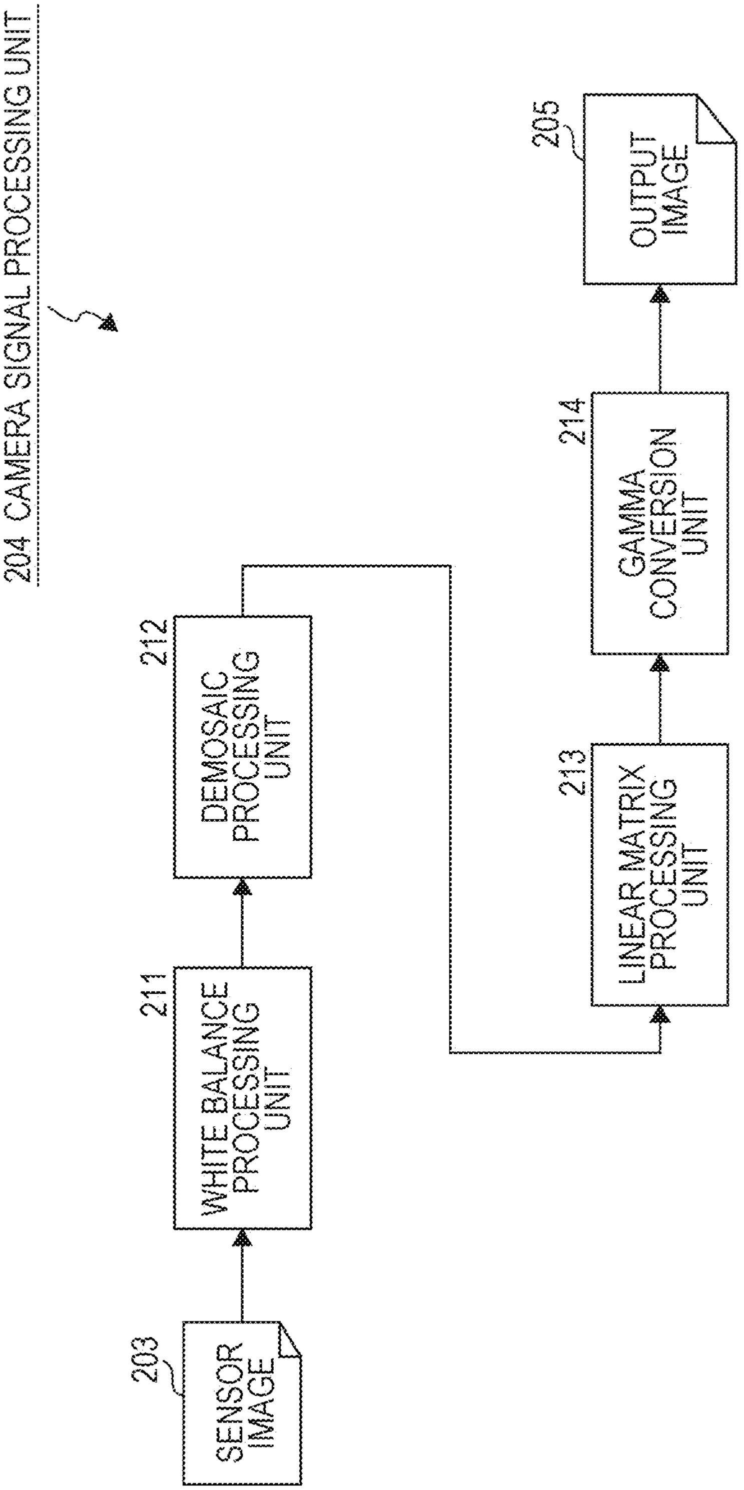
FIG. 11 is a diagram for illustrating a configuration and a process of a camera signal processing unit.

FIG. 11 is a view illustrating a configuration example of the camera signal processing unit 204.

As illustrated in FIG. 11, the camera signal processing unit 204 has the following configuration.

A white balance processing unit 211 which inputs the sensor image 203 and adjusts the sensor image 203 to have a more accurate color by applying a different gain to each color in view of a sensitivity difference in each color or imaging condition information A demosaic processing unit 212 which sets each RGB color at each pixel position of an RGBW pixel array A linear matrix processing unit 213 which corrects color mixture occurring between pixels by applying a matrix operation, for example A gamma conversion unit 214 which performs gamma conversion The camera signal processing unit 204 has these configurations.

Hereinafter, processing in each configuration unit will be described.

Processing in the white balance processing unit 211 will be described with reference to FIG. 12.

The white balance processing unit 211 inputs the sensor image 203 having the RGBW array illustrated in FIG. 2(*a*), and adjusts the sensor image 203 to have the more accurate color by applying the different gain to each color in view of the sensitivity difference in each color or the imaging condition information. As illustrated in FIG. 12, the white balance processing unit 211 generates and outputs a WB processing image 230 to the demosaic processing unit 212 in the next stage.

Figure 12:
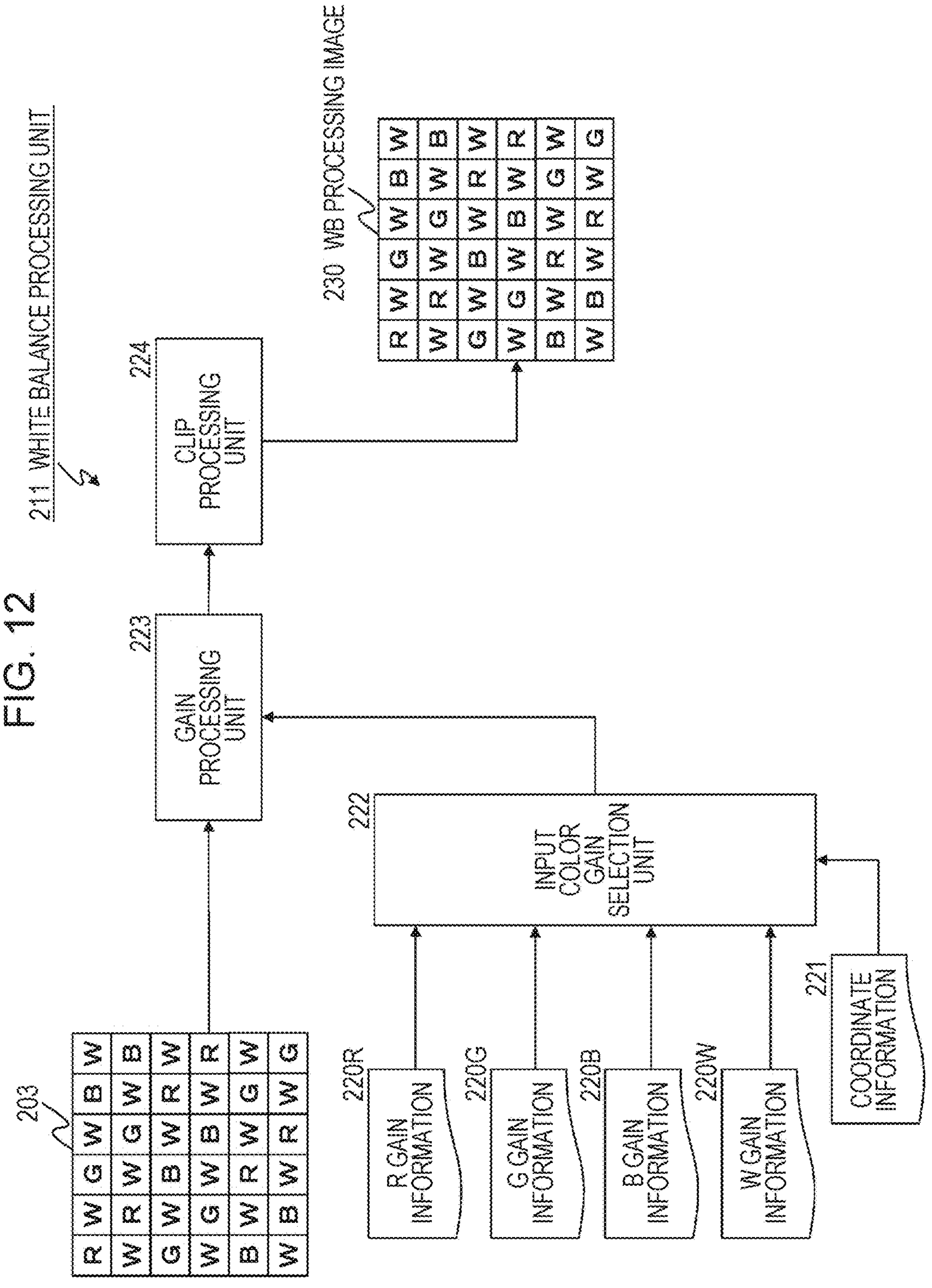
FIG. 12 is a diagram for illustrating a configuration and a process of a white balance processing unit.

An input color gain selection unit 222 illustrated in FIG. 12 inputs coordinate information 221 corresponding to a pixel position of a processing target pixel, selects gain information 220 corresponding to a color of the processing target pixel based on the coordinate information, and outputs the selected gain information 220 to a gain processing unit 222.

The coordinate information 221 corresponding to the pixel position of the processing target pixel or the gain information 220 is provided from a control unit. For example, the gain information is held in a memory as attribute information corresponding to an image during imaging.

The gain processing unit 223 performs gain adjustment on the processing target pixel by applying the gain information corresponding to a processing target color input from the input color gain selection unit 222.

Furthermore, a clip processing unit 224 performs clip processing for adjusting the pixel value set by the gain adjustment to fall within a predetermined range when the pixel value exceeds the predetermined range.

Through this processing, the WB processing image 230 which is an image obtained after WB adjustment illustrated in FIG. 12 is generated. The WB processing image 230 generated by the white balance processing unit 211 is output to the demosaic processing unit 212.

Processing of the demosaic processing unit 212 will be described with reference to FIG. 13.

The demosaic processing unit 212 inputs the WB processing image 230 generated by the white balance processing unit 211, and generates a demosaic image 245RGB in which each RGB pixel value is set for each pixel position.

Figure 13:
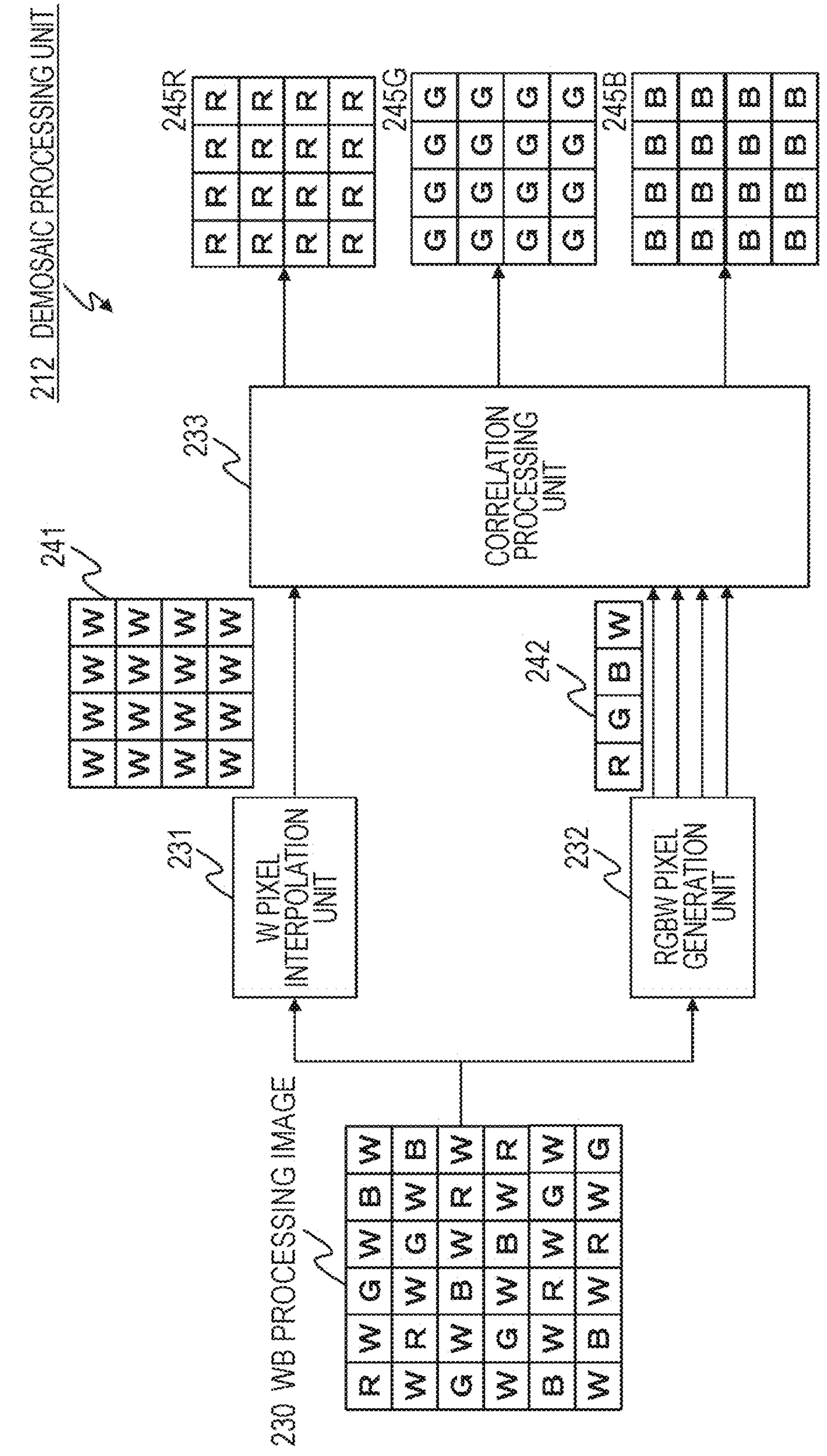
FIG. 13 is a diagram for illustrating a configuration and a process of a demosaic processing unit.

FIG. 13 illustrates a configuration example of the demosaic processing unit 212.

As illustrated in FIG. 13, the demosaic processing unit 212 has a W pixel interpolation unit 231, an RGBW pixel generation unit 232, and a correlation processing unit 233.

The W pixel interpolation unit 231 sets the W pixel at the pixel position other than the pixel position of the W pixel of the WB processing image 230 having the RGBW array, and generates the whole W pixel image signal 241 in which all pixels are the W pixels.

The RGBW pixel generation unit 232 generates an RGBW corresponding LPF signal 242 as a low frequency signal (LPF signal) of each RGBW pixel signal at each pixel position of the WB processing image 230 having the RGBW array.

The correlation processing unit 233 inputs the whole W pixel image signal 241 and the RGBW corresponding LPF signal 242, and generates the demosaic image 245RGB in which each RGB pixel value is set for each pixel position, by applying these input signals.

The configuration and processing of the W pixel interpolation unit 231 and the RGBW pixel generation unit 232 are the same as the configuration and processing of the W pixel interpolation unit 151 and the RGBW pixel generation unit 152 in the above-described first embodiment.

A configuration and a processing example of the correlation processing unit 233 will be described with reference to FIG. 14.

The correlation processing unit 233 inputs the whole W pixel image signal 241 generated by the W pixel interpolation unit 231 and the RGBW corresponding LPF signal 242 generated by the RGBW pixel generation unit 232, and generates the demosaic image 245RGB in which each RGB pixel value is set for each pixel position, by applying these input signals.

Figure 14:
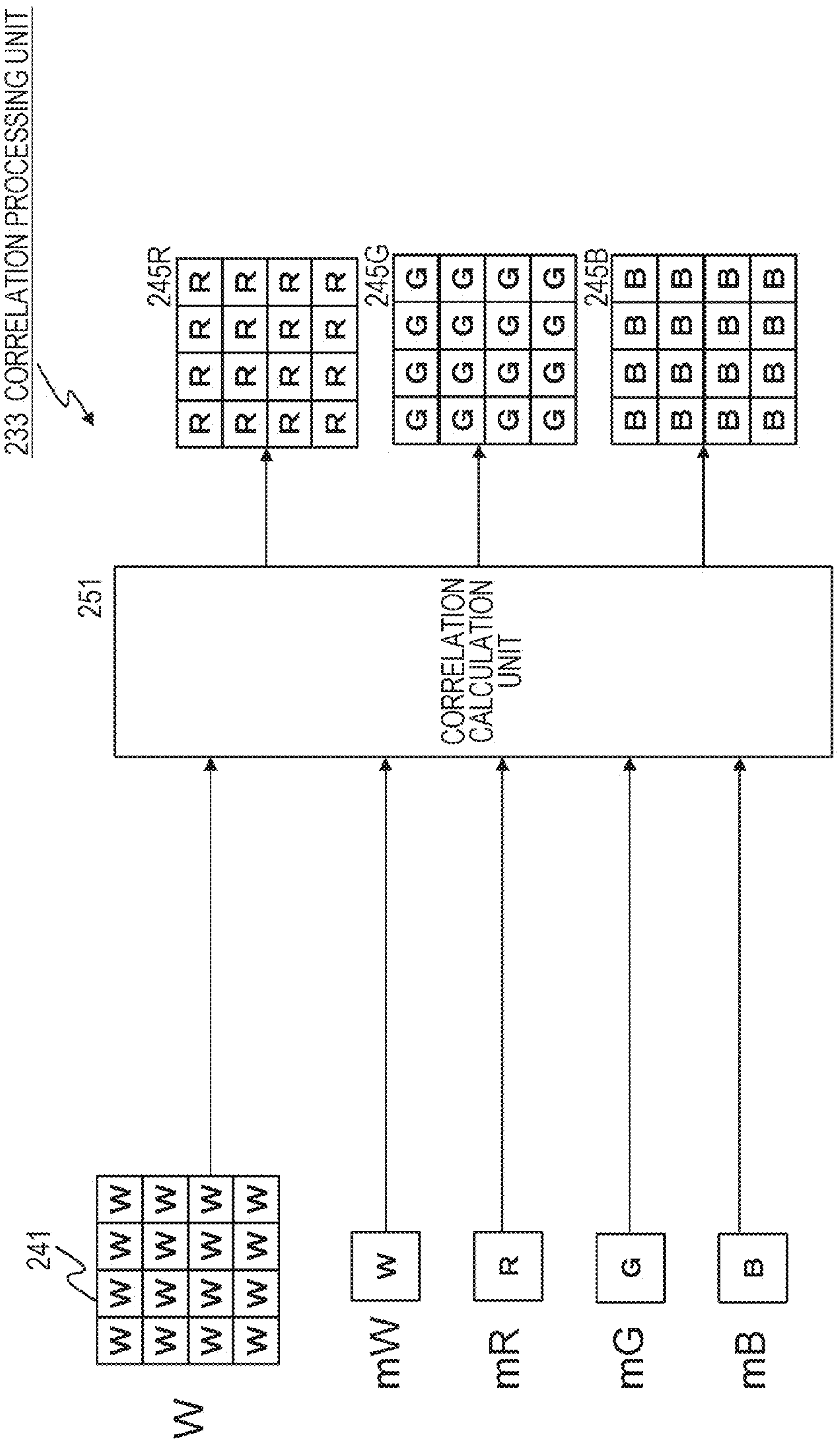
FIG. 14 is a diagram for illustrating a configuration and a process of a correlation processing unit.

As illustrated in FIG. 14, the correlation processing unit 233 has a correlation calculation unit 251.

The correlation calculation unit 251 performs gain adjustment on a high frequency of the W pixel, and overlaps the high frequency with each color by utilizing a property in which the W pixel has a strong positive correlation with the R, G, and B pixels. The correlation processing unit 233 sets a pixel value of each RGB color at all pixel positions.

Output pixel values (ROut, GOut, and BOut) are calculated according to the following (Equation 3).

$$ROut = mR + (W - mW)(mR/mW)$$

$$GOut = mG(W - mW)(mG/mW)$$

$$BOut = mB + (W - mW)(mB/mW) \quad \text{(Equation 3)}$$

In this manner, the correlation processing unit 233 inputs the whole W pixel image signal 241 generated by the W pixel interpolation unit 231 and the RGBW corresponding LPF signal 242 generated by the RGBW pixel generation unit 232, and generates and outputs the demosaic image 245 in which the RGB pixel value is set for all pixels, by applying these input signals.

The demosaic image 245 generated by the demosaic processing unit 212 is output to the linear matrix processing unit 213.

The linear matrix processing unit 213 corrects color mixture occurring between pixels by applying a matrix operation, for example.

Processing performed by the linear matrix processing unit 213 will be described with reference to FIG. 15.

Figure 15:
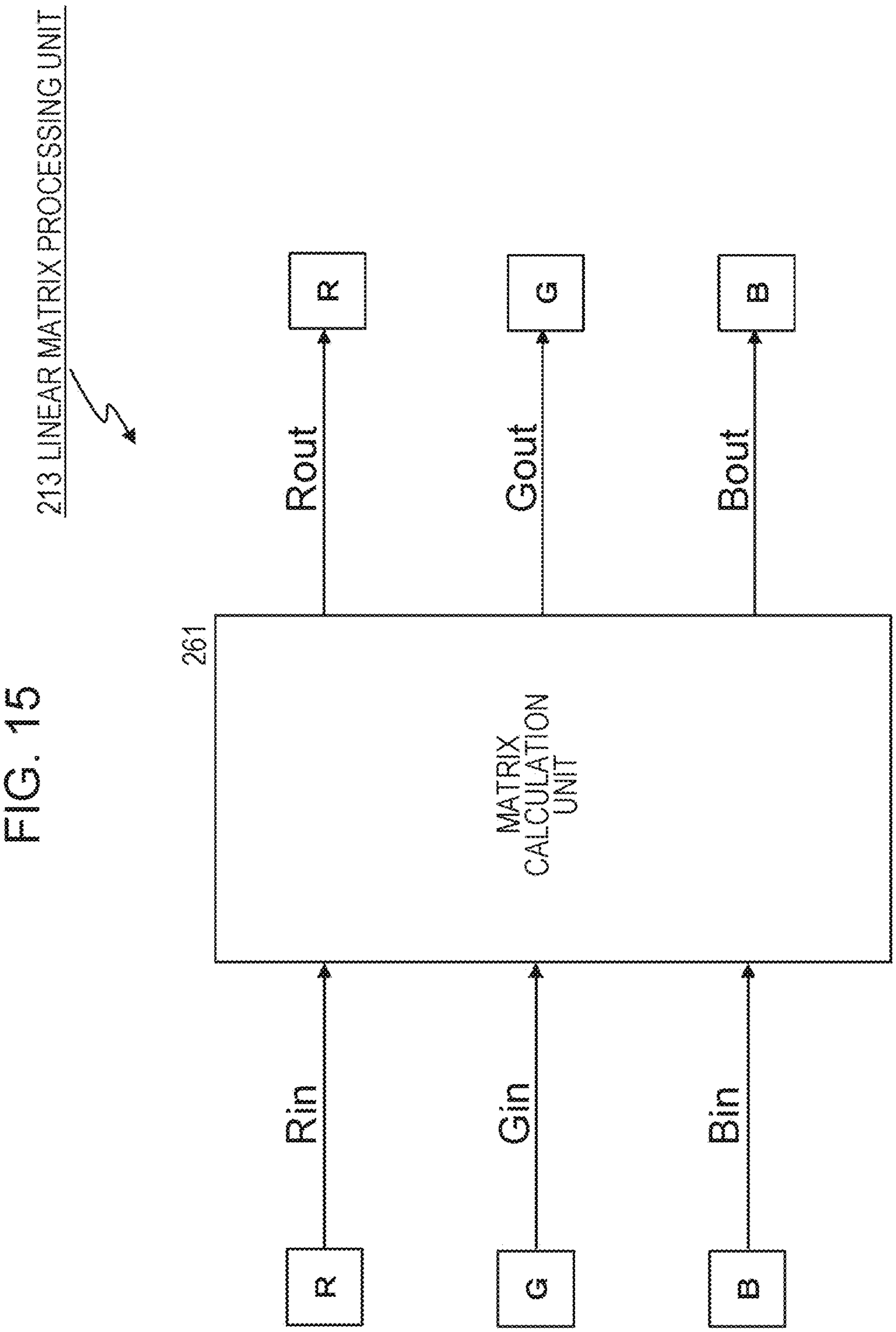
FIG. 15 is a diagram for illustrating a configuration and a process of a linear matrix processing unit.

As illustrated in FIG. 15, the linear matrix processing unit 213 has a matrix calculation unit 261.

The matrix calculation unit 261 performs preset matrix-applied calculation on respective RGB pixel values (Rin, Gin, and Bin) configuring the demosaic image 245 generated by the demosaic processing unit 212. The matrix calculation unit 261 calculates and outputs correction pixel values (Rout, Gout, and Bout) which have excluded a problem of color mixture occurring due to color filter characteristics, pixel characteristics, and optical characteristics.

For example, the matrix calculation in the matrix calculation unit is performed as processing according to the following (Equation 4).

[Expression 2]

$$\begin{pmatrix} Rout \\ Gout \\ Bout \end{pmatrix} = \begin{pmatrix} Crr & Crg & Crb \\ Cgr & Cgg & Cgb \\ Cbr & Cbg & Cbb \end{pmatrix} \begin{pmatrix} Rin \\ Gin \\ Bin \end{pmatrix} \quad \text{(Equation 4)}$$

In the above (Equation 4), Cxy is a parameter set according to a sensor or light source characteristics.

In this manner, the linear matrix processing unit 213 performs matrix calculation in the matrix calculation unit 261 illustrated in FIG. 15, for example, and corrects the color mixture occurring between pixels.

The correction pixel value is output to a gamma correction unit 214.

The gamma correction unit 214 performs gamma conversion according to a preset non-linear conversion mode.

Figure 16:
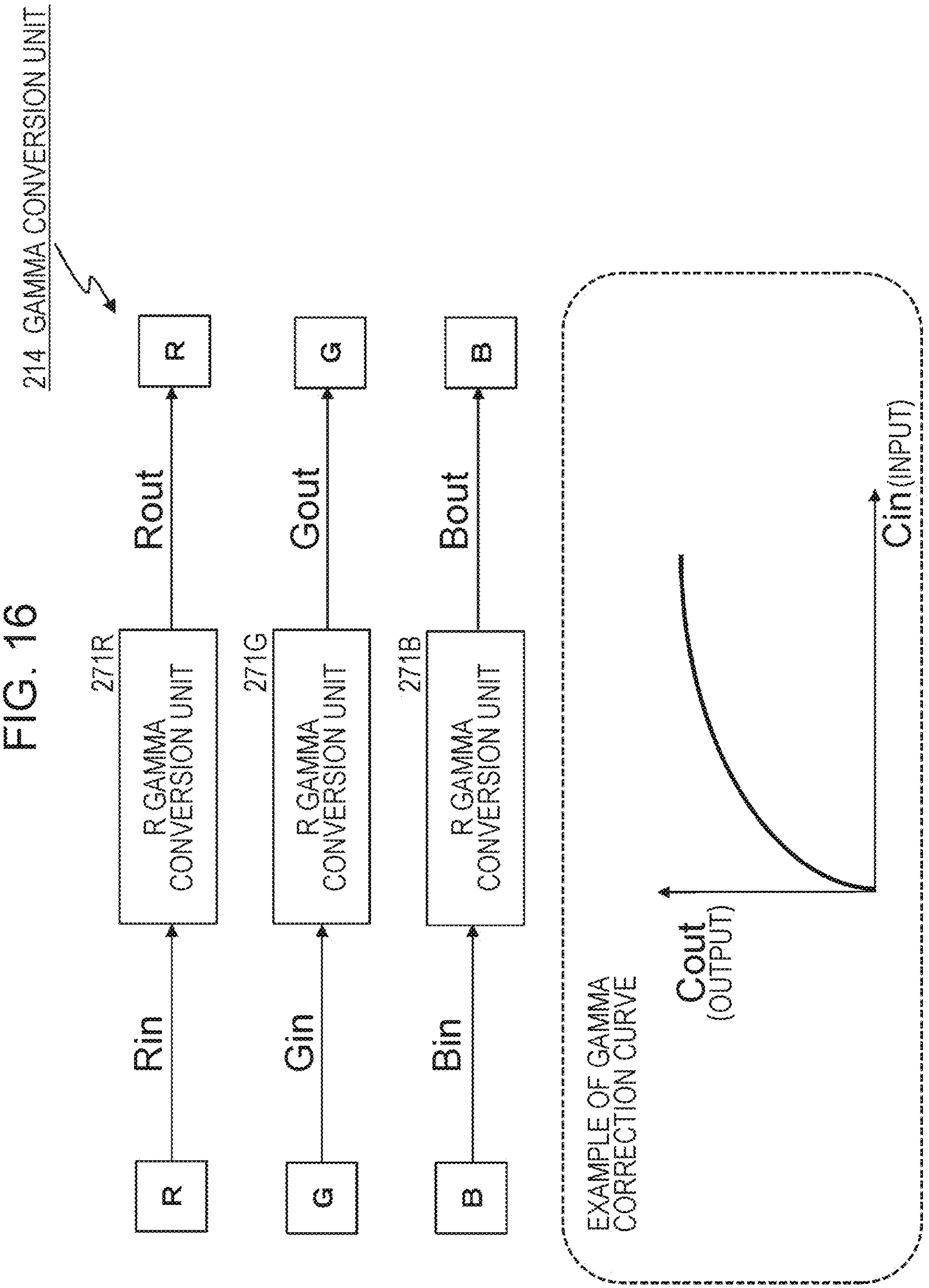
FIG. 16 is a diagram for illustrating a configuration and a process of a gamma conversion unit.

As illustrated in FIG. 16, according to a gamma correction curve corresponding to each RGB color, for example, a gamma correction curve as illustrated in FIG. 16(*a*), the gamma correction unit 214 generates and outputs output values (Rout, Gout, and Bout) by converting each pixel value of input values (Rin, Gin, and Bin) from the linear matrix processing unit 213.

This output becomes the output image 205 illustrated in FIG. 10.

In this manner, the image processing apparatus 200 of the second embodiment generates and outputs the output image 205 in which each pixel value is set for all pixels, based on the sensor image 203 having the RGBW array in the camera signal processing unit 204.

In the present embodiment, similar to the above-described embodiment, the image sensor also has the configuration described with reference to FIG. 2(*a*), and the number of respective RGB pixels per unit composition is uniformly set. Accordingly, when the pixel value of each RGB color for each pixel position is set, it is possible to sufficiently acquire the pixel value of each color from the reference area. Therefore, it is possible to very accurately perform a setting process of each RGB color for each pixel position, and thus, it is possible to generate the RGB image having less color noise or fewer false colors.

[3. Configuration and Processing of Image Processing Apparatus According to Third Embodiment]

Next, an image processing apparatus according to a third embodiment of the present disclosure will be described.

The image processing apparatus according to the third embodiment has a modified configuration of the processing of the demosaic processing unit 212 and the linear matrix processing unit 213 in the image processing apparatus 200 according to the second embodiment which has been described with reference to FIGS. 10 to 16. The other configurations are the same as those in the second embodiment.

The mosaic processing unit in the third embodiment serving as a demosaic processing unit 212B, and the linear matrix processing unit serving as a linear matrix processing unit B213 will be described with reference to FIGS. 17 and 18.

Figure 17:
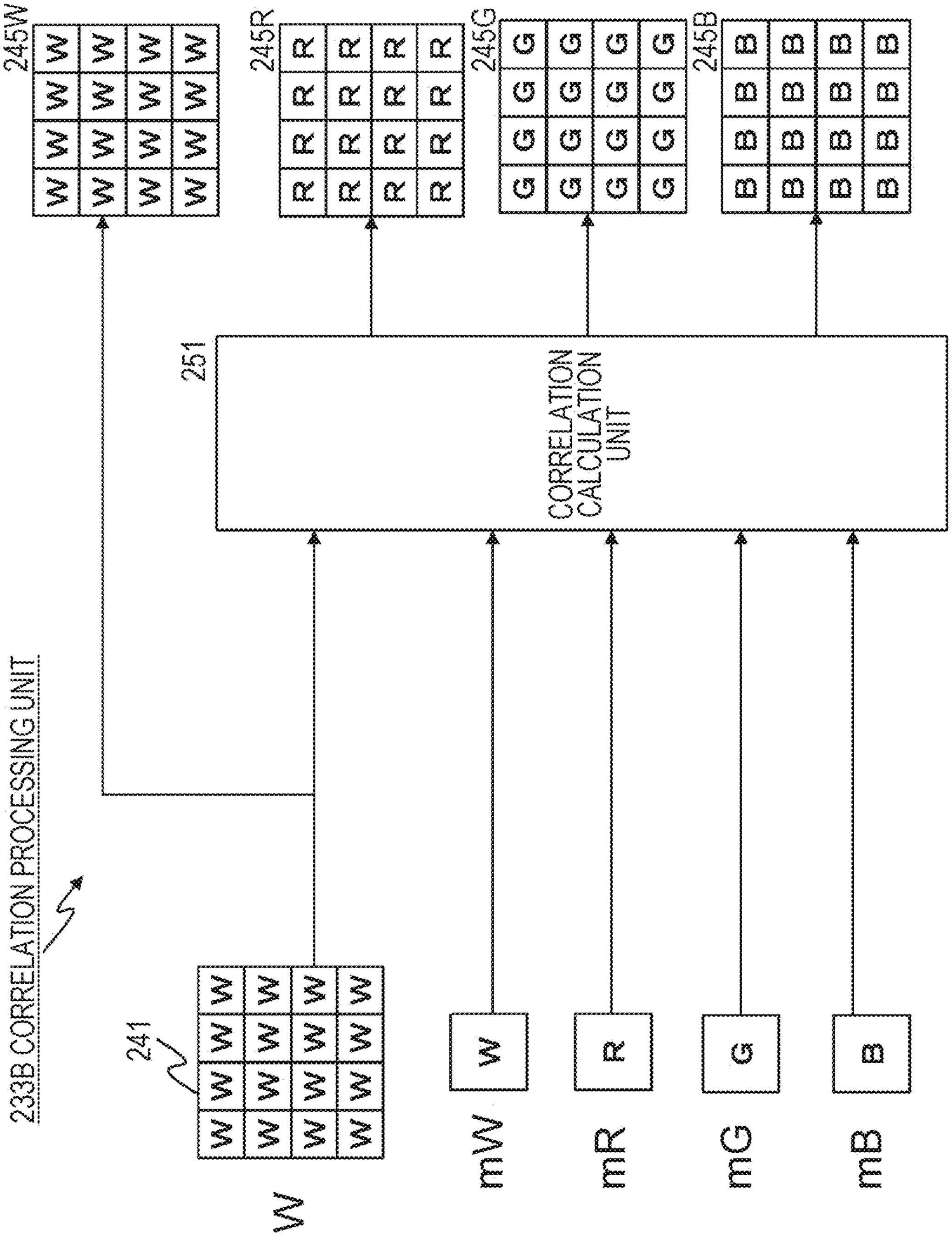
FIG. 17 is a diagram for illustrating a configuration and a process of a correlation processing unit.

FIG. 17 illustrates a configuration example of a correlation processing unit 233B of the demosaic processing unit 212B in the third embodiment.

The correlation processing unit 233B inputs the whole W pixel image signal 241 generated by the W pixel interpolation unit 231 and the RGBW corresponding LPF signal 242 generated by the RGBW pixel generation unit 232, and generates the demosaic image 245RGB in which each RGB pixel value is set for each pixel position, by applying these input signals.

This processing is the same as that in the second embodiment.

The correlation processing unit 233B of the third embodiment also further outputs the whole W pixel image signal 241 generated by the W pixel interpolation unit 231.

As illustrated in FIG. 17, the correlation processing unit 233B has the correlation calculation unit 251.

The correlation calculation unit 251 performs gain adjustment on a high frequency of the W pixel, and overlaps the high frequency with each color by utilizing a property in which The W pixel has a strong positive correlation with the R, G, and B pixels. This processing is the same as that in the second embodiment. The correlation processing unit 233B sets a pixel value of each RGBW color at all pixel positions.

Output values (WOut, ROut, GOut, and BOut) are calculated according to the following (Equation 5), for example.

$$W\text{out}=W$$

$$R\text{Out}=mR+(W-mW)(mR/mW)$$

$$G\text{Out}=mG(W-mW)(mG/mW)$$

$$B\text{Out}=mB+(W-mW)(mB/mW) \quad \text{(Equation 5)}$$

In this manner, the correlation processing unit 233B inputs the whole W pixel image signal 241 generated by the W pixel interpolation unit 231 and the RGBW corresponding LPF signal 242 generated by the RGBW pixel generation unit 232, and generates and outputs a demosaic image 245RGBW in which an RGBW pixel value is set for all pixels, by applying these input signals.

The mosaic image 245RGBW generated by the demosaic processing unit 212B is output to a linear matrix processing unit 213B.

The linear matrix processing unit 213B corrects color mixture occurring between pixels by applying a matrix operation, for example.

Processing performed by the linear matrix processing unit 213B will be described with reference to FIG. 18.

Figure 18:
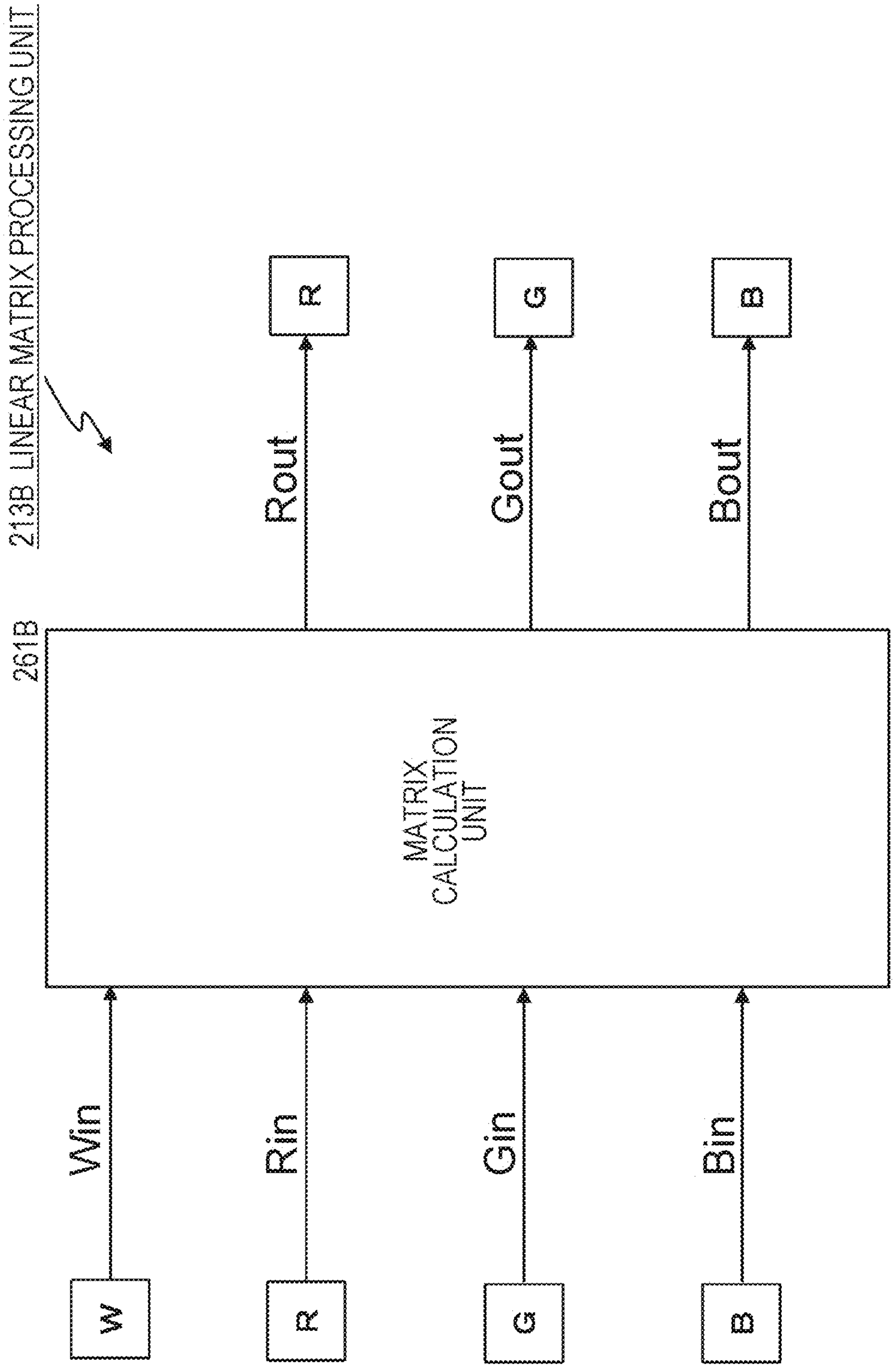
FIG. 18 is a diagram for illustrating a configuration and a process of a linear matrix processing unit.

As illustrated in FIG. 18, the linear matrix processing unit 213B has a matrix calculation unit 261B.

The matrix calculation unit 261B performs preset matrix-applied calculation on respective RGBW pixel values (Win, Rin, Gin, and Bin) configuring the demosaic image 245 generated by the demosaic processing unit 212B. The matrix calculation unit 261B calculates and outputs correction pixel values (Rout, Gout, and Bout) which have excluded a problem of color mixture occurring due to color filter characteristics, pixel characteristics, and optical characteristics.

For example, the matrix calculation in the matrix calculation unit is performed as processing according to the following (Equation 6).

[Expression 3]

$$\begin{pmatrix} Rout \\ Gout \\ Bout \end{pmatrix} = \begin{pmatrix} Crw & Crr & Crg & Crb \\ Cgw & Cgr & Cgg & Cgb \\ Cbw & Cbr & Cbg & Cbb \end{pmatrix} \begin{pmatrix} Win \\ Rin \\ Gin \\ Bin \end{pmatrix} \quad \text{(Equation 6)}$$

In the above (Equation 6), Cxy is a parameter set according to a sensor or light source characteristics.

In this manner, the linear matrix processing unit 213 performs matrix calculation in the matrix calculation unit 261B illustrated in FIG. 18, for example, and corrects the color mixture occurring between pixels.

The third embodiment is configured so that four RGBW colors are used unlike the second embodiment. According to this configuration, it is possible to expect further improved color reproducibility.

In the present embodiment, the image sensor also has the configuration described with reference to FIG. 2(*a*), and the number of respective RGB pixels per unit composition is uniformly set. Accordingly, when the pixel value of each RGB color for each pixel position is set, it is possible to sufficiently acquire the pixel value of each color from the reference area. Therefore, it is possible to very accurately perform a setting process of each RGB color for each pixel position, and thus, it is possible to generate the RGB image having less color noise or fewer false colors.

[4. Configuration and Processing of Image Processing Apparatus According to Fourth Embodiment]

Next, as a fourth embodiment of the image processing apparatus of the present disclosure, a configuration example will be described in which processing is performed on a pixel added signal inside the image sensor.

A CMOS image sensor which is the image sensor used in the above-described embodiment has an embedded AD converter that converts an analog value which indicates a charge amount accumulated in each pixel into a digital value. An output speed of each pixel signal is restricted by the processing of this AD converter. There is a problem in that a processing load of the AD converter increases due to the increased number of pixels and the output speed of the signal from a sensor is reduced.

In the fourth embodiment, in order to solve this problem, charges accumulated in multiple pixels in an analog signal region inside the sensor are added. That is, pixel addition is performed at an analog signal level and the processing load of the AD converter is reduced, thereby enabling high-speed processing. This configuration realizes an image output having a high frame rate, for example.

Figure 19:
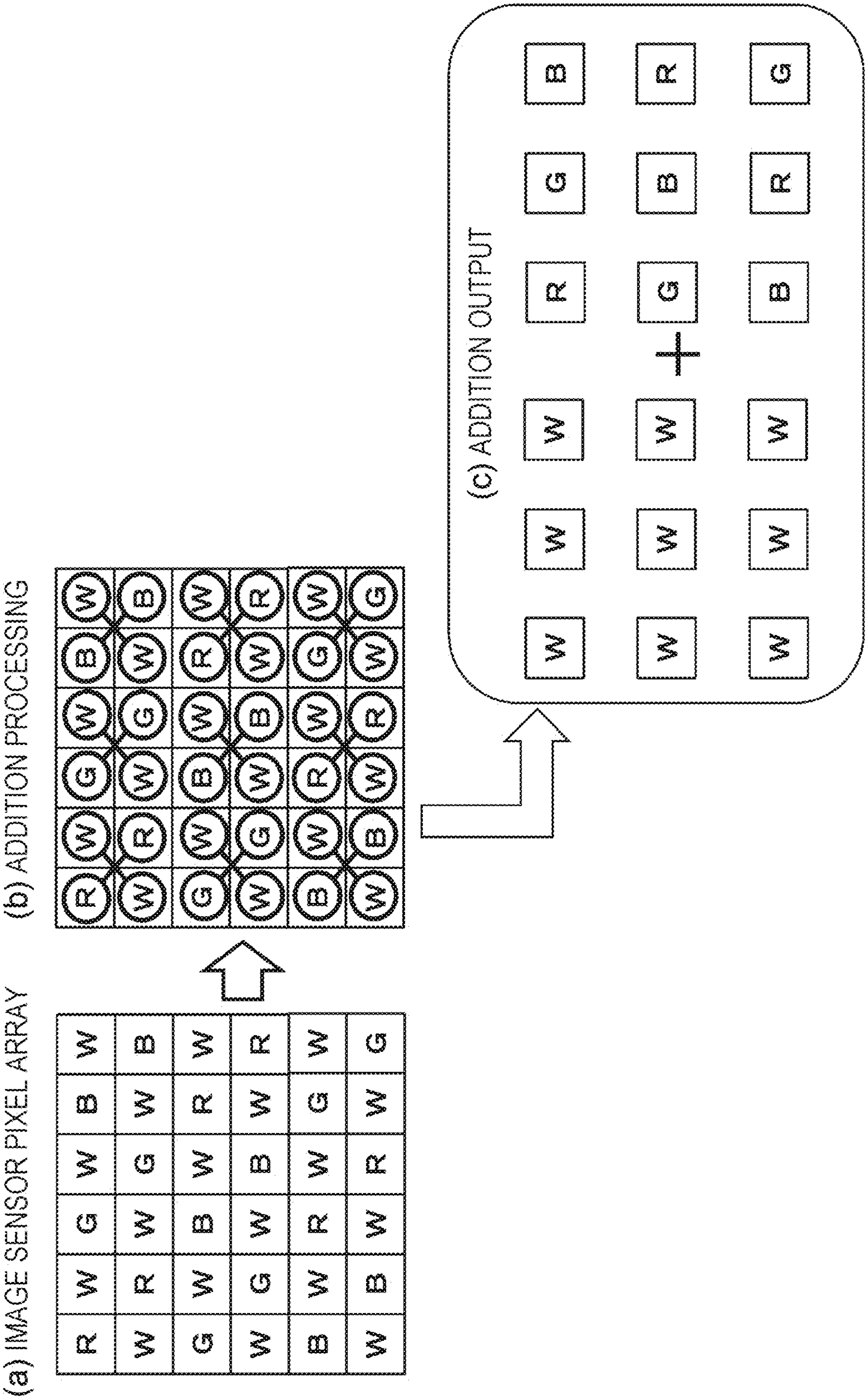
FIG. 19 is a diagram for illustrating addition processing and an output example of an image sensor.

In the present embodiment, inside the image sensor, addition processing is performed on a sensor configuring pixel as illustrated in FIG. 19, for example, thereby outputting an addition result.

FIG. 19(*a*) illustrates the RGBW array which is the pixel array of the image sensor and has been previously described with reference to FIG. 2(*a*).

FIG. 19(*b*) illustrates pixel addition processing performed inside the image sensor. The addition processing is performed on the pixel value of two obliquely arranged pixels having the same color.

As a result, an image sensor output illustrated in FIG. 19(*c*) is obtained.

The sensor output illustrated in FIG. 19(*c*) is an output obtained from an image sensor region of 6×6=36 pixels illustrated in FIG. 19(*a*).

A pixel signal output of a total of 18 pixels of a W pixel output of 3×3=9 pixels and an RGB pixel output of 3×3=9 pixels is obtained.

Through this addition processing, the image signal whose resolution level is lower than an original resolution level of the image sensor is output. However, since the processing of the AD converter is reduced, a high-speed output is possible, and thus, it is possible to realize an image output having a high frame rate.

Figure 20:
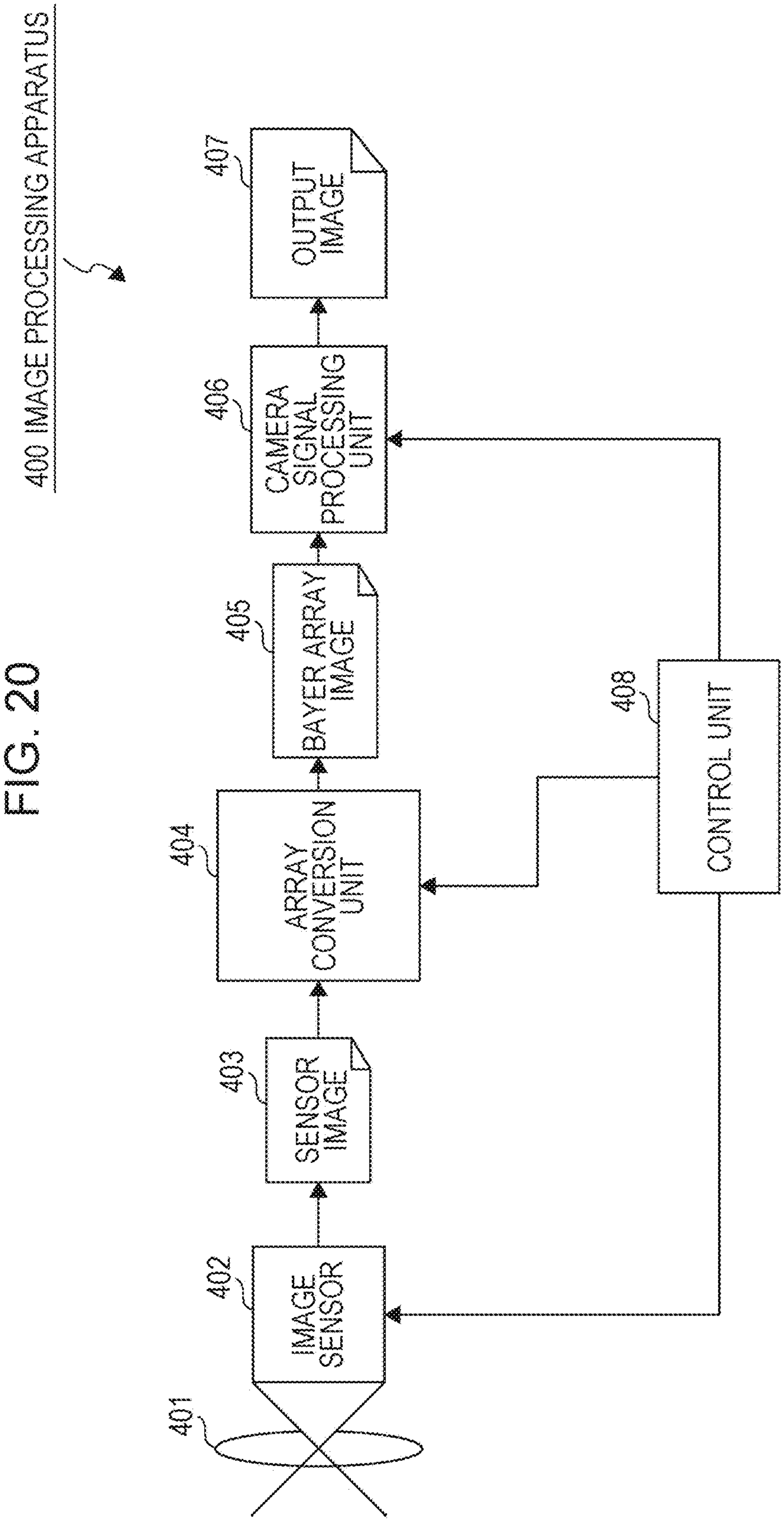
FIG. 20 is a diagram for illustrating a configuration example of an image processing apparatus according to a fourth embodiment.

FIG. 20 illustrates a configuration example of an image processing apparatus 400 according to the fourth embodiment. This image processing apparatus 400 has a configuration the same as that of the image processing apparatus 100 according to the first embodiment which has been described with reference to FIG. 1.

Light incident through an optical lens 401 is photoelectrically converted by an image sensor (imaging device) 402, and a sensor output image 403 is output from the image sensor 402. The image sensor 402 is configured to have a CMOS, or the like, for example. A pixel array of the image sensor (imaging device) 402 has the RGBW array illustrated in FIG. 2(*a*) described above.

The pixel addition described with reference to FIG. 19 is performed inside the image sensor 402. An output image serving as an addition result of a pixel value for two pixels having the same color, that is, an image (W image+RGB image) configured to have the number of pixels which is half of the original number of pixels as illustrated in FIG. 19(*c*), is output as a sensor image 503.

An array conversion unit 404 inputs the sensor image 503 configured to have this added pixel, that is, (W image+RGB image), performs array conversion processing, and generates a Bayer array image 405.

A camera signal processing unit 406 performs signal processing on the Bayer array image 405, and generates an output image 407.

A control unit 408 generates control signals for an exposure control of the image sensor 402, a processing control of the array conversion unit 404, and a processing control of the camera signal processing unit 406, and supplies the signals to each of these configuration units. The control unit 408 performs overall controls on processes from image capturing to output image generation. For example, the control unit 408 includes a CPU having a program executing function, and performs overall controls on the processes executed in the imaging apparatus in accordance with a program stored in a memory (not illustrated).

Figure 21:
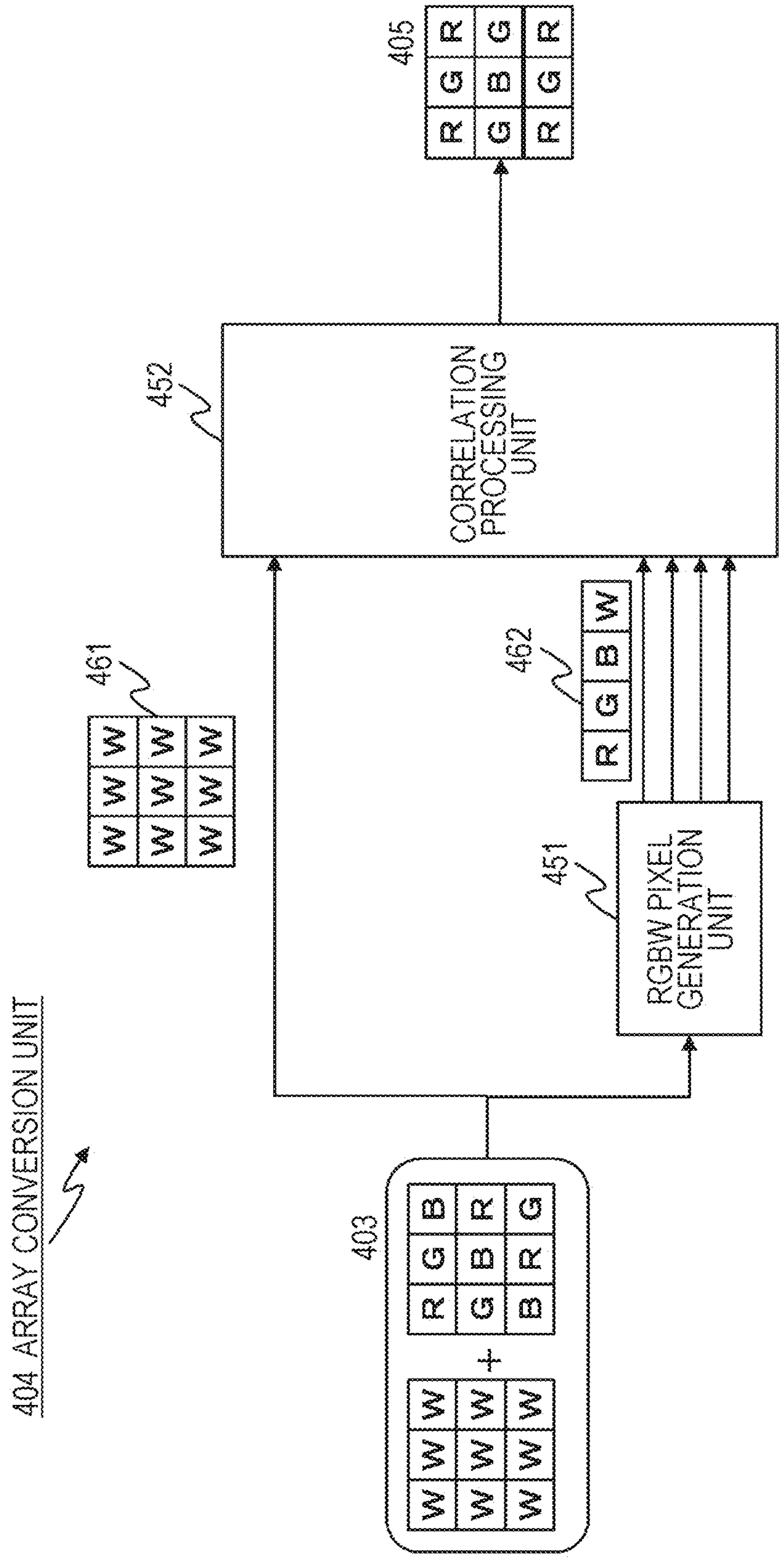
FIG. 21 is a diagram for illustrating a configuration and a process of an array conversion unit.

Processing of the array conversion unit 404 according to the fourth embodiment will be described with reference to FIG. 21.

The array conversion unit 404 inputs the sensor image 503, that is the sensor image 403 generated by analog calculation inside the image sensor 502 described with reference to FIG. 19, that is, (W image+RGB image). The array conversion unit 404 performs array conversion processing and generates the Bayer array image 405.

The sensor image 503 is configured so that the W image formed of only the W pixel and the RGB image are combined with each other.

The W image is input to a correlation processing unit 452 as the whole W pixel image signal 461 as it is.

Furthermore, the W image and the RGB image are input to an RGBW pixel generation unit 451. The RGBW pixel generation unit 451 generates an RGBW corresponding LPF signal 462 as a low frequency signal (LPF signal) of each RGBW pixel signal at each pixel position of the sensor image 403.

This processing is the same as the processing in the first embodiment, which has been described with reference to FIGS. 7 and 8.

The correlation processing unit 452 inputs the whole W pixel image signal 461 and the RGBW corresponding LPF signal 462, and generates and outputs the Bayer array image 405 having the RGB array by applying these input signals.

This processing is the same as the processing in the first embodiment, which has been described with reference to FIG. 9.

In this manner, in the fourth embodiment, it is no longer necessary to arrange the W pixel generation unit required for the array conversion unit 104 in the first embodiment, that is, the W pixel generation unit 151 illustrated in FIG. 4, thereby enabling the processing to be simplified.

The addition output processing configuration of the fourth embodiment can also be applied in conjunction with the above-described second and third embodiments.

In the present embodiment, the image sensor also has the configuration described with reference to FIG. 2(*a*), and the number of respective RGB pixels per unit composition is uniformly set. Accordingly, when the pixel value of each RGB color for each pixel position is set, it is possible to sufficiently acquire the pixel value of each color from the reference area. Therefore, it is possible to very accurately perform a setting process of each RGB color for each pixel position, and thus, it is possible to generate the RGB image having less color noise or fewer false colors.

[5. Configuration and Processing of Image Processing Apparatus According to Fifth Embodiment]

A configuration of the image processing apparatus will be described which generates a wide dynamic range image, that is, a high dynamic range image (HDR image) by controlling an exposure period of a configuring pixel of the image sensor in a pixel unit, by determining a long-period exposure pixel and a short-period exposure pixel, by generating a long-period exposure image and a short-period exposure image through single image capturing, and by synthesizing these images having different exposure periods.

Figure 22:
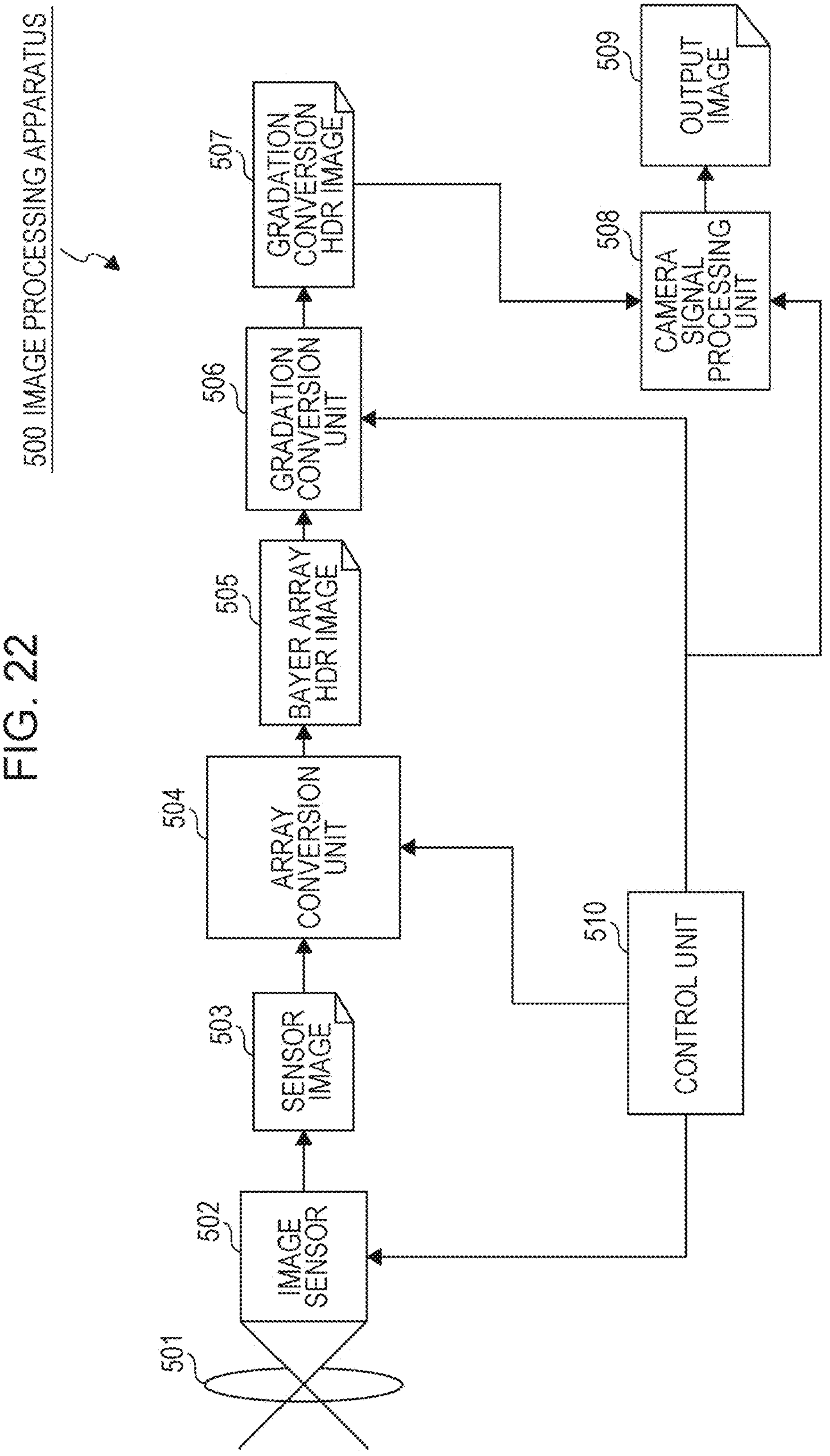
FIG. 22 is a diagram for illustrating a configuration example of an image processing apparatus according to a fifth embodiment.

FIG. 22 illustrates a configuration example of an image processing apparatus 500 according to the present embodiment.

Light incident through an optical lens 501 is photoelectrically converted by an image sensor (imaging device) 502, and a sensor output image 503 is output from the image sensor 502. The image sensor 502 is configured to have a CMOS, or the like, for example. A pixel array of the image sensor (imaging device) 502 has the RGBW array illustrated in FIG. 2(*a*) described above.

In the present embodiment, the image sensor (imaging device) 502 is set to have two different exposure periods, and outputs an image formed of a long-period exposure pixel and a short-period exposure pixel.

For example, the long-period exposure pixel and the short-period exposure pixel are alternately set on a row-by-row basis of the image sensor. An exposure control in these pixel units is performed by a control unit 510.

A specific example of the exposure control processing will be described later with reference to FIG. 23.

An array conversion unit 504 inputs the sensor image 503 formed of pixels having a different exposure setting period, that is, for example, an image in which the long-period exposure pixel and the short-period exposure pixel are alternately set on a row-by-row basis, and generates the high dynamic range image (HDR image) by performing composition processing on the image having two exposure periods.

Furthermore, the array conversion unit 504 performs pixel array conversion processing in conjunction with the generation of the high dynamic range image (HDR image), and generates a Bayer array HDR image 505.

The Bayer array HDR image 505 is input to a gradation conversion unit 506.

The gradation conversion unit 506 performs processing for adjusting a scope of the pixel value set by high dynamic range processing to fall within a scope in which a camera signal processing unit 508 can perform the next stage of processing. For example, when the pixel value on which the camera signal processing unit 508 can perform the processing is 8-bit data, the gradation conversion unit 506 performs gradation conversion processing for setting all configuring pixel values of the Bayer array HDR image 505 to fall within 8-bits. Through this processing, a gradation conversion HDR image 507 is generated and output.

The camera signal processing unit 508 performs signal processing on the gradation conversion HDR image 507 having the Bayer array, and generates an output image 509.

The control unit 510 generates control signals for an exposure control of the image sensor 502, a processing control of the array conversion unit 504, a processing control of the gradation conversion unit 506, and a processing control of the camera signal processing unit 508, and supplies the signals to each of these configuration units. The control unit 510 performs overall controls on processes from image capturing to output image generation. For example, the control unit 508 includes a CPU having a program executing function, and performs overall controls on the processes executed in the imaging apparatus in accordance with a program stored in a memory (not illustrated).

A specific example of exposure control processing in the image sensor 502 will be described with reference to FIG. 23.

As a method of generating pixels having different sensitivity, it is possible to employ a configuration in which light transmittance of a filter of the pixels is set to vary in each pixel unit, or a configuration in which an exposure period is controlled in each pixel unit. The apparatus of the present disclosure may employ any method of these.

Hereinafter, processing for generating the long-period exposure image and the short-period exposure image by changing the exposure period on a row-by-row basis will be described as an example.

Figure 23:
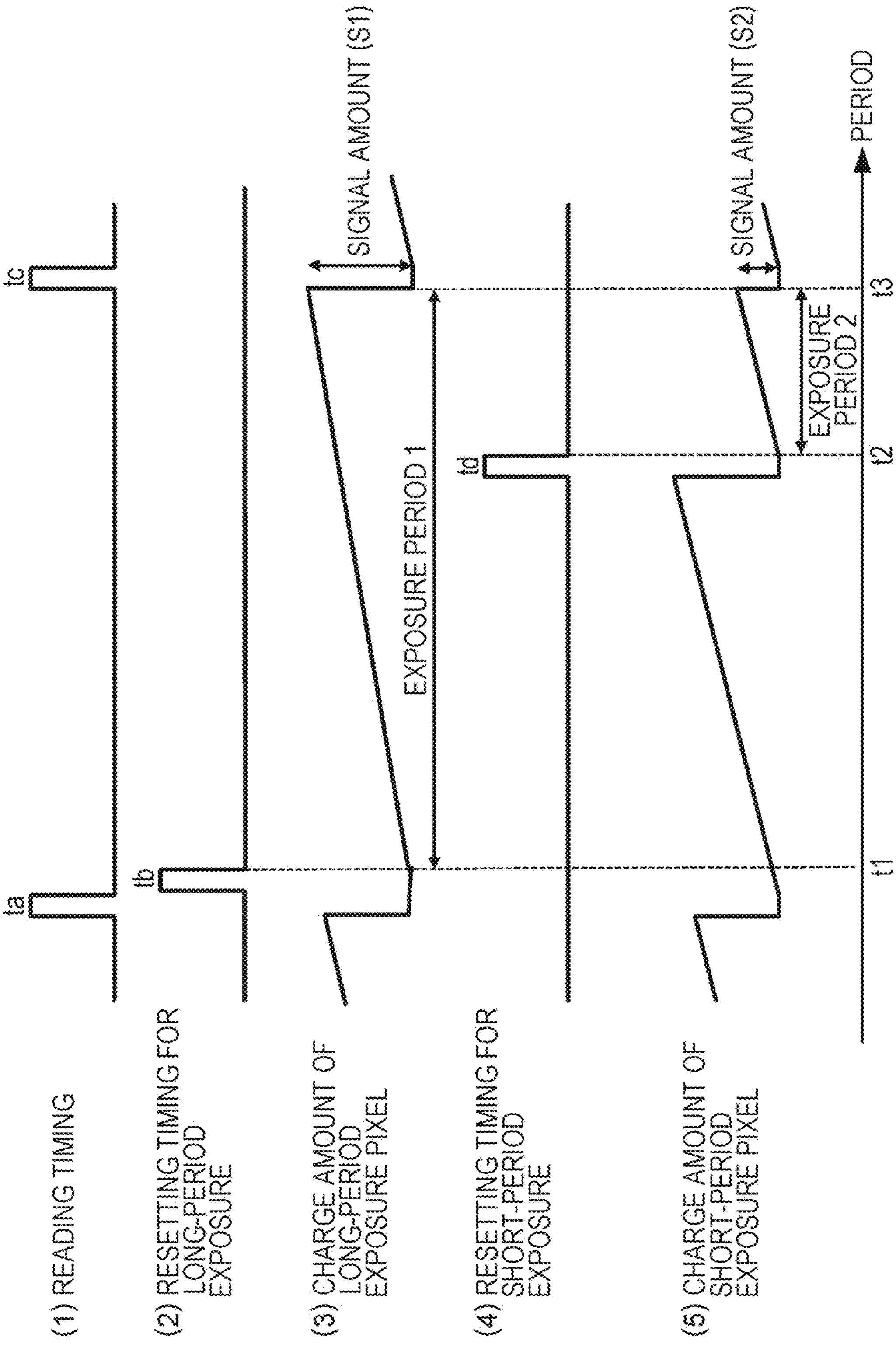
FIG. 23 is a diagram for illustrating an example of exposure control processing.

FIG. 23 is a view for illustrating a control signal output from the control unit 510 to the image sensor 502, and a period transition of charge accumulation in the image sensor. The following five signals are illustrated.

(1) Reading Timing (2) Resetting Timing for Long-Period Exposure Pixel (3) Charge Amount of Long-Period Exposure Pixel (4) Resetting Timing for Short-Period Exposure Pixel (5) Charge Amount of Short-Period Exposure Pixel (1) The reading timing indicates a timing signal for reading accumulated charges of each pixel as a pixel value. In the example illustrated in the drawing, each timing of periods to and tc indicates the reading timing.

(2) The resetting timing for long-period exposure corresponds to a setting timing of exposure start time for the long-period exposure pixel. In the example illustrated in the drawing, a period tb indicates the resetting timing. After this tb, accumulation of charges in response to incident light starts in the long-period exposure pixel.

(3) The charge amount of the long-period exposure pixel indicates increased transition of the charge amount during the exposure period (exposure period 1) from the resetting timing for the long-period exposure until the next reading timing.

(4) The resetting timing for short-period exposure corresponds to the setting timing of exposure start time for the short-period exposure pixel. In the example illustrated in the drawing, a period td indicates the resetting timing. After this td, accumulation of charges in response to incident light starts in the short-period exposure pixel.

(5) The charge amount of the short-period exposure pixel indicates increased transition of the charge amount during the exposure period (exposure period 2) from the resetting timing for the short-period exposure until the next reading timing.

For example, the long-period exposure pixel and the short-period exposure pixel are alternately set on a row-by-row basis of the image sensor. Specifically, an odd number row is set to be a row for the short-period exposure pixel, and an even number row is set to be a row for the long-period exposure pixel. In addition to this, various settings are possible.

For example, through the exposure control described with reference to FIG. 23, the image sensor 502 generates the sensor image 503 including the long-period exposure pixel and the short-period exposure pixel, and outputs the sensor image 503 to the array conversion unit 504.

Processing performed by the array conversion unit 504 will be described with reference to FIG. 24.

Figure 24:
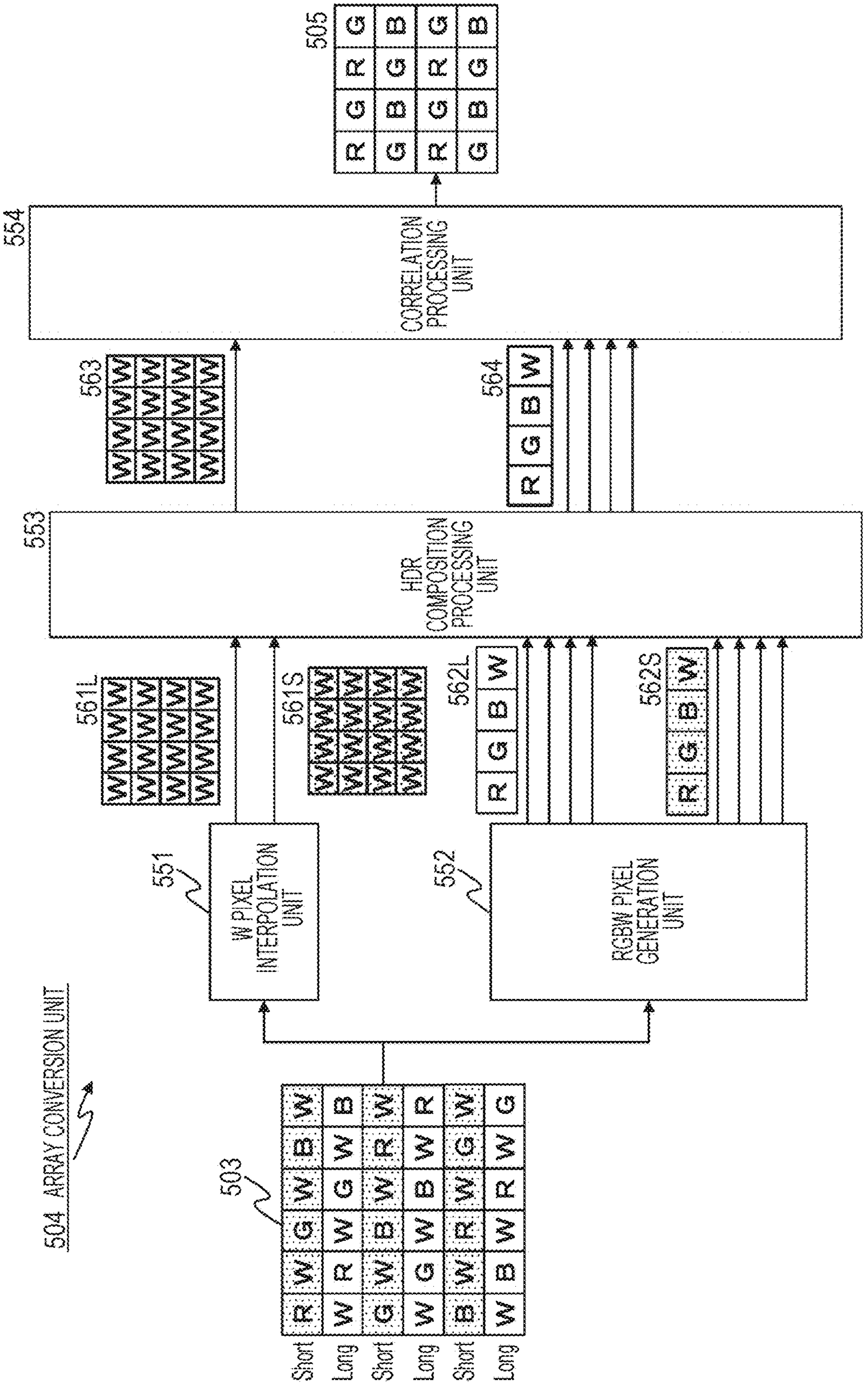
FIG. 24 is a diagram for illustrating a configuration and a process of an array conversion unit.

As illustrated in FIG. 24, the array conversion unit 504 has a W pixel interpolation unit 551, an RGBW pixel generation unit 552, an HDR composition processing unit 553, and a correlation processing unit 554.

As illustrated in the drawing, the sensor image 503 input by the array conversion unit 504 has a configuration in which pixels of the short-period exposure pixel (Short) and the long-period exposure pixel (Long) which respectively have different exposure period settings are arrayed on a row-by-row basis. The pixel array is the RGBW array described with reference to FIG. 2(*a*).

The W pixel interpolation unit 551 inputs the sensor image 503 having the RGBW array in which the long-period exposure pixel and the short-period exposure pixel are alternately set on a row-by-row basis, and generates a whole W pixel long-period exposure image 561L in which a long-period exposure W pixel is set for all pixels and a whole W pixel short-period exposure image 561S in which a short-period exposure W pixel is set for all pixels.

The interpolation processing is the same as the above-described processing in the first embodiment. However, when the whole W pixel long-period exposure image 561L is generated, the processing is performed with reference to only the long-period exposure pixel. When the whole W pixel short-period exposure image 561S is generated, the processing is performed with reference to only the short-period exposure pixel.

Processing of the W pixel interpolation unit 551 will be described with reference to FIG. 25.

The W pixel interpolation unit 551 inputs W pixel data within the sensor image 503 having the RGBW array in which the long-period exposure pixel and the short-period exposure pixel are alternately set on a row-by-row basis, and generates the whole W pixel long-period exposure image 561L in which the long-period exposure W pixel is set for all pixels and the whole W pixel short-period exposure image 561S in which the short-period exposure W pixel is set for all pixels.

When the whole W pixel long-period exposure image 561L in which the long-period exposure W pixel is set for all pixels is generated, only long-period exposure W pixel data 560L within the sensor image 503 is applied, thereby performing the W pixel interpolation processing for setting a long-period exposure W pixel value at a non-occupied position of pixels other than the long-period exposure W pixel.

Figure 25:
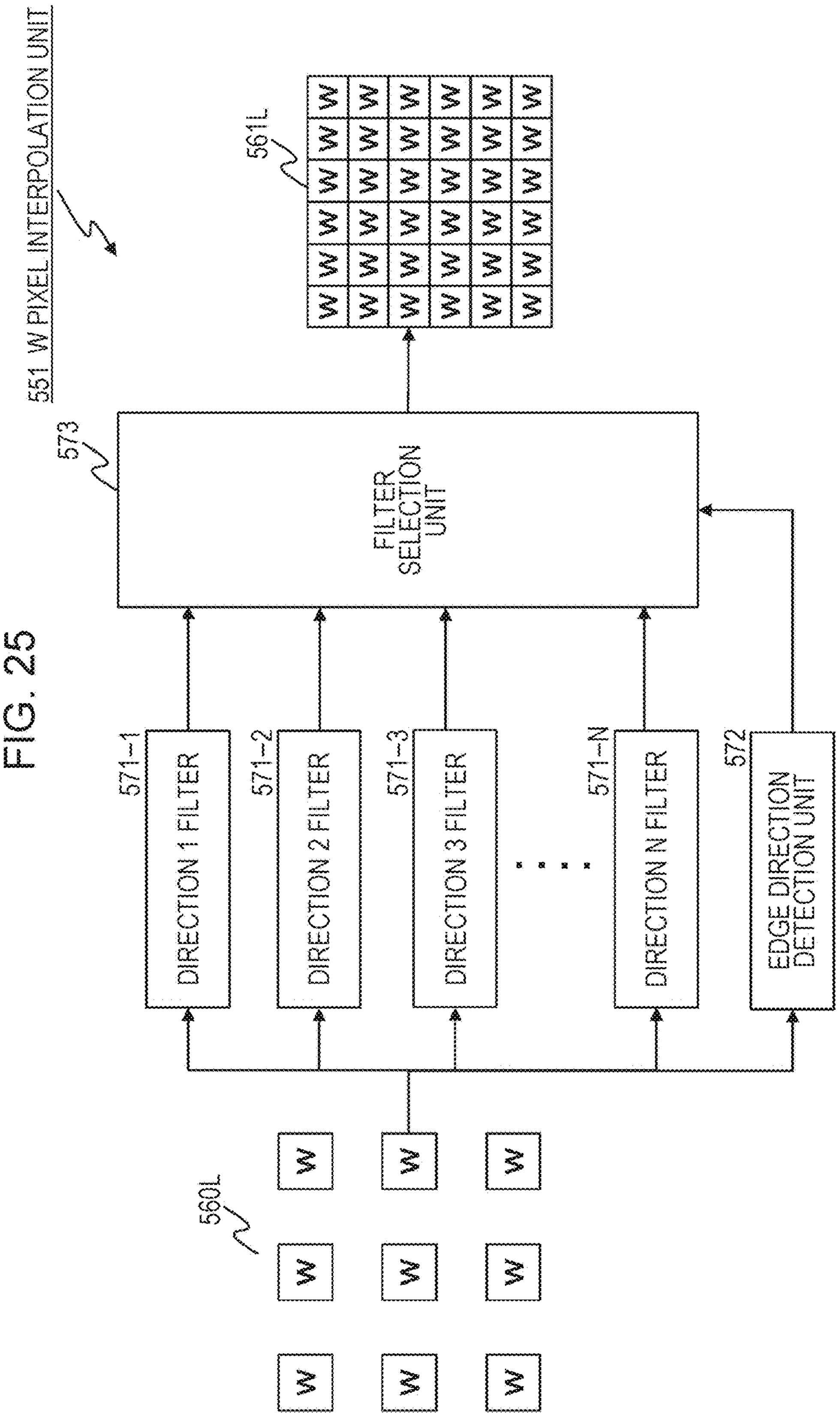
FIG. 25 is a diagram for illustrating a configuration and a process of a white pixel interpolation unit.

FIG. 25 illustrates processing configuration for generating the whole W pixel long-period exposure image 561L in which the long-period exposure W pixel is set for all pixels.

When the whole W pixel short-period exposure image 561S in which the short-period exposure W pixel is set for all pixels is generated, only short-period exposure W pixel data 560S within the sensor image 503 is applied, thereby performing the W pixel interpolation processing for setting a short-period exposure W pixel value at a non-occupied position of pixels other than the short-period exposure W pixel.

In these processes, only input and output data are different. These processes are performed basically according to the configuration illustrated in FIG. 25.

Hereinafter, as a representative example, processing for generating the whole W pixel long-period exposure image 561L in which the long-period exposure W pixel is set for the pixel will be described with reference to FIG. 25.

As illustrated in FIG. 25, the W pixel interpolation unit 551 has multiple direction filters 571-1 to 571-N which perform filter processing such as processing in which pixel values of the W pixel present in multiple different directions are averaged as a reference pixel, an edge direction detection unit 572 which detects an edge direction, and a filter selection unit 573 which determines an interpolation pixel value by means of filter selection.

When the whole W pixel long-period exposure image 561L is generated, only the long-period exposure W pixel data 560L within the sensor image 503 is selectively input. Based on the input image, a predetermined reference area (for example, k pixel×k pixel) including the position of the interpolation pixel which is the processing target pixel is set. The edge direction detection unit 572 detects the edge direction, based on the pixel value of the reference area. The filter selection unit 573 selects a filter for performing the filter processing in which the W pixels present along the edge direction, that is, in a direction having a slight gradient of the pixel value, are set to be the reference pixel, and calculates the W pixel value serving as the interpolation pixel value by applying the selected filter. For example, an average value of the pixel values of the W pixels present in the direction having the slight gradient is calculated, and the W pixel value of the processing target pixel position is set.

FIG. 26 illustrates a processing example in which the number N of applicable direction filters is four, that is, the direction filters are adapted to have four types of direction such as a horizontal direction, a vertical direction, a leftward-upward oblique direction, and a rightward-upward oblique direction.

Images formed of W1 to W9 illustrated in FIG. 26 indicate the pixel value of the long-period exposure W pixel configuring the long-period exposure W pixel data 560L within the sensor image 503.

The edge direction detection unit 572 calculates an edge amount of four types such as an edge amount in the horizontal direction (Dh), an edge amount in the vertical direction (Dv), an edge amount in the leftward-upward oblique direction (Dd), and an edge amount in the rightward-upward oblique direction (Da), according to the following equations.

$$Dh=(|W1-W2|+|W2-W3|+2(|W4-W5|+|W5-W6|)+|W7-W8|+|W8-W9|)/8$$

$$Dv=(|W1-W4|+|W4-W7|+2(|W2-W5|+|W5-W8|)+|W3-W6|+|W6-W9|)/8$$

$$Dd=(|W1-W5|+|W2-W6|+|W4-W8|+|W5-W9|/4$$

$$Da=(|W2-W4|+|W3-W5|+|W5-W7|+|W6-W8|/4$$

According to these respective calculation equations, edge amounts in four directions are calculated.

According to the following determination equations, the edge direction detection unit 572 determines the edge direction by using edge amounts: Dh, Dv, Dd, and Da in four directions which are calculated according to the above calculation equations.

In a case of $|Dh-Dv|\geq|Dd-Da|$, $Dh\leq Dv$ indicates edge direction=horizontal direction, and $Dh>Dv$ indicates edge direction=vertical direction. In a case of $|Dh-Dv|<|Dd-Da|$, $Dd\leq Da$ indicates edge direction=leftward-upward oblique direction, and $Dd>Da$ indicates edge direction=rightward-upward oblique direction. The edge direction detection unit 572 performs this determination processing, and outputs the determination result to the filter selection unit 573.

The filter selection unit 573 selects the reference pixel based on the edge direction detected by the edge direction detection unit 572, and performs interpolation processing in which the direction filter for setting an interpolation pixel value is selectively applied.

This processing example will be described with reference to FIG. 27 and the subsequent drawings.

Figure 27:
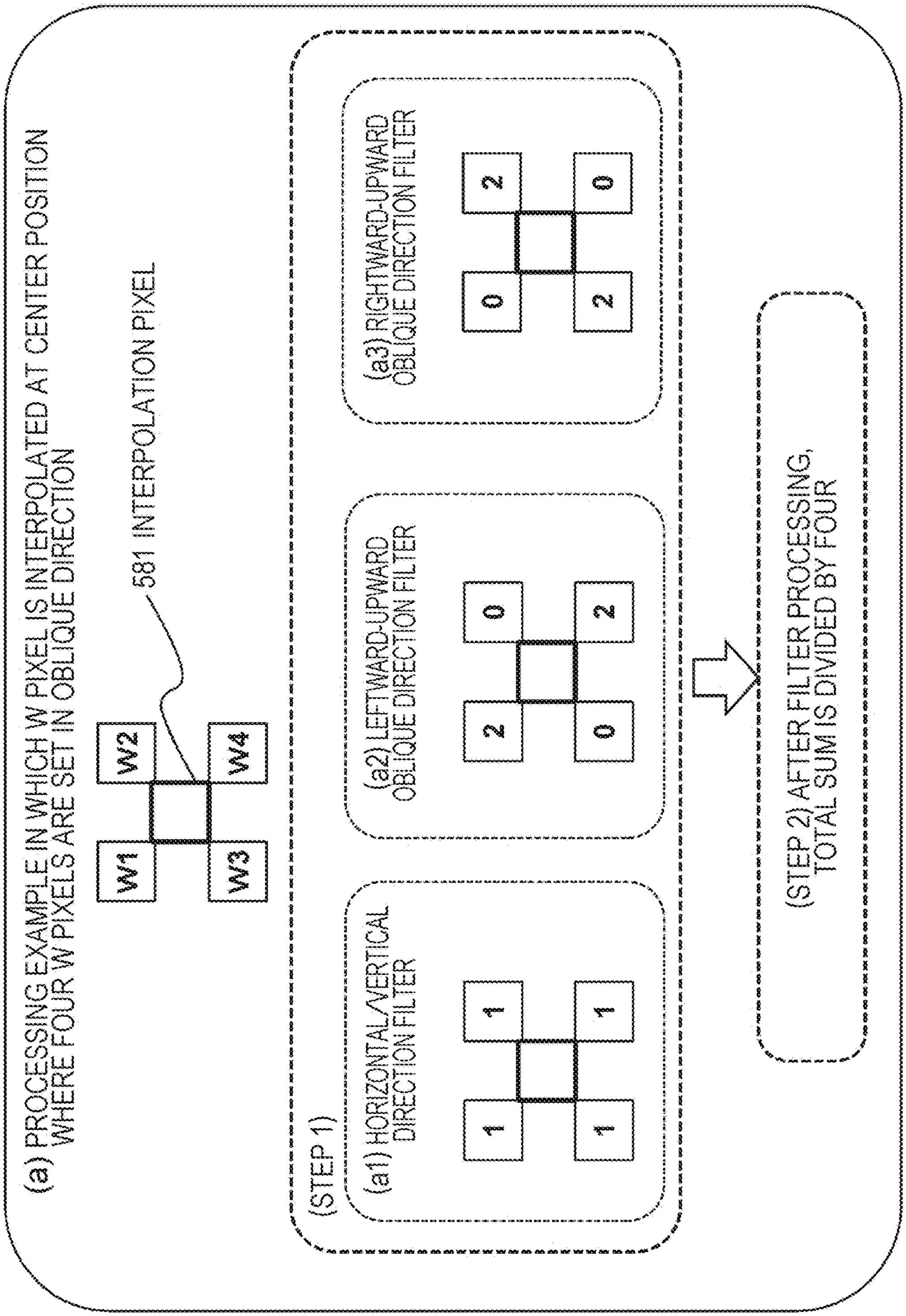
FIG. 27 is a diagram for illustrating an example of W pixel interpolation processing.

FIG. 27 illustrates a processing example in which the W pixel is interpolated at a center position where four W pixels are set in an oblique direction (a).

The center position of the four W pixels (W1 to W4) illustrated in FIG. 27 is an interpolation pixel position 581.

In this example, filter selection processing according to the edge direction detected by the edge direction detection unit 572 is the processing illustrated in FIG. 27 (Step 1). FIGS. 27(*a*1) to 27(*a*3) illustrate the following filter setting examples.

(a1) Filter when the edge direction is the horizontal or vertical direction (a2) Filter when the edge direction is the leftward-upward oblique direction (a3) Filter when the edge direction is the rightward-upward oblique direction According to the edge direction, any one filter is selected, and the pixel value of each pixel position is added by multiplying a coefficient set for each filter.

Furthermore, in (Step 2) illustrated in FIG. 27, a total sum value of the addition value is divided by four. The deduction value is the interpolation W pixel value to be set for the interpolation pixel position 581.

Specifically, for example, when the edge direction is the horizontal direction, the filter in FIG. 27(*a*1) is applied. When the pixel values of four W pixels (W1 to W4) are set to be W1 to W4, an interpolation pixel value W to be set for the interpolation pixel position 581 is calculated by the following equation.

$$W=(W1+W2+W3+W4)/4$$

Figure 28:
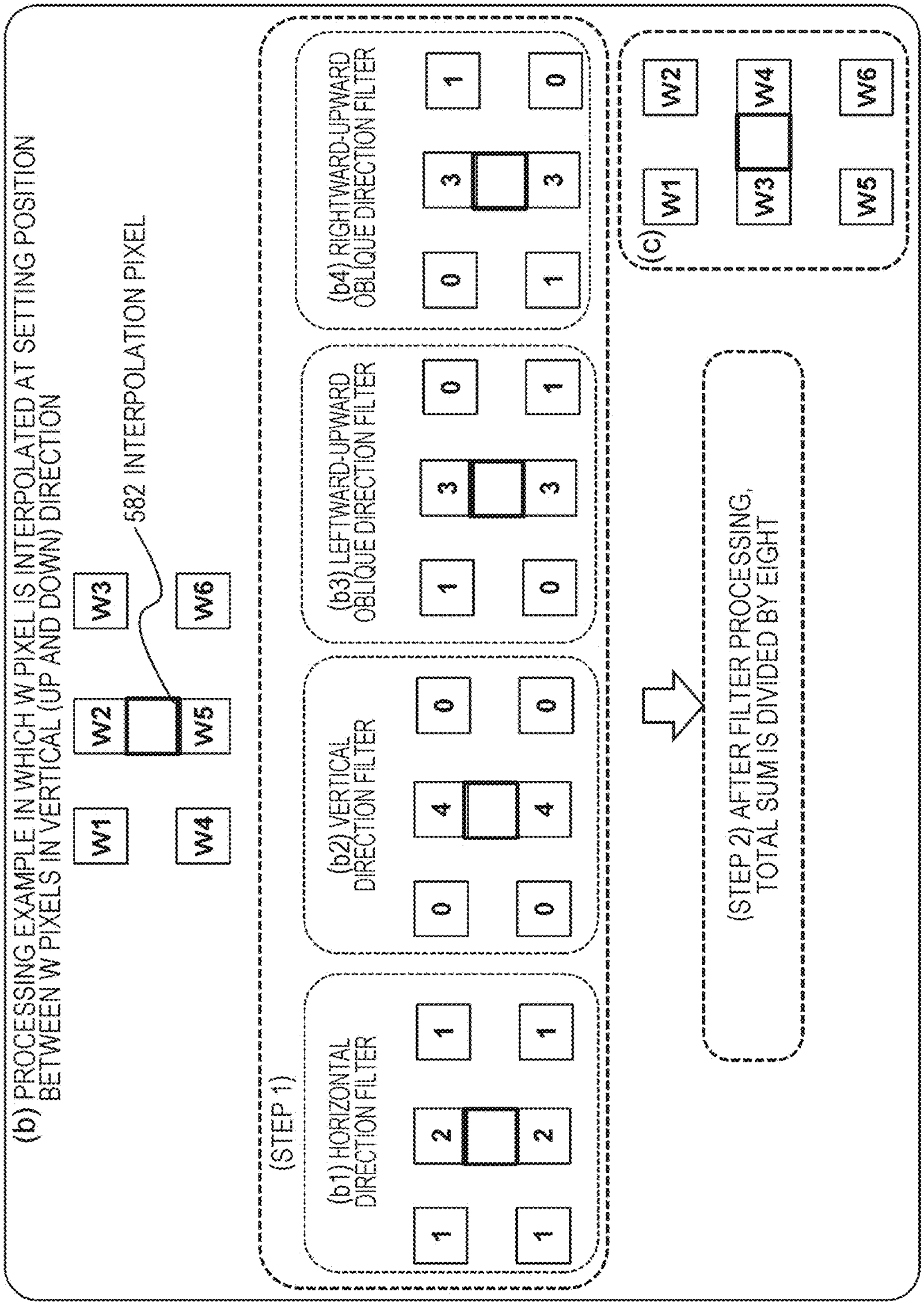
FIG. 28 is a diagram for illustrating an example of W pixel interpolation processing.

FIG. 28 illustrates a processing example in which the W pixel is interpolated at a setting position between the W pixels in the vertical (up and down) direction (b).

The center position of six W pixels (W1 to W6) illustrated in FIG. 28 is an interpolation pixel position 582.

In this example, filter selection processing according to the edge direction detected by the edge direction detection unit 572 is the processing of (Step 1) illustrated in FIG. 28. FIGS. 28(*b*1) to 28(*b*4) illustrate the following filter setting examples.

(b1) Filter when the edge direction is the horizontal direction (b2) Filter when the edge direction is the vertical direction (b3) Filter when the edge direction is the leftward-upward oblique direction (b4) Filter when the edge direction is the rightward-upward oblique direction According to the edge direction, any one filter is selected, and the pixel value of each pixel position is added by multiplying a coefficient set for each filter.

Furthermore, in (Step 2) illustrated in FIG. 28, a total sum value of the addition value is divided by eight. The division value is the interpolation W pixel value to be set for the interpolation pixel position 582.

Specifically, for example, when the edge direction is the horizontal direction, the filter in FIG. 28(*b*1) is applied. When the pixel values of six W pixels (W1 to W6) are set to be W1 to W6, the interpolation pixel value W to be set for the interpolation pixel position 582 is calculated by the following equation.

$$W=(W1+(2\times W2)+W3+W4+(2\times W5)+W6)/8$$

In addition to the processing described with reference to FIGS. 27 and 28, the interpolation pixel position includes a position interposed between the W pixels in the horizontal direction as illustrated in FIG. 28(*c*). In this case, the filter described in FIG. 28 may be rotated by 90 degrees for application.

In this manner, the W pixel interpolation unit 551 applies only the long-period exposure W pixel data 560L within the sensor image 503, and performs the W pixel interpolation processing for setting the long-period exposure W pixel value at a non-occupied position of pixels other than the long-period exposure W pixel, thereby generating the whole W pixel long-period exposure image 561L in which the long-period exposure W pixel is set for all pixels.

Similarly, the W pixel interpolation unit 551 applies only the short-period exposure W pixel data 560S within the sensor image 503, and performs the W pixel interpolation processing for setting the short-period exposure W pixel value at a non-occupied position of pixels other than the short-period exposure W pixel, thereby generating the whole W pixel short-period exposure image 561S in which the short-period exposure W pixel is set for all pixels.

The RGBW pixel generation unit 552 of the array conversion unit 504 illustrated in FIG. 24 inputs the sensor image 503 having the RGBW array in which the long-period exposure pixel and the short-period exposure pixel are alternately set on a row-by-row basis, and generates the RGBW corresponding LPF signal serving as a low frequency signal (LPF signal) of each RGBW pixel signal at each pixel position.

This processing is basically the same as the processing described with reference to FIGS. 7 and 8 in the above-described first embodiment. However, in the present embodiment, only the long-period exposure pixel is used as the reference pixel so as to generate a long-period exposure RGBW corresponding low frequency signal 562L which is the low frequency signal (LPF signal) of the long-period exposure RGBW signal. Furthermore, only the short-period exposure pixel is used as the reference pixel so as to generate a short-period exposure RGBW corresponding low frequency signal 562S which is the low frequency signal (LPF signal) of the short-period exposure RGBW signal.

The HDR composition unit 553 generates a high dynamic range (HDR) image by inputting a generation signal of the W pixel interpolation unit 551 and a generation signal of the RGBW pixel generation unit 552.

The HDR composition unit 553 inputs these respective signals such as the whole W pixel long-period exposure image 561L and the whole W pixel short-period exposure image 561S which are the generation signals of the W pixel interpolation unit 551, and the long-period exposure LPF signal 562L and the short-period exposure LPF signal 562S which are the generation signals of the RGBW pixel generation unit 552.

The HDR composition unit 553 performs the following two types of processing.

(First Processing)

Processing for generating and outputting a high dynamic range whole W pixel image 563 by inputting two signals such as (a1) the whole W pixel long-period exposure image 561L and (a2) the whole W pixel short-period exposure image 561S which are the generation signals of the W pixel interpolation unit 551.

(Second Processing)

Processing for generating and outputting a high dynamic range RGBW low frequency (LPF) signal 564 by inputting two signals such as (b1) the long-period exposure LPF signal 562L and (b2) the short-period exposure LPF signal 562S which are the generation signals of the RGBW pixel generation unit 552.

As illustrated in FIG. 24, the HDR composition unit 553 performs these two types of processing, generates (A) the high dynamic range whole W pixel image 563 and (B) the high dynamic range RGBW low frequency (LPF) signal 564, and outputs (A) and (B) to the correlation processing unit 554.

Processing performed by the HDR composition unit 553 will be described with reference to FIG. 29.

Figure 29:
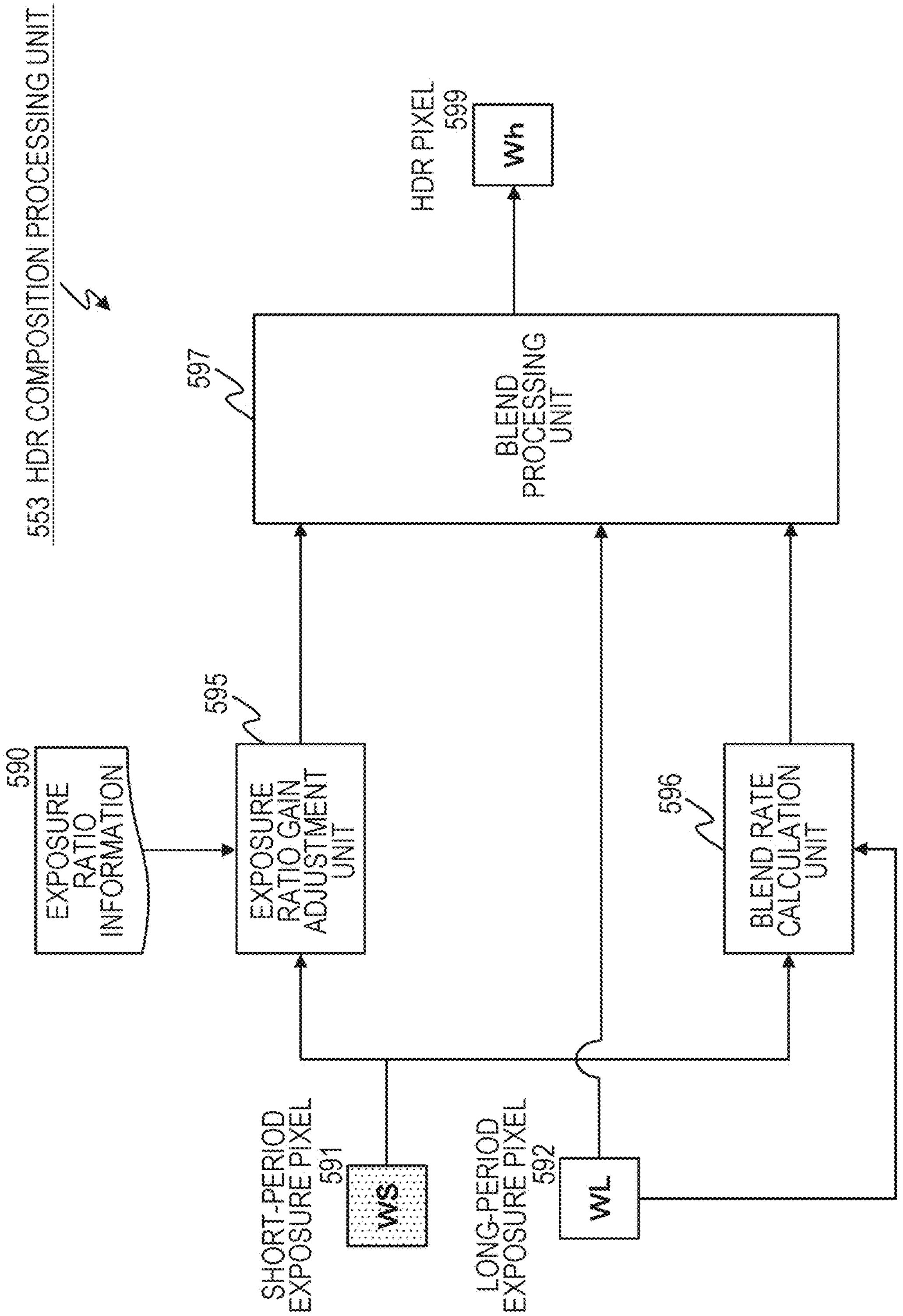
FIG. 29 is a diagram for illustrating a configuration and a process of an HDR composition processing unit.

As a representative example, FIG. 29 illustrates a configuration of generating the high dynamic range whole W pixel image 563 in the above processing (A) between the two types of processing.

That is, the HDR composition unit 553 has the configuration of performing the processing for generating and outputting the high dynamic range whole W pixel image 563 by inputting two signals of (a1) the whole W pixel long-period exposure image 561L and (a2) the whole W pixel short-period exposure image 561S which are the generation signals of the W pixel interpolation unit 551.

The processing for generating (B) the high dynamic range RGBW low frequency (LPF) signal 564 is the same as the above-described processing, except that input and output data are different. Therefore, herein, a W pixel generation processing example will be described as a representative example.

The HDR composition unit 553 calculates a pixel value of the high dynamic range (HDR) image by performing composition processing (blend) of the pixel values of the long-period exposure pixel and the short-period exposure pixel which have the same color. For example, the long-period exposure pixel is used for a dark subject, thereby acquiring an image having less noise. The short-period exposure pixel is used for a bright subject, thereby acquiring an image having no saturation.

As illustrated in FIG. 29, the HDR composition unit 553 has an exposure ratio gain adjustment unit 595, a blend rate calculation unit 596, and a blend processing unit 597.

The exposure ratio gain adjustment unit 595 inputs exposure ratio information 590 between an exposure period for the short-period exposure pixel and an exposure period for the long-period exposure pixel during image capturing, which are received from the control unit. The exposure ratio gain adjustment unit 595 outputs a result obtained by multiplying the short-period exposure pixel 592 within the input image and a gain corresponding to the exposure ratio information 590 to the blend processing unit 597.

The blend rate calculation unit 596 calculates a blend rate by inputting the short-period exposure pixel 592 and the long-period exposure pixel 593 which are blend targets. The pixels which are the blend targets are configured to have the short-period exposure pixel and the long-period exposure pixel which have the same color within a preset pixel region unit. The present example employs the long-period exposure W pixel and the short-period exposure W pixel.

The blend rate is calculated by applying a preset calculation equation. For example, when the blend rate ($\alpha$) is calculated by using a long-period exposure pixel value (DL), the blend rate is calculated according to the following calculation equation.

```
if (DL < Th0)
    α = 0
Else if (DL < Th1)
    α = (DL − Th0) / (Th1 − Th0)
Else
    α = 1
```

In the above calculation equation, the blend rate of the short-period exposure pixel in $\alpha$: an output HDR pixel is Th0, Th1: a preset threshold value.

Figure 30:
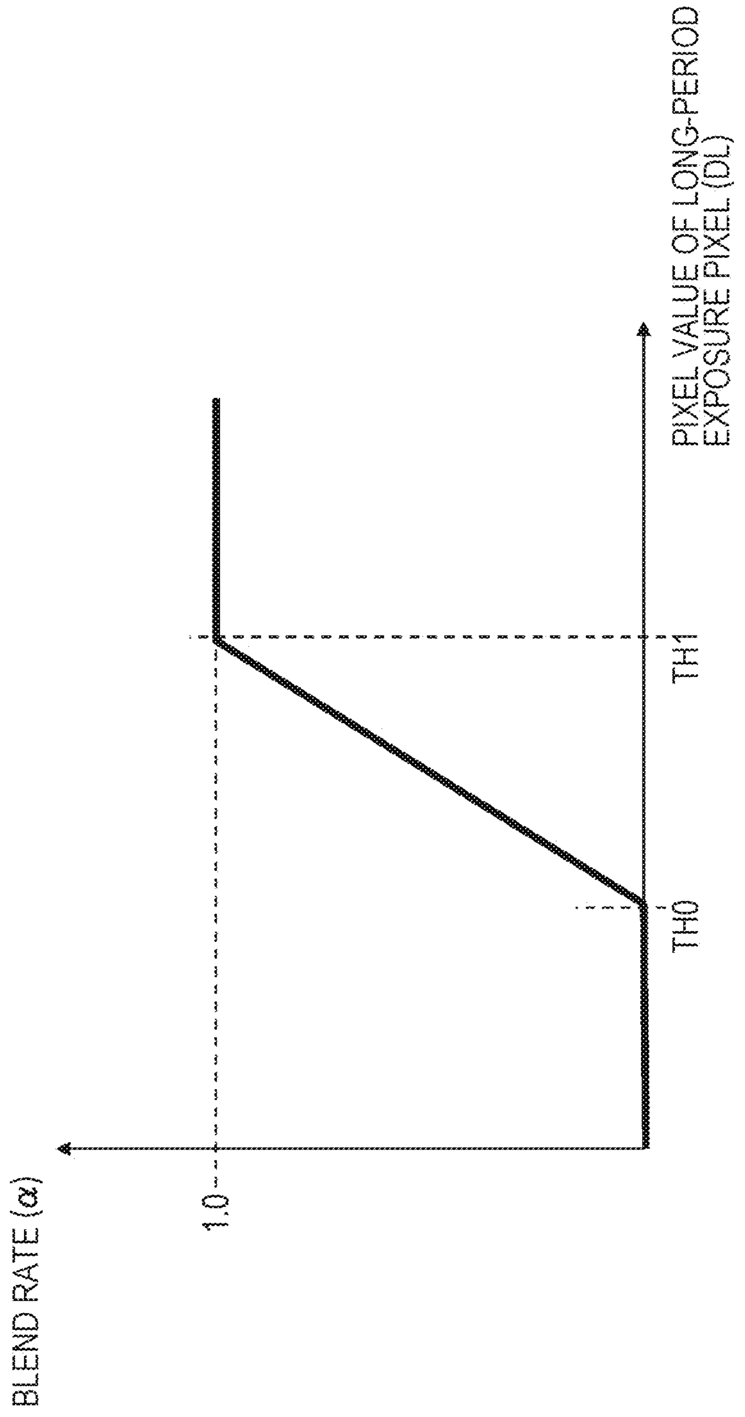
FIG. 30 is a diagram for illustrating a setting example of a blend ratio in HDR composition.

Correspondence between the pixel value (DL) of the long-period exposure pixel and the blend rate ($\alpha$) corresponding to the above blend rate calculation equation indicates a setting of a graph illustrated in FIG. 30.

When the pixel value (DL) of the long-period exposure pixel is a dark pixel value, the pixel value of the long-period exposure pixel is frequently used, thereby acquiring an image having less noise. In a case of a bright subject, the pixel value of the short-period exposure pixel is frequently used, thereby acquiring an image having no saturation.

The blend processing unit 597 illustrated in FIG. 29 inputs the above-described blend rate ($\alpha$) from the blend rate calculation unit 596. According to the input blend rate ($\alpha$), the blend processing unit 597 blends a pixel value of a short-period exposure pixel (WS) 591 and a pixel value of a long-period exposure pixel (WL) 592, and determines a W pixel value of the whole W pixel image 563 serving as the HDR image.

For example, when the pixel value of the short-period exposure pixel (WS) 591 is set to be DS, the pixel value of the long-period exposure pixel (WL) 592 is set to be DL, a gain ratio between the long-period exposure pixel and the short-period exposure pixel, the blend rate is set to be Gain, and the blend ratio is set to be α, the W pixel value: DO of the whole W pixel image 563 serving as the HDR image is calculated by the following calculation equation.

$$DO = DL\times(1-\alpha)+DS\times\mathrm{Gain}\times\alpha$$

According to the above equation, the blend processing unit 597 determines the W pixel value of the whole W pixel image 563 serving as the HDR image.

An example of the processing performed by the HDR composition processing unit 553 to generate the high dynamic range whole W pixel image 563 has been described with reference to FIG. 29. However, as described above, the HDR composition processing unit 553 performs the same processing, generates (A) the high dynamic range whole W pixel image 563 and (B) the high dynamic range RGBW low frequency (LPF) signal 564, and outputs these to the correlation processing unit 554.

The correlation processing unit 554 inputs (A) the high dynamic range whole W pixel image 563 and (B) the high dynamic range RGBW low frequency (LPF) signal 564 which are output from the HDR composition processing unit 553, and generates and outputs the Bayer array HDR image 505 having the RGB array by applying these signals.

This correlation processing unit 554 performs the processing the same as the processing of the correlation processing unit 153 in the first embodiment which has been described with reference to FIG. 9.

In this manner, the array conversion unit 504 of the image processing apparatus of the present embodiment which is illustrated in FIG. 22 generates and outputs the Bayer array HDR image 505 to the gradation conversion unit 506 illustrated in FIG. 22.

The gradation conversion unit 506 performs processing for adjusting a scope of the pixel value set by the above-described high dynamic range processing to fall within a scope in which a camera signal processing unit 508 can perform the next stage of processing. For example, when the pixel value on which the camera signal processing unit 508 can perform the processing is 8-bit data, the gradation conversion unit 506 performs gradation conversion processing for setting all configuring pixel values of the Bayer array HDR image 505 to fall within 8-bits. Through this processing, a gradation conversion HDR image 507 is generated and output.

For example, if the output of the sensor indicates 12-bits and an exposure rate is 16 times, the output of the array conversion unit indicates 16-bits. The processing is performed in order to compress this signal to have a bit width of a signal which can also be used in the camera signal processing in the related art. This gradation conversion processing can employ the existing technology.

In this manner, through the gradation conversion processing, the gradation conversion unit 506 generates and outputs the gradation conversion HDR image 507 to the camera signal processing unit 508.

In the subsequent processing, the processing which is the same as the processing in the imaging apparatus in the related art can be performed. That is, the camera signal processing unit 508 performs the signal processing, for example, the general camera signal processing such as the white balance adjustment, the gamma correction, and the demosaic processing, for the gradation conversion HDR image 507, and generates the output image 509.

In this manner, the fifth embodiment has a configuration in which the high dynamic range (HDR) processing for the image can be concurrently performed in addition to the array conversion processing described in the first embodiment.

This HDR image generation configuration of the fifth embodiment can also be additionally applied to the second embodiment and the third embodiment which are described above.

In the present embodiment, the image sensor also has the configuration described with reference to FIG. 2(*a*), and the number of respective RGB pixels per unit composition is uniformly set. Accordingly, when the pixel value of each RGB color for each pixel position is set, it is possible to sufficiently acquire the pixel value of each color from the reference area. Therefore, it is possible to very accurately perform the setting process of each RGB color for each pixel position, and thus, it is possible to generate the RGB image having less color noise or fewer false colors.

[6. Configuration and Processing of Image Processing Apparatus According to Sixth Embodiment]

Next, a processing example in which the pixel addition processing described as the fourth embodiment and the high dynamic range (HDR) image generation processing described as in the fifth embodiment are combinedly performed will be described as a sixth embodiment.

Figure 31:
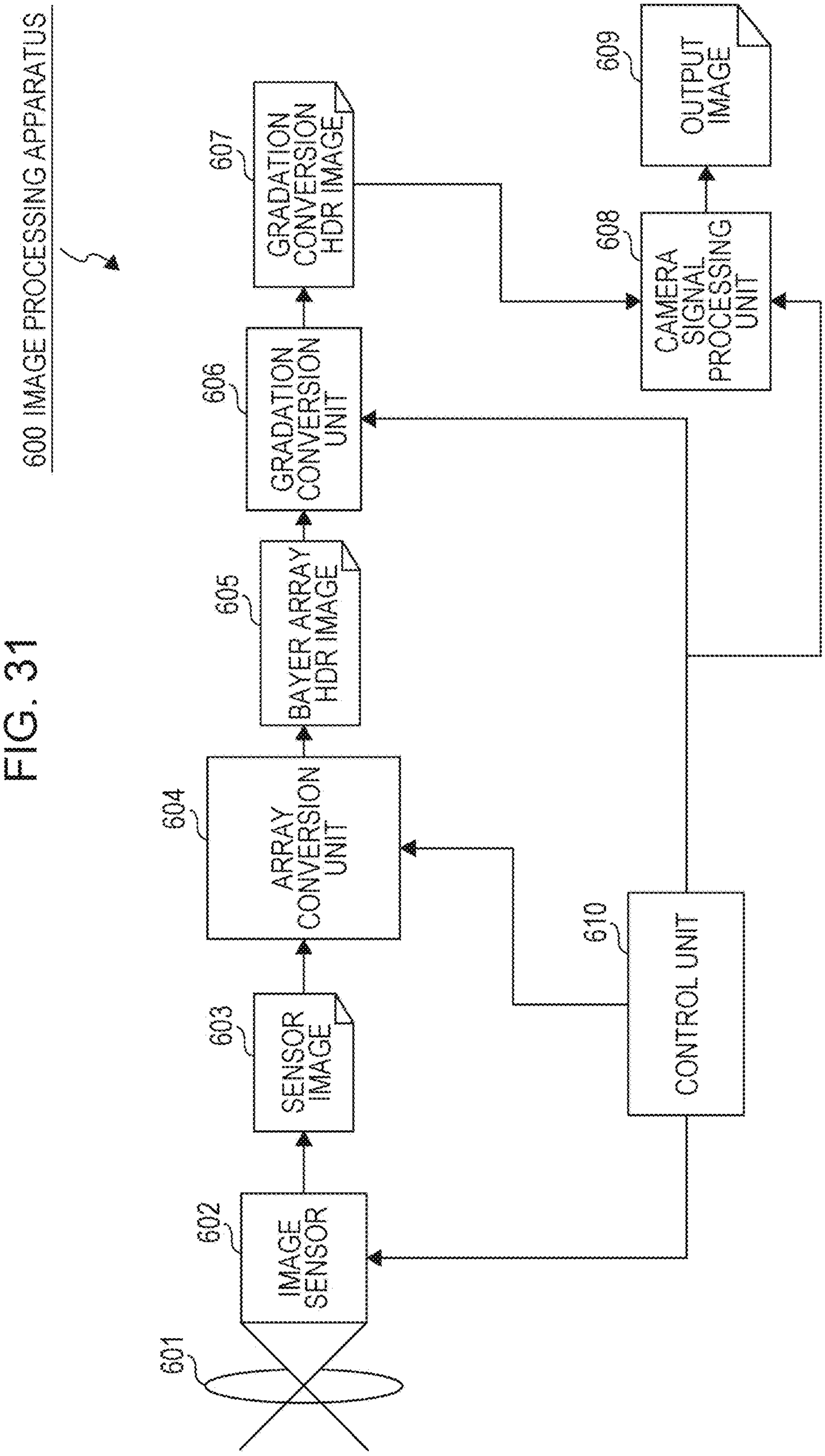
FIG. 31 is a diagram for illustrating a configuration example of an image processing apparatus according to the fifth embodiment.

FIG. 31 illustrates a configuration example of an image processing apparatus 600 according to the present embodiment.

The image processing apparatus 600 illustrated in FIG. 31 is configured to have configuring elements which are the same as those in the image processing apparatus 500 described as the fifth embodiment with reference to FIG. 22.

Light incident through an optical lens 601 is photoelectrically converted by an image sensor (imaging device) 602, and a sensor output image 603 is output from the image sensor 602. The image sensor 602 is configured to have a CMOS, or the like, for example. A pixel array of the image sensor (imaging device) 602 has the RGBW array illustrated in FIG. 2(*a*) described above.

In the present embodiment, similar to the fifth embodiment, the image sensor (imaging device) 602 is set to have two different exposure periods. Furthermore, similar to the fourth embodiment, the image sensor 602 performs the pixel addition for the pixels having the same color, and outputs an image formed of a long-period exposure pixel and a short-period exposure pixel of the addition pixel value.

In the present embodiment, the long-period exposure pixel and the short-period exposure pixel are alternately set on a two-row-by-two-row basis of the image sensor. An exposure control in these pixel units is performed by a control unit 610.

A specific example of the exposure control setting and an output image will be described later with reference to FIG. 32.

An array conversion unit 604 inputs the sensor image 603 formed of pixels having a different exposure setting period, that is, an image in which the long-period exposure pixel and the short-period exposure pixel which are configured to have an addition pixel value are alternately set on a row-by-row basis, and generates the high dynamic range image (HDR image) by performing composition processing on the image having two exposure periods.

Furthermore, the array conversion unit 604 performs pixel array conversion processing in conjunction with the generation of the high dynamic range image (HDR image), and generates a Bayer array HDR image 605.

The Bayer array HDR image 605 is input to a gradation conversion unit 606.

The gradation conversion unit 606 performs processing for adjusting a scope of the pixel value set by high dynamic range processing to fall within a scope in which a camera signal processing unit 608 can perform the next stage of processing. For example, when the pixel value on which the camera signal processing unit 608 can perform the processing is 8-bit data, the gradation conversion unit 606 performs gradation conversion processing for setting all configuring pixel values of the Bayer array HDR image 605 to fall within 8-bits. Through this processing, a gradation conversion HDR image 607 is generated and output.

The camera signal processing unit 608 performs signal processing on the gradation conversion HDR image 507 having the Bayer array, and generates the output image 509.

The control unit 510 generates control signals for an exposure control of the image sensor 602, processing controls of the array conversion unit 604, the gradation conversion unit 606, and the camera signal processing unit 608, and supplies the signals to each of these configuration units. The control unit 610 performs overall controls on processes from image capturing to output image generation. For example, the control unit 608 includes a CPU having a program executing function, and performs overall controls on the processes executed in the imaging apparatus in accordance with a program stored in a memory (not illustrated).

A specific example of exposure control processing in the image sensor 602 and the sensor image 603 which is an output image will be described with reference to FIG. 32.

Figure 32:
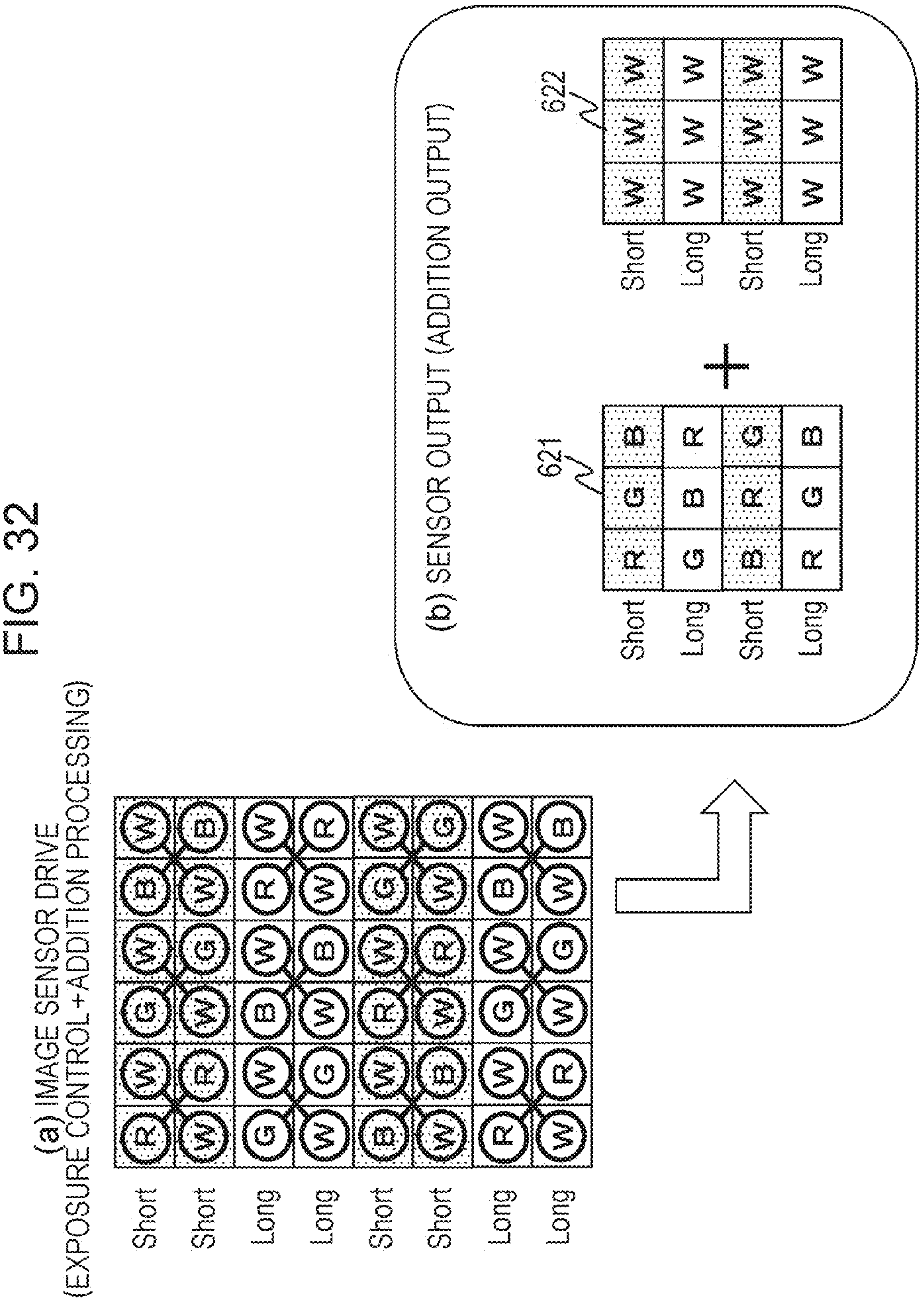
FIG. 32 is a diagram for illustrating a drive example and an output example of an image sensor.

FIG. 32(*a*) illustrates a drive processing mode of the image sensor 602.

FIG. 32(*b*) illustrates the sensor image 603 output from the image sensor 602.

As illustrated in FIG. 23(*a*), in the present embodiment, a short-period exposure pixel (Short) and a long-period exposure pixel (Long) are alternately set on a two-row-by-two-row basis. Furthermore, a pixel value of pixels having the same color which are adjacent to each other in an oblique direction within the short-period exposure pixels (Short) in two lines is added and output. This addition is the analog addition described in the fourth embodiment. This processing reduces a processing load of the AD converter, thereby enabling output processing at a high frame rate.

The sensor image 603 output from the image sensor 602 represents images illustrated in FIG. 32(*b*). That is, the sensor image is configured to have an RGB image 621 in which the short-period exposure pixel and the long-period exposure pixel are alternately set on a row-by-row basis, and a W image 622 in which the short-period exposure pixel and the long-period exposure pixel are alternately set on a row-by-row basis.

These images are output to the array conversion unit 604.

Processing performed by the array conversion unit 604 will be described with reference to FIG. 33.

Figure 33:
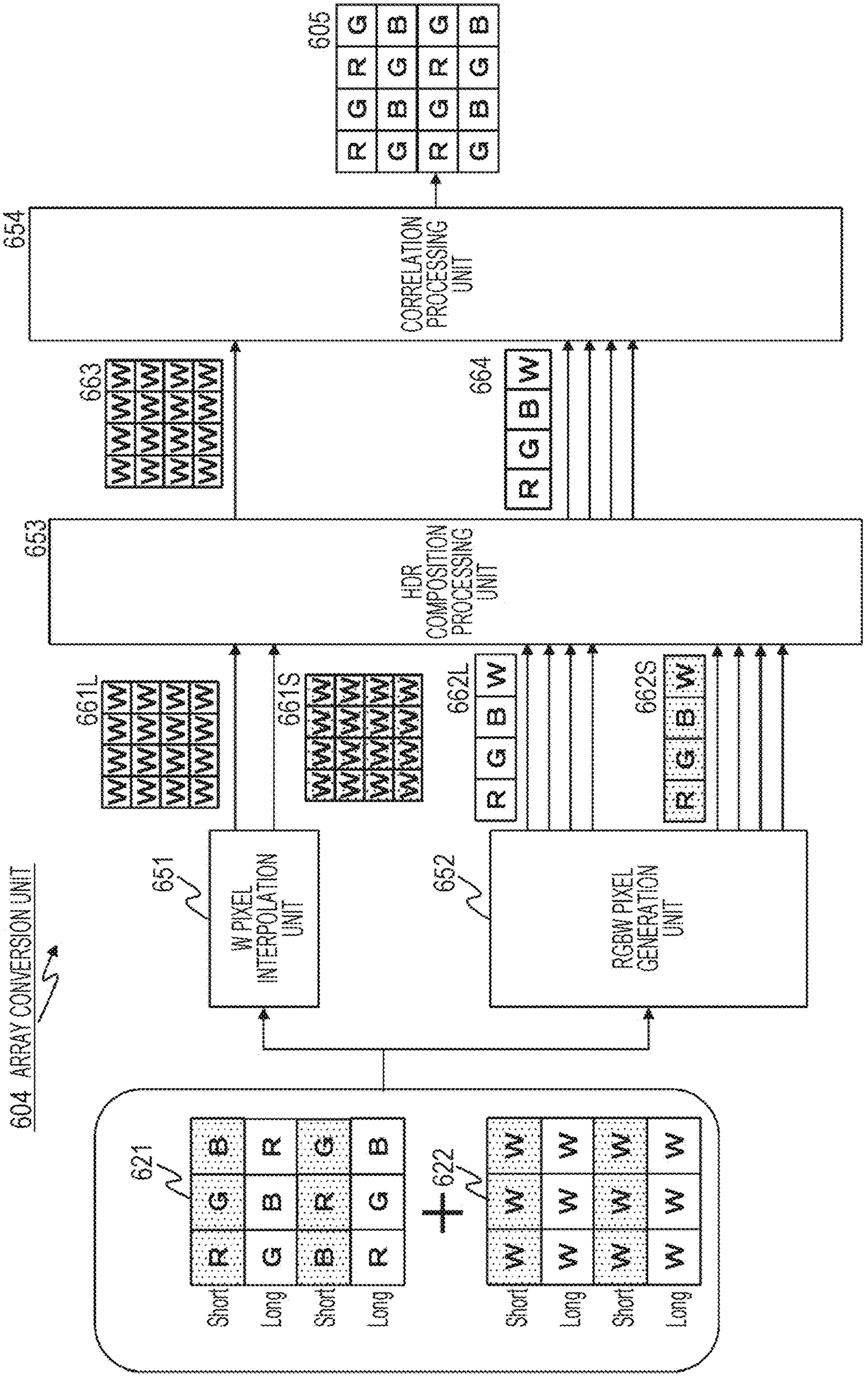
FIG. 33 is a diagram for illustrating a configuration and a process of an array conversion unit.

As illustrated in FIG. 33, the array conversion unit 604 has a W pixel interpolation unit 651, an RGBW pixel generation unit 652, an HDR composition processing unit 653, and a correlation processing unit 654.

As described above with reference to FIG. 32, the sensor image 603 input from the array conversion unit 604 is configured to have these two types of image, such as the RGB image 621 in which the short-period exposure pixel and the long-period exposure pixel are alternately set on a row-by-row basis, and the W image 622 in which the short-period exposure pixel and the long-period exposure pixel are alternately set on a row-by-row basis.

The W pixel interpolation unit 651 inputs the W image 622 in which the long-period exposure pixel and the short-period pixel are alternately set on a row-by-row basis, and generates the following two whole W pixel images. That is, images such as (1) a whole W pixel long-period exposure image 661L in which the long-period exposure W pixel is set for all pixels, and (2) a whole W pixel short-period exposure image 661S in which the short-period exposure W pixel is set for all pixels are generated.

The interpolation processing is the same as the above-described processing in the first embodiment. However, when the whole W pixel long-period exposure image 661L is generated, the processing is performed with reference to only the long-period exposure pixel. When the whole W pixel short-period exposure image 661S is generated, the processing is performed with reference to only the short-period exposure pixel.

Processing of the W pixel interpolation unit 651 will be described with reference to FIG. 34.

The W pixel interpolation unit 651 inputs the W image 622 in which the long-period exposure pixel and the short-period pixel are alternately set on a row-by-row basis, and generates the whole W pixel long-period exposure image 661L in which the long-period exposure W pixel is set for all pixels, and the whole W pixel short-period exposure image 661S in which the short-period exposure W pixel is set for all pixels.

When the whole W pixel long-period exposure image 661L in which the long-period exposure W pixel is set for all pixels is generated, the W pixel interpolation unit 651 applies only the long-period exposure W pixel data within the W image 622, and performs the W pixel interpolation processing for setting the long-period exposure W pixel value at a non-occupied position of pixels other than the long-period exposure W pixel.

Figure 34:
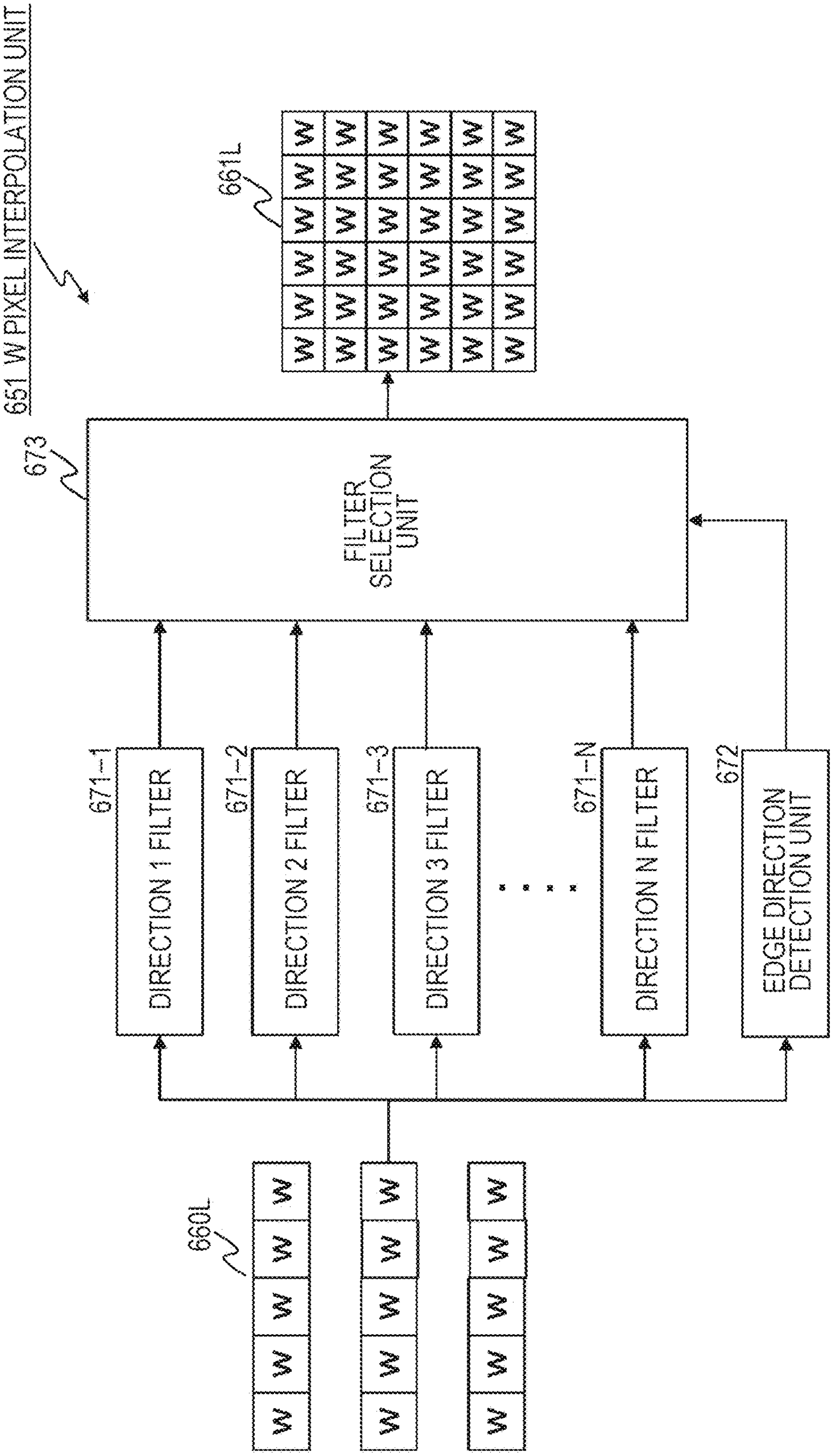
FIG. 34 is a diagram for illustrating a configuration and a process of a W pixel interpolation unit.

FIG. 34 illustrates a processing configuration for generating the whole W pixel long-period exposure image 661L in which the long-period exposure W pixel is set for all pixels.

When the whole W pixel short-period exposure image 661S in which the short-period exposure W pixel is set for all pixels is generated, the W pixel interpolation unit 651 applies only the short-period exposure W pixel data within the W image 622, and performs the W pixel interpolation processing for setting the short-period exposure W pixel value at a non-occupied position of pixels other than the short-period exposure W pixel.

In these processes, only input and output data are different. These processes are performed basically according to the configuration illustrated in FIG. 34.

Hereinafter, as a representative example, processing for generating the whole W pixel long-period exposure image 661L in which the long-period exposure W pixel is set for the pixel will be described with reference to FIG. 34.

As illustrated in FIG. 34, the W pixel interpolation unit 651 has multiple direction filters 671-1 to 671-N which perform filter processing such as processing in which pixel values of the W pixel present in multiple different directions are averaged as a reference pixel, an edge direction detection unit 672 which detects an edge direction, and a filter selection unit 673 which determines an interpolation pixel value by means of filter selection.

When the whole W pixel long-period exposure image 661L is generated, the long-period exposure W pixel data within the W image 622, that is, only the long-period exposure W pixel data 660L illustrated in FIG. 34, is selectively input. Based on the input image, a predetermined reference area (for example, k pixel×k pixel) including the position of the interpolation pixel which is the processing target pixel is set. The edge direction detection unit 672 detects the edge direction, based on the pixel value of the reference area. The filter selection unit 673 selects a filter for performing the filter processing in which the W pixels present along the edge direction, that is, in a direction having a slight gradient of the pixel value, are set to be the reference pixel, and calculates the W pixel value serving as the interpolation pixel value by applying the selected filter. For example, an average value of the pixel values of the W pixels present in the direction having the slight gradient is calculated, and the W pixel value of the processing target pixel position is set.

An example of the edge direction detection processing and the setting processing of the interpolation pixel value will be described with reference to FIG. 35.

In FIG. 35, an interpolation pixel position of the W pixel is set to be a position indicating an interpolation pixel 682.

That is, long-period exposure W pixels W1 to W5 are set to be continuously arranged in an upper row, and long-period exposure W pixels W6 to W10 are set to be continuously arranged in a lower row. In this setting, processing for interpolating the long-period exposure W pixel is performed on the pixels between W3 and W8.

A processing example in which three direction filters are applied to this setting will be described.

W1 to W10 are set to be pixel values of the respective pixel positions.

As illustrated in FIG. 35(*a*), each direction filter performs the following filter processing.

$$F1=(W2+W9)/2 \quad \text{Direction 1 filter:}$$

$$F2=(W3+W8)/2 \quad \text{Direction 2 filter:}$$

$$F3=(W4+W7)/2 \quad \text{Direction 3 filter:}$$

The direction 1 filter 1 is a filter applicable when the edge direction is a leftward-upward direction.

The direction 2 filter 2 is a filter applicable when the edge direction is a vertical direction.

The direction 3 filter 3 is a filter applicable when the edge direction is a rightward-upward direction.

FIG. 35(*b*) illustrates a filter selection processing example based on a result of edge direction determination performed by the edge direction detection unit 672 and edge direction determination performed by the filter selection unit 673.

In the edge direction determination performed by the edge direction detection unit 672, three edge amounts are first calculated according to the following equations.

$$D1=(|W1-W8|+2|W2-W9|+|W3-W10|)/4 \quad \text{(1) Edge amount of the leftward-upward direction (direction 1):}$$

$$D2=(|W2-W7|+2|W3-W8|+|W4-W9|)/4 \quad \text{(2) Edge amount of the vertical direction(direction 2):}$$

$$D3=(|W3-W6|+2|W4-W7|+|W5-W8|)/4 \quad \text{(1) Edge amount of the rightward-upward direction (direction 3):}$$

Thereafter, the edge direction detection unit 672 performs the following edge direction determination processing, based on the edge amount of the above-described three directions.

In a case of D1<D2 and D1<D3, edge direction=leftward-upward direction (direction 1), In a case of D3<D1 and D3<D2, edge direction=rightward-upward direction (direction 3), Otherwise, edge direction=vertical direction (direction 2), This edge direction determination is performed and the determination result is output to the filter selection unit 673.

The filter selection unit 673 inputs the edge direction determination result of the edge direction detection unit 672, and calculates an interpolation pixel value to which any one of the three direction filters illustrated in FIG. 35(*a*), according to the input edge direction determination result, is applied.

That is, an interpolation pixel value W is calculated by applying any one selected filter of the following (1) to (3).

(1) In a case of edge direction=leftward-upward direction (direction 1), the following calculation of the interpolation pixel value W is performed by applying the direction 1 filter F1.

$$W=(W2+W9)/2$$

(2) In a case of edge direction=vertical direction (direction 2), the following calculation of the interpolation pixel value W is performed by applying the direction 2 filter F2.

$$W=(W3+W8)/2$$

In a case of edge direction=rightward-upward direction (direction 3), the following calculation of the interpolation pixel value W is performed by applying the direction 3 filter F3.

$$W=(W4+W7)/2$$

In this manner, the W pixel interpolation unit 651 applies only the long-period exposure W pixel 660L within the sensor image 603, and performs the W pixel interpolation processing for setting the long-period exposure W pixel value at a non-occupied position of pixels other than the long-period exposure W pixel, thereby generating the whole W pixel long-period exposure image 661L in which the long-period exposure W pixel is set for all pixels.

Similarly, the W pixel interpolation unit 651 applies only the short-period exposure W pixel, and performs the W pixel interpolation processing for setting the short-period exposure W pixel value at a non-occupied position of pixels other than the short-period exposure W pixel, thereby generating the whole W pixel short-period exposure image 661S in which the short-period exposure W pixel is set for all pixels.

The RGBW pixel generation unit 652 of the array conversion unit 604 illustrated in FIG. 33 inputs the sensor image 603 having the RGBW array in which the long-period exposure pixel and the short-period exposure pixel are alternately set on a row-by-row basis, and generates the RGBW corresponding LPF signal serving as a low frequency signal (LPF signal) of each RGBW pixel signal at each pixel position.

This processing is basically the same as the processing described with reference to FIGS. 7 and 8 in the above-described first embodiment. However, in the present embodiment, only the long-period exposure pixel is used as the reference pixel so as to generate a long-period exposure LPF signal 662L which is the low frequency signal (LPF signal) of the long-period exposure RGBW signal. Furthermore, only the short-period exposure pixel is used as the reference pixel so as to generate a short-period exposure LPF signal 662S which is the low frequency signal (LPF signal) of the short-period exposure RGBW signal.

An HDR composition unit 653 generates a high dynamic range (HDR) image by inputting a generation signal of the W pixel interpolation unit 651 and a generation signal of the RGBW pixel generation unit 652.

The HDR composition unit 653 inputs these respective signals such as the whole W pixel long-period exposure image 661L and the whole W pixel short-period exposure image 661S which are the generation signals of the W pixel interpolation unit 651, and the long-period exposure LPF signal 662L and the short-period exposure LPF signal 662S which are the generation signals of the RGBW pixel generation unit 652.

The HDR composition unit 653 performs the following two types of processing.

(First Processing)

Processing for generating and outputting the high dynamic range whole W pixel image 563 by inputting two signals such as (a1) the whole W pixel long-period exposure image 661L and (a2) the whole W pixel short-period exposure image 661S which are the generation signals of the W pixel interpolation unit 651.

(Second Processing)

Processing for generating and outputting a high dynamic range RGBW low frequency (LPF) signal 664 by inputting two signals such as (b1) the long-period exposure LPF signal 662L and (b2) the short-period exposure LPF signal 662S which are the generation signals of the RGBW pixel generation unit 652.

As illustrated in FIG. 33, the HDR composition unit 653 performs these two types of processing, generates (A) the high dynamic range whole W pixel image 663 and (B) the high dynamic range RGBW low frequency (LPF) signal 664, and outputs (A) and (B) to the correlation processing unit 654.

The processing performed by the HDR composition unit 653 is the same as the processing in the fifth embodiment, which has been described with reference to FIGS. 29 and 30.

That is, the pixel value of the HDR image is set by blending the long-period exposure pixel and the short-period exposure pixel.

When the pixel value (DL) of the long-period exposure pixel is a dark pixel value, the pixel value of the long-period exposure pixel is frequently used, thereby acquiring an image having less noise. In a case of a bright subject, the pixel value of the short-period exposure pixel is frequently used, thereby acquiring an image having no saturation.

The correlation processing unit 654 inputs (A) the high dynamic range whole W pixel image 663 and (B) the high dynamic range RGBW low frequency (LPF) signal 664 which are output from the HDR composition processing unit 653, and generates and outputs a Bayer array HDR image 605 having the RGB array by applying these signals.

This correlation processing unit 654 performs the processing the same as the processing of the correlation processing unit 153 in the first embodiment which has been described with reference to FIG. 9.

In this manner, the array conversion unit 604 of the image processing apparatus of the present embodiment which is illustrated in FIG. 33 generates and outputs the Bayer array HDR image 605 to the gradation conversion unit 606 illustrated in FIG. 31.

The gradation conversion unit 606 performs processing for adjusting a scope of the pixel value set by the above-described high dynamic range processing to fall within a scope in which a camera signal processing unit 608 can perform the next stage of processing. For example, when the pixel value on which the camera signal processing unit 608 can perform the processing is 8-bit data, the gradation conversion unit 606 performs gradation conversion processing for setting all configuring pixel values of the Bayer array HDR image 605 to fall within 8-bits. Through this processing, a gradation conversion HDR image 607 is generated and output.

For example, if the output of the sensor indicates 12-bits and an exposure rate is 16 times, the output of the array conversion unit indicates 16-bits. The processing is performed in order to compress this signal to have a bit width of a signal which can also be used in the camera signal processing in the related art. This gradation conversion processing can employ the existing technology.

In this manner, through the gradation conversion processing, the gradation conversion unit 606 generates and outputs the gradation conversion HDR image 607 to the camera signal processing unit 608.

In the subsequent processing, the processing which is the same as the processing in the imaging apparatus in the related art can be performed. That is, the camera signal processing unit 608 performs the signal processing, for example, the general camera signal processing such as the white balance adjustment, the gamma correction, and the demosaic processing, for the gradation conversion HDR image 607, and generates the output image 609.

In this manner, the sixth embodiment has a configuration in which the high dynamic range (HDR) processing for the image can be performed concurrently with the pixel addition in the image sensor, in addition to the array conversion processing described in the first embodiment.

This HDR image generation configuration of the sixth embodiment can also be additionally applied to the second embodiment and the third embodiment which are described above.

In the present embodiment, the image sensor also has the configuration described with reference to FIG. 2(*a*), and the number of respective RGB pixels per unit composition is uniformly set. Accordingly, when the pixel value of each RGB color for each pixel position is set, it is possible to sufficiently acquire the pixel value of each color from the reference area. Therefore, it is possible to very accurately perform the setting process of each RGB color for each pixel position, and thus, it is possible to generate the RGB image having less color noise or fewer false colors.

[7. Example of Pixel Array of Image Sensor (Imaging Device)]

The first to sixth embodiments have been described by including a configuration in which the pixel array of the image sensor has the RGBW pixel array illustrated in FIG. 2(*a*), and a configuration in which the array conversion is performed for converting the RGBW pixel array into the Bayer array having the RGB array, based on the image sensor output.

However, without being limited to the output from the image sensor having the RGBW array illustrated in FIG. 2(*a*), the above-described processing according to each embodiment can also be applied to the sensor output image having the other pixel arrays.

Examples of the pixel array to which the processing of the present disclosure can be applied will be described with reference to FIGS. 36 to 38.

FIG. 36 illustrates an example of the RGBW pixel array having 6×6 pixel cycles to which the processing of the present disclosure can be applied.

A pixel array example 1 illustrated in FIG. 36(1) indicates an array which is the same as the above-described RGBW pixel array in FIG. 2(*a*).

Sequentially from the first row,
(first row) RWGWBW is repeated,
(second row) WRWGWB is repeated,
(third row) GWBWRW is repeated,
(fourth row) WGWBWR is repeated,
(fifth row) BWRWGW is repeated, and
(sixth row) WBWRWG is repeated.

Thereafter, in the rows from the seventh row, the above-described first to sixth rows are repeated.

Each row and each column are configured so that one W pixel is interposed therebetween and each RGB pixel is sequentially arranged. Within 6×6=36 pixels illustrated in FIG. 36(1), ½ is set to be 18 Nos. of the W pixels, ⅙ is set to be 6 Nos. of the R pixels, ⅙ is set to be 6 Nos. of the G pixels, and ⅙ is set to be 6 Nos. of the B pixels.

A pixel array example 2 illustrated in FIG. 36(2) indicates another array of the RGBW pixel array having 6×6 pixel cycles to which the processing of the present disclosure can be applied.

Sequentially from the first row,
(first row) RWGWBW is repeated,
(second row) WRWGWB is repeated,
(third row) BWRWGW is repeated,
(fourth row) WBWRWG is repeated,
(fifth row) GWBWRW is repeated, and
(sixth row) WGWBWR is repeated.

Thereafter, in the rows from the seventh row, the above-described first to sixth rows are repeated.

Each row and each column are configured so that one W pixel is interposed therebetween and each RGB pixel is sequentially arranged. Within 6×6=36 pixels illustrated in FIG. 36(2), ½ is set to be 18 Nos. of the W pixels, ⅙ is set to be 6 Nos. of the R pixels, ⅙ is set to be 6 Nos. of the G pixels, and ⅙ is set to be 6 Nos. of the B pixels.

Figure 37:
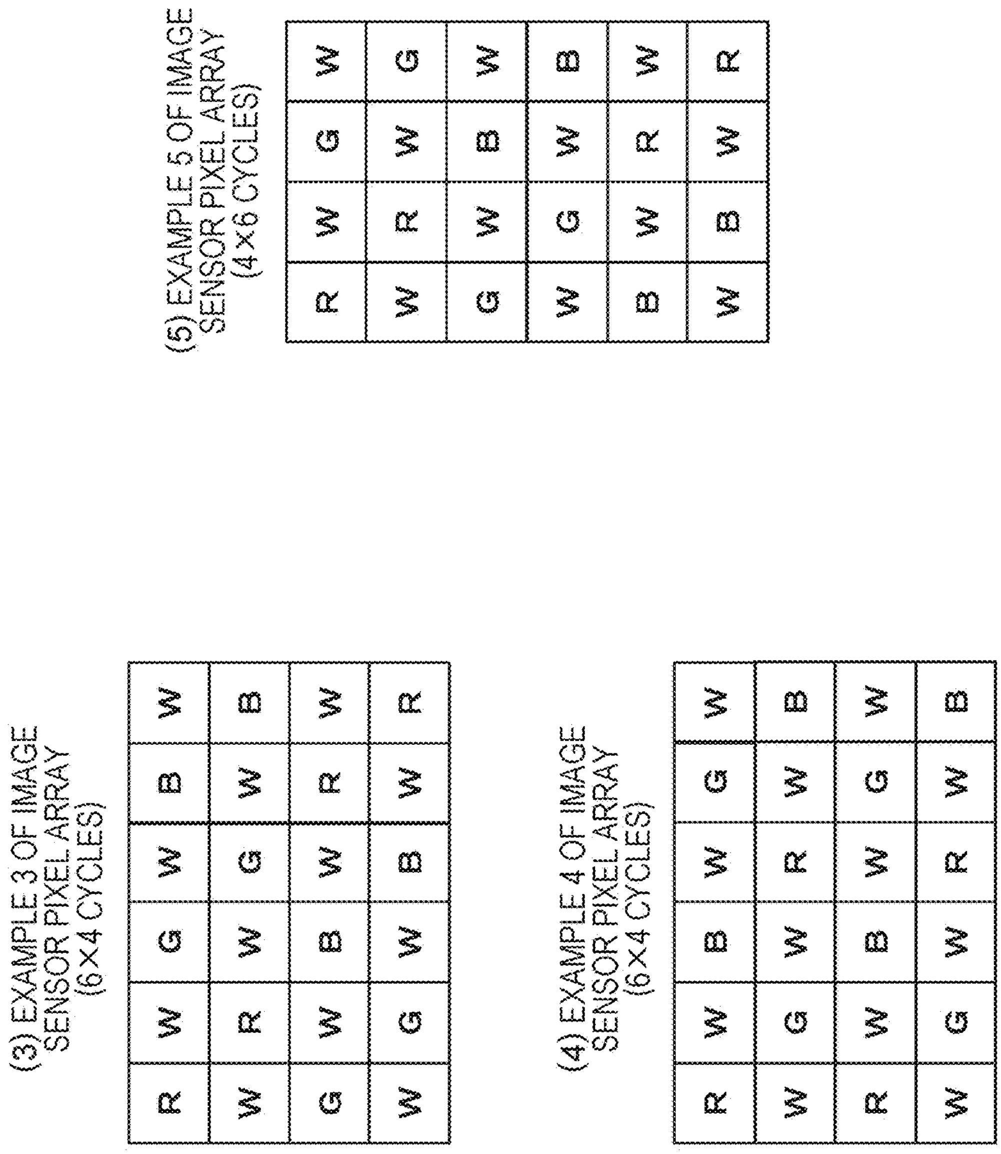
FIG. 37 is a diagram for illustrating a pixel array example of an image sensor (imaging device).

A pixel array example 3 illustrated in FIG. 37(3) is an array example of the RGBW pixel array having 6×4 pixel cycles to which the processing of the present disclosure can be applied.

Sequentially from the first row,
(first row) RWGWBW is repeated,
(second row) WRWGWB is repeated,
(third row) GWBWRW is repeated, and
(fourth row) WGWBWR is repeated.

Thereafter, in the rows from the fifth row, the above-described first to fourth rows are repeated.

Each row is configured so that one W pixel is interposed therebetween and each RGB pixel is sequentially arranged. Within 6×4=24 pixels illustrated in FIG. 37(3), ½ is set to be 12 Nos. of the W pixels, ⅙ is set to be 4 Nos. of the R pixels, ⅙ is set to be 4 Nos. of the G pixels, and ⅙ is set to be 4 Nos. of the B pixels.

A pixel array example 4 illustrated in FIG. 37(4) is another array example of the RGBW pixel array having 6×4 pixel cycles to which the processing of the present disclosure can be applied.

Sequentially from the first row,
(first row) RWGWBW is repeated,
(second row) WGWRWB is repeated,
(third row) RWBWGW is repeated, and
(fourth row) WGWRWB is repeated.

Thereafter, in the rows from the fifth row, the above-described first to fourth rows are repeated.

Each row is configured so that one W pixel is interposed therebetween and each RGB pixel is sequentially arranged. Within 6×4=24 pixels illustrated in FIG. 37(4), ½ is set to be 12 Nos. of the W pixels, ⅙ is set to be 4 Nos. of the R pixels, ⅙ is set to be 4 Nos. of the G pixels, and ⅙ is set to be 4 Nos. of the B pixels.

A pixel array example 5 illustrated in FIG. 37(5) is an array example of the RGBW pixel array having 4×6 pixel cycles to which the processing of the present disclosure can be applied.

Sequentially from the first row,
(first row) RWGW is repeated,
(second row) WRWG is repeated,
(third row) GWBW is repeated,
(fourth row) WGWB is repeated,
(fifth row) BWRW is repeated, and
(sixth row) WBWR is repeated.

Thereafter, in the rows from the seventh row, the above-described first to sixth rows are repeated.

Each column is configured so that one W pixel is interposed therebetween and each RGB pixel is sequentially arranged. Within 4×6=24 pixels illustrated in FIG. 37(5), ½ is set to be 12 Nos. of the W pixels, ⅙ is set to be 4 Nos. of the R pixels, ⅙ is set to be 4 Nos. of the G pixels, and ⅙ is set to be 4 Nos. of the B pixels.

Figure 38:
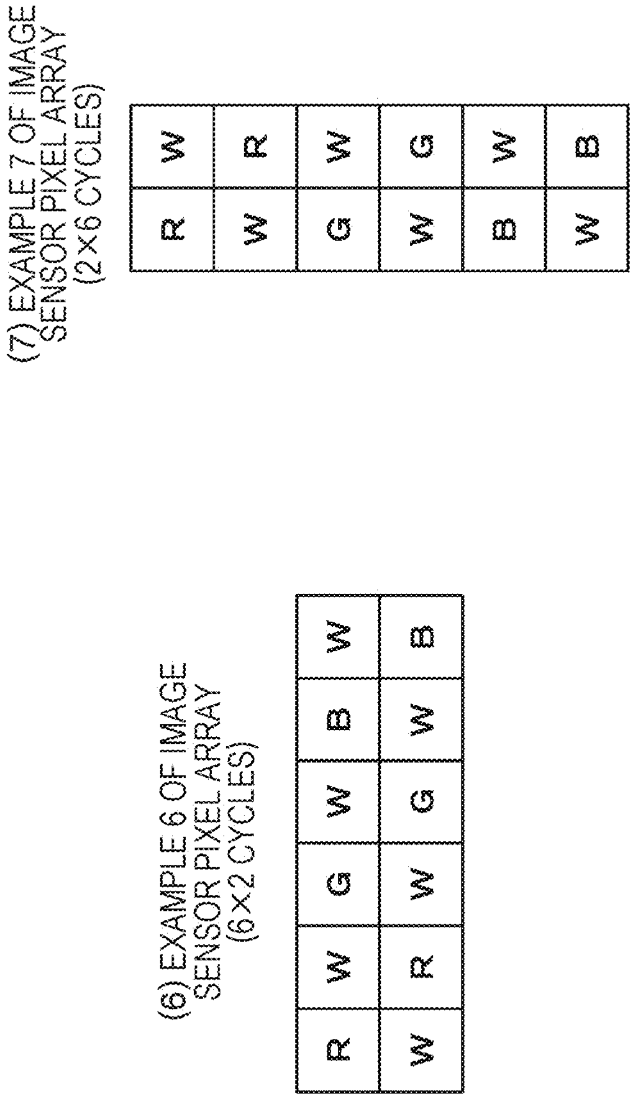
FIG. 38 is a diagram for illustrating a pixel array example of an image sensor (imaging device).

A pixel array example 6 illustrated in FIG. 38(6) is an array example of the RGBW pixel array having 6×2 pixel cycles to which the processing of the present disclosure can be applied.

Sequentially from the first row,
(first row) RWGWBW is repeated, and
(second row) WRWGWB is repeated.

Thereafter, in the rows from the third row, the above-described first and second rows are repeated.

Each row is configured so that one W pixel is interposed therebetween and each RGB pixel is sequentially arranged. Within 6×2=12 pixels illustrated in FIG. 38(6), ½ is set to be 6 Nos. of the W pixels, ⅙ is set to be 2 Nos. of the R pixels, ⅙ is set to be 2 Nos. of the G pixels, and ⅙ is set to be 2 Nos. of the B pixels.

A pixel array example 7 illustrated in FIG. 38(7) is an array example of the RGBW pixel array having 2×6 pixel cycles to which the processing of the present disclosure can be applied.

Sequentially from the first column,
(first column) RWGWBW is repeated, and
(second column) WRWGWB is repeated.

Thereafter, in the columns from the third column, the above-described first and second columns are repeated.

Each column is configured so that one W pixel is interposed therebetween and each RGB pixel is sequentially arranged. Within 2×6=12 pixels illustrated in FIG. 38(7), ½ is set to be 6 Nos. of the W pixels, ⅙ is set to be 2 Nos. of the R pixels, ⅙ is set to be 2 Nos. of the G pixels, and ⅙ is set to be 2 Nos. of the B pixels.

For example, the above-described processing according to the first to sixth embodiments can also be applied to the output of the image sensor having any one pixel array among the pixel array examples 1 to 7 in FIGS. 36 to 38.

[8. Summary of Configurations According to Present Disclosure]

Hitherto, the embodiments of the present disclosure have been described in detail with reference to the specific embodiments. However, it is apparent that those skilled in the art can make modifications and substitutions of the embodiments within a scope without departing from the spirit of the present disclosure. That is, the present invention is disclosed in a form of examples, and should not be construed as limiting. In order to determine the spirit of the present disclosure, appended claims should be referred to.

The techniques disclosed herein may employ the following configurations.

(1) There is provided an image processing apparatus including an image sensor that has an RGBW array including an RGB pixel which is a light receiving element corresponding to wavelength light of each RGB color and a W pixel which is a light receiving element receiving substantially all RGB wavelength light, and an image processing unit that performs image processing by inputting a sensor image formed of an RGBW pixel signal output from the image sensor. The image sensor has a periodic array of a unit composition formed of each RGBW pixel, and has an array in which composition ratios of each RGB pixel within the unit composition are adapted to be the same as each other. The image processing unit converts a pixel array of the sensor image formed of the RGBW pixel signal, and performs at least either array conversion processing for generating an RGB array image or signal processing for generating each RGB image signal in which all RGB pixel values are set for each pixel position of the sensor image.

(2) In the image processing apparatus disclosed in the above-described (1), the image processing unit converts the pixel array of the sensor image formed of the RGBW pixel signal, and has an array conversion unit which generates the RGB array image formed of a Bayer array. The array conversion unit has a W pixel interpolation unit which generates a whole W pixel image signal by setting the W pixel at an RGB pixel position of the sensor image, an RGBW pixel generation unit which generates an RGBW corresponding low frequency signal which is a low frequency signal of each RGBW pixel signal at each pixel position of the sensor image, and a correlation processing unit which inputs the whole W pixel image signal and the RGBW corresponding low frequency signal, and which performs array conversion for a composition pixel of the sensor image and generates an RGB image of the Bayer array by calculating a pixel value based on an estimation in which the W pixel and the RGB pixel have a positive correlation.

(3) In the image processing apparatus disclosed in the above-described (2), the W pixel interpolation unit detects an edge direction by applying a pixel value of the W pixel of the sensor image, and determines a W pixel value at an interpolation pixel position by regarding a pixel present in the detected edge direction as a reference pixel.

(4) In the image processing apparatus disclosed in any one of the above-described (1) to (3), the image processing unit has a demosaic processing unit which performs demosaic processing on the sensor image and generates each RGB image signal in which all RGB pixel values are set for each pixel position of the sensor image. The demosaic processing unit has a W pixel interpolation unit which generates a whole W pixel image signal by setting the W pixel at an RGB pixel position of the sensor image, an RGBW pixel generation unit which generates an RGBW corresponding low frequency signal which is a low frequency signal of each RGBW pixel signal at each pixel position of the sensor image, and a correlation processing unit which inputs the whole W pixel image signal and the RGBW corresponding low frequency signal, and which generates each RGB pixel signal in which all RGB pixel values are set for each pixel position of the sensor image, by calculating a pixel value based on estimation that the W pixel and the RGB pixel have a positive correlation.

(5) In the image processing apparatus disclosed in the above-described (4), the W pixel interpolation unit detects an edge direction by applying a pixel value of the W pixel of the sensor image, and determines a W pixel value at an interpolation pixel position by regarding a pixel present in the detected edge direction as a reference pixel.

(6) In the image processing apparatus disclosed in the above-described (4) or (5), the image processing unit has a linear matrix processing unit which performs pixel value conversion to which a preset matrix is applied, on each RGB image signal generated by the demosaic processing unit.

(7) The image processing unit has a demosaic processing unit which performs demosaic processing on the sensor image and generates each RGBW image signal in which all RGB and W pixel values are set for each pixel position of the sensor image. The demosaic processing unit has a W pixel interpolation unit which generates a whole W pixel image signal by setting the W pixel at an RGB pixel position of the sensor image, an RGBW pixel generation unit which generates an RGBW corresponding low frequency signal which is a low frequency signal of each RGBW pixel signal at each pixel position of the sensor image, and a correlation processing unit which inputs the whole W pixel image signal and the RGBW corresponding low frequency signal, and which generates each RGB pixel signal in which all RGB pixel values are set for each pixel position of the sensor image, by calculating a pixel value based on an estimation in which the W pixel and the RGB pixel have a positive correlation.

(8) In the image processing apparatus disclosed in the above-described (7), the image processing unit has a linear matrix processing unit which performs pixel value conversion to which a preset matrix is applied, on each RGBW image signal generated by the demosaic processing unit.

(9) In the image processing apparatus disclosed in any one of the above-described (1) to (8), the image sensor is configured to output an image having an added pixel value of the same color pixel values which are adjacent to each other in an oblique direction, as the sensor image. The image processing unit has an array conversion unit which converts a pixel array of the sensor image configured to have the added pixel value and formed of the RGBW pixel signal, and which generates an RGB array image formed of a Bayer array. The array conversion unit has an RGBW pixel generation unit which generates an RGBW corresponding low frequency signal which is a low frequency signal of each RGBW pixel signal at each pixel position of the sensor image, and a correlation processing unit which inputs the whole W pixel image signal output as the sensor image and the RGBW corresponding low frequency signal, and which performs array conversion on a composition pixel of the sensor image and generates an RGB image of the Bayer array, by calculating a pixel value based on an estimation in which the W pixel and the RGB pixel have a positive correlation.

(10) In the image processing apparatus disclosed in any one of the above-described (1) to (9), the image sensor is configured to output an image including a long-period exposure pixel and a short-period exposure pixel which are set according to a control of a control unit, as the sensor image. The image processing unit has an array conversion unit which generates a high dynamic range (HDR) image by applying the sensor image including the long-period exposure pixel and the short-period exposure pixel, and which generates an RGB array HDR image formed of a Bayer array by converting the pixel array. The array conversion unit has a W pixel interpolation unit which generates a whole W pixel long-period exposure image in which a long-period exposure W pixel is set for all pixel positions, by applying a long-period exposure pixel signal of the sensor image, and which generates a whole W pixel short-period exposure image in which a short-period exposure W pixel is set for all pixel positions, by applying a short-period exposure pixel signal of the sensor image, an RGBW pixel generation unit which generates a long-period exposure RGBW corresponding low frequency signal which is a low frequency signal of each long-period exposure RGBW pixel signal at each pixel position, by applying the long-period exposure pixel signal of the sensor image, and which generates a short-period exposure RGBW corresponding low frequency signal which is a low frequency signal of each short-period exposure RGBW pixel signal at each pixel position, by applying the short-period exposure pixel signal of the sensor image; an HDR composition processing unit which generates a whole W pixel image signal as the high dynamic range (HDR) image and the RGBW corresponding low frequency signal by inputting the whole W pixel long-period exposure image, the whole W pixel short-period exposure image, the long-period exposure RGBW corresponding low frequency signal, and the short-period exposure RGBW corresponding low frequency signal, and a correlation processing unit which inputs the whole W pixel image signal and the RGBW corresponding low frequency signal as the high dynamic range (HDR) image generated by the HDR composition processing unit, and which performs array conversion on a composition pixel of the sensor image and generates an RGB image of the Bayer array, by calculating a pixel value based on an estimation in which the W pixel and the RGB pixel have a positive correlation.

(11) In the image processing apparatus disclosed in the above-described (10), the HDR composition processing unit calculates a composition pixel value of the high dynamic range (HDR) image through blend processing of the short-period exposure pixel signal and the long-period exposure pixel signal which are obtained after gain adjustment according to an exposure ratio.

(12) In the image processing apparatus disclosed in the above-described (10) or (11), the W pixel interpolation unit detects an edge direction by applying the long-period exposure W pixel signal of the sensor image, and generates the whole W pixel long-period exposure image in which the long-period exposure W pixel is set for all pixel positions by determining a W pixel value at an interpolation pixel position by regarding a pixel present in the detected edge direction as a reference pixel. The W pixel interpolation unit detects an edge direction by applying the short-period exposure W pixel signal of the sensor image, and generates the whole W pixel short-period exposure image in which the short-period exposure W pixel is set for all pixel positions by determining a W pixel value at an interpolation pixel position by regarding a pixel present in the detected edge direction as a reference pixel.

(13) In the image processing apparatus disclosed in any one of the above-described (1) to (12), in the image sensor, two rows of a long-period exposure pixel row and a short-period exposure pixel row are alternately set according to a control of a control unit. The image sensor is configured to output an image which is formed of a long-period exposure pixel signal having an added pixel value of the same color pixel values which are adjacent to each other in an oblique direction of the long-period exposure pixel row in a unit of two rows, and a short-period exposure pixel signal having an added pixel value of the same color pixel values which are adjacent to each other in an oblique direction of the short-period exposure pixel row in a unit of two rows, as the sensor image. The image processing unit has an array conversion unit which generates a high dynamic range (HDR) image by applying the sensor image including the long-period exposure pixel and the short-period exposure pixel, and which generates an RGB array HDR image formed of a Bayer array by converting the pixel array. The array conversion unit has a W pixel interpolation unit which generates a whole W pixel long-period exposure image in which a long-period exposure W pixel is set for all pixel positions, by applying a long-period exposure pixel signal of the sensor image, and which generates a whole W pixel short-period exposure image in which a short-period exposure W pixel is set for all pixel positions, by applying a short-period exposure pixel signal of the sensor image, an RGBW pixel generation unit which generates a long-period exposure RGBW corresponding low frequency signal which is a low frequency signal of each long-period exposure RGBW pixel signal at each pixel position, by applying the long-period exposure pixel signal of the sensor image, and which generates a short-period exposure RGBW corresponding low frequency signal which is a low frequency signal of each short-period exposure RGBW pixel signal at each pixel position, by applying the short-period exposure pixel signal of the sensor image, an HDR composition processing unit which generates a whole W pixel image signal as the high dynamic range (HDR) image and the RGBW corresponding low frequency signal by inputting the whole W pixel long-period exposure image, the whole W pixel short-period exposure image, the long-period exposure RGBW corresponding low frequency signal, and the short-period exposure RGBW corresponding low frequency signal, and a correlation processing unit which inputs the whole W pixel image signal and the RGBW corresponding low frequency signal as the high dynamic range (HDR) image generated by the HDR composition processing unit, and which performs array conversion on a composition pixel of the sensor image and generates an RGB image of the Bayer array, by calculating a pixel value based on an estimation in which the W pixel and the RGB pixel have a positive correlation.

(14) In the image processing apparatus disclosed in the above-described (13), the HDR composition processing unit calculates a composition pixel value of the high dynamic range (HDR) image through blend processing of the short-period exposure pixel signal and the long-period exposure pixel signal which are obtained after gain adjustment according to an exposure ratio.

(15) In the image processing apparatus disclosed in the above-described (13) or (14)3, the W pixel interpolation unit detects an edge direction by applying the long-period exposure W pixel signal of the sensor image, and generates the whole W pixel long-period exposure image in which the long-period exposure W pixel is set for all pixel positions by determining a W pixel value at an interpolation pixel position by regarding a pixel present in the detected edge direction as a reference pixel. The W pixel interpolation unit detects an edge direction by applying the short-period exposure W pixel signal of the sensor image, and generates the whole W pixel short-period exposure image in which the short-period exposure W pixel is set for all pixel positions by determining a W pixel value at an interpolation pixel position by regarding a pixel present in the detected edge direction as a reference pixel.

(16) There is provided an imaging device including an RGBW array including an RGB pixel which is a light receiving element corresponding to wavelength light of each RGB color and a W pixel which is a light receiving element receiving substantially all RGB wavelength light. The image sensor has a periodic array of a unit composition formed of each RGBW pixel, and has an array in which composition ratios of each RGB pixel within the unit composition are adapted to be the same as each other.

(17) In the imaging device disclosed in the above-described (16), the imaging device has the periodic array in which 6×6 pixels, 6×4 pixels, or 6×2 pixels are adapted to be the unit composition. The composition ratio of each RGBW pixel within the unit composition is 1:1:1:3.

(18) In the imaging device disclosed in the above-described (16) or (17), the imaging device has a composition in which each RGBW pixel is arranged in each column and each row.

Furthermore, a processing method executed in the above-described apparatus and a program which causes the above-described apparatus to perform the processing are also included in the configurations of the present disclosure.

In addition, a series of processing described herein can be performed by using hardware or software, or alternatively by employing a combined configuration of both of these. When the processing is performed by using the software, the processing can be performed by installing a processing sequence-recorded program in a memory inside a computer, which is incorporated in dedicated hardware, or alternatively by installing the program in a general-purpose computer which can perform various types of processing. For example, the program can be recorded in a recording medium in advance. In addition to a case where the program is installed in the computer from the recording medium, the program can be installed in the recording medium such as an embedded hard disk by receiving the program via networks such as a local area network (LAN) and the Internet.

Various types of processing disclosed herein are not limited to a case where the processing is performed in time series according to the disclosure. The processing may be performed in parallel or individually depending on a processing capability of the device or if necessary. In addition, the system described herein is a logical and collective configuration of multiple apparatuses, the apparatuses having each configuration are not necessarily arranged inside the same housing.

INDUSTRIAL APPLICABILITY

As described above, according to a configuration of an embodiment of the present disclosure, there are provided an apparatus and a method which generate an RGB image having less color noise or fewer false colors by inputting an RGBW image.

Specifically, the apparatus includes an image sensor that has an RGBW array and an image processing unit that performs image processing by inputting a sensor image formed of an RGBW pixel signal output from the image sensor. The image sensor has a periodic array of a unit composition formed of each RGBW pixel, and has an array in which composition ratios of each RGB pixel within the unit composition are adapted to be the same as each other. The image processing unit converts a pixel array of the sensor image formed of the RGBW pixel signal, and performs at least either array conversion processing for generating an RGB array image or signal processing for generating each RGB image signal in which all RGB pixel values are set for each pixel position of the sensor image.

In the configuration of the present disclosure, the number of respective RGB pixels per unit composition of the image sensor is uniformly set. Accordingly, when a pixel value of each RGB color with respect to each pixel position is set, it is possible to sufficiently obtain the pixel value of each color from a reference area. Therefore, it is possible to very accurately perform a setting process on each RGB color with respect to each pixel position, and thus, it is possible to generate an RGB image having less color noise or fewer false colors.

REFERENCE SIGNS LIST

100 image processing apparatus
101 lens
102 image sensor (imaging device)
103 sensor image
104 array conversion unit
105 Bayer array image
106 camera signal processing unit
107 output image
108 control unit
122 vertical scanning circuit
123 horizontal scanning circuit
124 pixel
131 horizontal reset line
132 horizontal selection line
133 vertical signal line
134 signal output line
151 W pixel interpolation unit
152 RGBW pixel generation unit
153 correlation processing unit
171 direction filter
172 edge direction detection unit
173 filter selection unit
181 pixel generation unit
191 output color selection unit
192 correlation calculation unit
200 image processing apparatus
201 lens
202 image sensor (imaging device)
203 sensor image
204 camera signal processing unit
205 output image
206 control unit
211 white balance processing unit
212 demosaic processing unit
213 linear matrix processing unit
214 gamma conversion unit
220 gain information
221 coordinate information
222 input color gain selection unit
223 gain processing unit
224 clip processing unit
231 W pixel interpolation unit
232 RGBW pixel generation unit
233 correlation processing unit
251 correlation calculation unit
261 matrix calculation unit
271 gamma conversion unit
400 image processing apparatus
401 lens
402 image sensor (imaging device)
403 sensor image
404 array conversion unit
405 Bayer array image
406 camera signal processing unit
407 output image
408 control unit

451 RGBW pixel generation unit
452 correlation processing unit
500 image processing apparatus
501 lens
502 image sensor (imaging device)
503 sensor image
504 array conversion unit
505 Bayer array HDR image
506 gradation conversion unit
507 gradation conversion HDR image
508 camera signal processing unit
509 output image
510 control unit
551 W pixel interpolation unit
552 RGBW image generation unit
553 HDR composition processing unit
554 correlation processing unit
571 direction filter
572 edge direction detection unit
573 filter selection unit
590 exposure ratio information
595 exposure ratio gain adjustment unit
596 blend rate calculation unit
597 blend processing unit
600 image processing apparatus
601 lens
602 image sensor (imaging device)
603 sensor image
604 array conversion unit
605 Bayer array HDR image
606 gradation conversion unit
607 gradation conversion HDR image
608 camera signal processing unit
609 output image
610 control unit
651 W pixel interpolation unit
652 RGBW pixel generation unit
653 HDR photocomposition processing unit
654 correlation processing unit
671 direction filter
672 edge direction detection unit
673 filter selection unit

The invention claimed is:

1. An image processing apparatus comprising:

an image sensor that has an RGBW array including R, G and B pixels which are light receiving elements corresponding to wavelength lights of each RGB color and a W pixel which is a light receiving element receiving substantially all RGB wavelength light; and an image processor comprising a processing device and a memory storing instructions that, when executed by the processing device, perform image processing by inputting a sensor image formed of an RGBW pixel signal output from the image sensor, wherein the image sensor has a periodic array of a unit composition formed of each RGBW pixel, wherein the image processor converts a pixel array of the sensor image formed of the RGBW pixel signal, and performs array conversion processing for generating an RGB array image formed of a Bayer array, wherein the image processor has an array converter which generates the RGB array image formed of the Bayer array, and wherein the array converter has a W pixel interpolator which generates a whole W pixel image signal by setting the W pixel at an RGB pixel position of the sensor image; an RGBW pixel generator which generates an RGBW corresponding low frequency signal which is a low frequency signal of each RGBW pixel signal at each pixel position of the sensor image; and a correlation processor which inputs the whole W pixel image signal and the RGBW corresponding low frequency signal, and which performs array conversion for a composition pixel of the sensor image and generates an RGB image of the Bayer array by calculating a pixel value based on an estimation in which the W pixel and the R, G and B pixels have a positive correlation.

2. The image processing apparatus according to claim 1, wherein the W pixel interpolator detects an edge direction by applying a pixel value of the W pixel of the sensor image, and determines a W pixel value at an interpolation pixel position by regarding a pixel present in the detected edge direction as a reference pixel.

3. An image processing apparatus comprising:

an image sensor that has an RGBW array including R, G and B pixels which are light receiving elements corresponding to wavelength lights of each RGB color and a W pixel which is a light receiving element receiving substantially all RGB wavelength light; and an image processor comprising a processing device and a memory storing instructions that, when executed by the processing device, perform image processing by inputting a sensor image formed of an RGBW pixel signal output from the image sensor, wherein the image sensor has a periodic array of a unit composition formed of each RGBW pixel, wherein the image processor converts a pixel array of the sensor image formed of the RGBW pixel signal, and performs array conversion processing for generating an RGB array image formed of a Bayer array, wherein the image sensor is configured to output an image having an added pixel value of the same color pixel values which are adjacent to each other in an oblique direction, as the sensor image, wherein the image processor has an array converter which converts a pixel array of the sensor image configured to have the added pixel value and formed of the RGBW pixel signal, and which generates an RGB array image formed of the Bayer array, and wherein the array converter has an RGBW pixel generator which generates an RGBW corresponding low frequency signal which is a low frequency signal of each RGBW pixel signal at each pixel position of the sensor image; and a correlation processor which inputs the whole W pixel image signal output as the sensor image and the RGBW corresponding low frequency signal, and which performs array conversion on a composition pixel of the sensor image and generates an RGB image of the Bayer array, by calculating a pixel value based on an estimation in which the W pixel and the RGB pixel have a positive correlation.

4. An image processing apparatus comprising:

an image sensor that has an RGBW array including R, G and B pixels which are light receiving elements corresponding to wavelength lights of each RGB color and a W pixel which is a light receiving element receiving substantially all RGB wavelength light; and an image processor comprising a processing device and a memory storing instructions that, when executed by the processing device, perform image processing by inputting a sensor image formed of an RGBW pixel signal output from the image sensor, wherein the image sensor has a periodic array of a unit composition formed of each RGBW pixel, wherein the image processor converts a pixel array of the sensor image formed of the RGBW pixel signal, and performs array conversion processing for generating an RGB array image formed of a Bayer array, wherein the image sensor is configured to output an image including a long-period exposure pixel and a short-period exposure pixel which are set according to a control of a controller, as the sensor image, wherein the image processor has an array converter which generates a high dynamic range (HDR) image by applying the sensor image including the long-period exposure pixel and the short-period exposure pixel, and which generates an RGB array HDR image formed of the Bayer array by converting the pixel array, and wherein the array converter has a W pixel interpolator which generates a whole W pixel long-period exposure image in which a long-period exposure W pixel is set for all pixel positions, by applying a long-period exposure pixel signal of the sensor image, and which generates a whole W pixel short-period exposure image in which a short-period exposure W pixel is set for all pixel positions, by applying a short-period exposure pixel signal of the sensor image; an RGBW pixel generator which generates a long-period exposure RGBW corresponding low frequency signal which is a low frequency signal of each long-period exposure RGBW pixel signal at each pixel position, by applying the long-period exposure pixel signal of the sensor image, and which generates a short-period exposure RGBW corresponding low frequency signal which is a low frequency signal of each short-period exposure RGBW pixel signal at each pixel position, by applying the short-period exposure pixel signal of the sensor image; an HDR composition processor which generates a whole W pixel image signal as the high dynamic range (HDR) image and the RGBW corresponding low frequency signal by inputting the whole W pixel long-period exposure image, the whole W pixel short-period exposure image, the long-period exposure RGBW corresponding low frequency signal, and the short-period exposure RGBW corresponding low frequency signal; and a correlation processor which inputs the whole W pixel image signal and the RGBW corresponding low frequency signal as the high dynamic range (HDR) image generated by the HDR composition processor, and which performs array conversion on a composition pixel of the sensor image and generates an RGB image of the Bayer array, by calculating a pixel value based on an estimation in which the W pixel and the RGB pixel have a positive correlation.

5. The image processing apparatus according to claim 4, wherein the HDR composition processor calculates a composition pixel value of the high dynamic range (HDR) image through blend processing of the short-period exposure pixel signal and the long-period exposure pixel signal which are obtained after gain adjustment according to an exposure ratio.

6. The image processing apparatus according to claim 4, wherein the W pixel interpolator detects an edge direction by applying the long-period exposure W pixel signal of the sensor image, and generates the whole W pixel long-period exposure image in which the long-period exposure W pixel is set for all pixel positions by determining a W pixel value at an interpolation pixel position by regarding a pixel present in the detected edge direction as a reference pixel, and wherein the W pixel interpolator detects an edge direction by applying the short-period exposure W pixel signal of the sensor image, and generates the whole W pixel short-period exposure image in which the short-period exposure W pixel is set for all pixel positions by determining a W pixel value at an interpolation pixel position by regarding a pixel present in the detected edge direction as a reference pixel.

7. An image processing apparatus comprising:

an image sensor that has an RGBW array including R, G and B pixels which are light receiving elements corresponding to wavelength lights of each RGB color and a W pixel which is a light receiving element receiving substantially all RGB wavelength light; and an image processor comprising a processing device and a memory storing instructions that, when executed by the processing device, perform image processing by inputting a sensor image formed of an RGBW pixel signal output from the image sensor, wherein the image sensor has a periodic array of a unit composition formed of each RGBW pixel, wherein the image processor converts a pixel array of the sensor image formed of the RGBW pixel signal, and performs array conversion processing for generating an RGB array image formed of a Bayer array, wherein in the image sensor, two rows of a long-period exposure pixel row and a short-period exposure pixel row are alternately set according to a control of a controller, wherein the image sensor is configured to output an image which is formed of a long-period exposure pixel signal having an added pixel value of the same color pixel values which are adjacent to each other in an oblique direction of the long-period exposure pixel row in a unit of two rows, and a short-period exposure pixel signal having an added pixel value of the same color pixel values which are adjacent to each other in an oblique direction of the short-period exposure pixel row in a unit of two rows, as the sensor image, wherein the image processor has an array converter which generates a high dynamic range (HDR) image by applying the sensor image including the long-period exposure pixel and the short-period exposure pixel, and which generates an RGB array HDR image formed of the Bayer array by converting the pixel array, and wherein the array converter has a W pixel interpolator which generates a whole W pixel long-period exposure image in which a long-period exposure W pixel is set for all pixel positions, by applying a long-period exposure pixel signal of the sensor image, and which generates a whole W pixel short-period exposure image in which a short-period exposure W pixel is set for all pixel positions, by applying a short-period exposure pixel signal of the sensor image; an RGBW pixel generator which generates a long-period exposure RGBW corresponding low frequency signal which is a low frequency signal of each long-period exposure RGBW pixel signal at each pixel position, by applying the long-period exposure pixel signal of the sensor image, and which generates a short-period exposure RGBW corresponding low frequency signal which is a low frequency signal of each short-period exposure RGBW pixel signal at each pixel position, by applying the short-period exposure pixel signal of the sensor image; an HDR composition processor which generates a whole W pixel image signal as the high dynamic range (HDR) image and the RGBW corresponding low frequency signal by inputting the whole W pixel long-period exposure image, the whole W pixel short-period exposure image, the long-period exposure RGBW corresponding low frequency signal, and the short-period exposure RGBW corresponding low frequency signal; and a correlation processor which inputs the whole W pixel image signal and the RGBW corresponding low frequency signal as the high dynamic range (HDR) image generated by the HDR composition processor, and which performs array conversion on a composition pixel of the sensor image and generates an RGB image of the Bayer array, by calculating a pixel value based on an estimation in which the W pixel and the RGB pixel have a positive correlation.

8. The image processing apparatus according to claim 7, wherein the HDR composition processor calculates a composition pixel value of the high dynamic range (HDR) image through blend processing of the short-period exposure pixel signal and the long-period exposure pixel signal which are obtained after gain adjustment according to an exposure ratio.

9. The image processing apparatus according to claim 7, wherein the W pixel interpolator detects an edge direction by applying the long-period exposure W pixel signal of the sensor image, and generates the whole W pixel long-period exposure image in which the long-period exposure W pixel is set for all pixel positions by determining a W pixel value at an interpolation pixel position by regarding a pixel present in the detected edge direction as a reference pixel, and wherein the W pixel interpolator detects an edge direction by applying the short-period exposure W pixel signal of the sensor image, and generates the whole W pixel short-period exposure image in which the short-period exposure W pixel is set for all pixel positions by determining a W pixel value at an interpolation pixel position by regarding a pixel present in the detected edge direction as a reference pixel.

10. An image processing method executed in an image processing apparatus, wherein the image processing apparatus includes an image sensor that has a periodic array of a unit composition formed of each RGBW pixel including R, G and B pixels which are light receiving elements corresponding to wavelength lights of each RGB color and a W pixel which is a light receiving element receiving substantially all RGB wavelength light, and an image processor comprising a processing device and a memory storing instructions that, when executed by the processing device, perform image processing on a sensor image which is an output of the image sensor, wherein the image processor converts a pixel array of the sensor image formed of the RGBW pixel signal, and performs array conversion processing for generating an RGB array image formed of a Bayer array, wherein the image processor has an array converter which generates the RGB array image formed of the Bayer array, and wherein the array converter has a W pixel interpolator which generates a whole W pixel image signal by setting the W pixel at an RGB pixel position of the sensor image; an RGBW pixel generator which generates an RGBW corresponding low frequency signal which is a low frequency signal of each RGBW pixel signal at each pixel position of the sensor image; and a correlation processor which inputs the whole W pixel image signal and the RGBW corresponding low frequency signal, and which performs array conversion for a composition pixel of the sensor image and generates an RGB image of the Bayer array by calculating a pixel value based on an estimation in which the W pixel and the R, G and B pixels have a positive correlation.

11. A non-transitory computer-readable storage device encoded with computer-executable instructions that, when executed by an image processing apparatus, perform image processing, wherein the image processing apparatus includes an image sensor that has a periodic array of a unit composition formed of each RGBW pixel including R, G and B pixels which are light receiving elements corresponding to wavelength lights of each RGB color and a W pixel which is a light receiving element receiving substantially all RGB wavelength light, and an image processor comprising a processing device and a memory storing instructions that, when executed by the processing device, perform image processing on a sensor image which is an output of the image sensor, wherein the image processing unit converts a pixel array of the sensor image formed of the RGBW pixel signal, and performs array conversion processing for generating an RGB array image formed of a Bayer array, wherein the image processor has an array converter which generates the RGB array image formed of the Bayer array, and wherein the array converter has a W pixel interpolator which generates a whole W pixel image signal by setting the W pixel at an RGB pixel position of the sensor image; an RGBW pixel generator which generates an RGBW corresponding low frequency signal which is a low frequency signal of each RGBW pixel signal at each pixel position of the sensor image; and a correlation processor which inputs the whole W pixel image signal and the RGBW corresponding low frequency signal, and which performs array conversion for a composition pixel of the sensor image and generates an RGB image of the Bayer array by calculating a pixel value based on an estimation in which the W pixel and the R, G and B pixels have a positive correlation.

* * * * *